US012048892B2

(12) United States Patent
Long et al.

(10) Patent No.: US 12,048,892 B2
(45) Date of Patent: *Jul. 30, 2024

(54) AMINE-APPENDED METAL-ORGANIC FRAMEWORKS EXHIBITING A NEW ADSORPTION MECHANISM FOR CARBON DIOXIDE SEPARATIONS

(71) Applicant: THE REGENTS OF THE UNIVERSITY OF CALIFORNIA, Oakland, CA (US)

(72) Inventors: Jeffrey R. Long, Oakland, CA (US); Phillip J. Milner, Ithaca, NY (US); Rebecca L. Siegelman, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,336

(22) Filed: Sep. 30, 2022

(65) Prior Publication Data

US 2023/0173426 A1 Jun. 8, 2023

Related U.S. Application Data

(63) Continuation of application No. 16/481,039, filed as application No. PCT/US2018/018541 on Feb. 17, 2018, now Pat. No. 11,458,431.
(Continued)

(51) Int. Cl.
*B01D 53/62* (2006.01)
*B01D 53/02* (2006.01)
(Continued)

(52) U.S. Cl.
CPC ............ *B01D 53/02* (2013.01); *B01J 20/226* (2013.01); *B01J 20/28057* (2013.01);
(Continued)

(58) Field of Classification Search
CPC .. B01D 53/02; B01D 53/04; B01D 2253/204; B01D 2257/504; B01D 2258/05;
(Continued)

(56) References Cited

U.S. PATENT DOCUMENTS 9,861,953 B2 1/2018 Long et al.
10,137,430 B2 11/2018 Long et al.
(Continued)

FOREIGN PATENT DOCUMENTS

AU 2015249696 B2 3/2020
CN 104056598 A 9/2014
(Continued)

OTHER PUBLICATIONS

International Search Report and Written Opinion for International Application No. PCT/US2018/018541 dated Jun. 27, 2018, 14 pages.
(Continued)

*Primary Examiner* — Frank M Lawrence, Jr.
(74) *Attorney, Agent, or Firm* — Brett Lovejoy; Morgan, Lewis & Bockius LLP

(57) ABSTRACT

An adsorption material is disclosed that comprises a metal-organic framework and a plurality of ligands. The metal-organic framework comprising a plurality of metal ions. Each respective ligand in the plurality of ligands is amine appended to a respective metal ion in the plurality of metal ions of the metal-organic framework. Each respective ligand in the plurality of ligands comprises a substituted 1,3-propanediamine. The adsorbent has a $CO_2$ adsorption capacity of greater than 2.50 mmol/g at 150 mbar $CO_2$ at 40° C.
(Continued)

Moreover, the adsorbent is configured to regenerate at less than 120° C. An example ligand is diamine 2,2-dimethyl-1,3-propanediamine. An example of the metal-organic framework is $Mg_2(dobpdc)$, where $dobpdc^{4-}$ is 4,4'-dioxidobiphenyl-3,3'-dicarboxylate. Example applications for the adsorption material are removal of carbon dioxide from flue gas and biogasses.

25 Claims, 31 Drawing Sheets

Related U.S. Application Data

(60) Provisional application No. 62/460,548, filed on Feb. 17, 2017.

(51) Int. Cl.
   *B01J 20/22* (2006.01)
   *B01J 20/28* (2006.01)
   *B01J 20/34* (2006.01)

(52) U.S. Cl.
   CPC ....... *B01J 20/3466* (2013.01); *B01J 20/3491* (2013.01); *B01D 2253/204* (2013.01); *B01D 2257/504* (2013.01); *B01D 2258/05* (2013.01); *B01D 2259/4009* (2013.01)

(58) Field of Classification Search
   CPC ......... B01D 2259/4009; B01D 53/0462; B01J 20/226; B01J 20/28057; B01J 20/3466; B01J 20/3491; B01J 20/3483; Y02C 20/40; Y02E 50/30; Y02T 50/678; C10L 2290/12; C10L 2290/542; C10L 3/104
   USPC ...... 95/139, 900, 902; 96/108; 502/400, 401
   See application file for complete search history.

(56) References Cited

U.S. PATENT DOCUMENTS

| | | | |
|---|---|---|---|
| 10,722,863 | B2 | 7/2020 | Long et al. |
| 11,458,431 | B2 * | 10/2022 | Long ................. B01J 20/28057 |
| 2012/0070353 | A1 | 3/2012 | Trukhan |
| 2012/0251420 | A1 | 10/2012 | Menzel et al. |
| 2013/0055895 | A1 | 3/2013 | Menzel et al. |
| 2014/0178279 | A1 | 6/2014 | Svensen et al. |
| 2014/0294709 | A1 | 10/2014 | Long et al. |

FOREIGN PATENT DOCUMENTS

| | | |
|---|---|---|
| CN | 106457120 B | 4/2021 |
| KR | 10-2014-011645 A | 9/2014 |
| WO | WO 2013/059527 A1 | 4/2013 |
| WO | WO 2015/164543 A1 | 10/2015 |
| WO | WO 2017/059130 A2 | 4/2017 |
| WO | WO 2017/173362 A1 | 10/2017 |

OTHER PUBLICATIONS

Milner et al., "A Diaminopropane-Appended Metal-Organic Framework Enabling Efficient CO2 Capture from Coal Flue Gas via a Mixed Adsorption Mechanism", 2017, J. Am. Chem. Soc. 139, p. 13541.
Bacsik et al., "Mechanisms and Kinetics for Sorption of CO2 on Bicontinuous Mesoporous Silica Modified with n-Propylamine", 2011, Langmuir 27, p. 11118.
Bhown and Freeman, "Analysis and Status of Post-Combustion Carbon Dioxide Capture Technologies", 2011, Environ. Sci. Technol. 45, p. 8624.
Boot-Handford et al., "Carbon capture and storage update", 2014, Energy Environ. Sci. 7, p. 13.
Burtch, "Water stability and adsorption in metal-organic frameworks", 2014, Chem. Rev. 114, 10575.
Cao et al., "Capture of carbon dioxide from flue gas on TEPA-grafted metal-organic framework Mg2 (dobdc)", 2013, J. Environ. Sci. 25 (10), 2081-2087.
Choi et al., "Modification of the Mg/DOBDC MOF with Amines to Enhance CO2 Adsorption from Ultradilute Gases", 2012, J. Phys. Chem. Lett. 3, 1136.
D'Alessandro et al., "Carbon Dioxide Capture: Prospects for New Materials", Chem. Int. Ed. 2010, 49, 6058-6082.
Darunte et al., "Direct Air Capture of CO2 Using Amine Functionalized MIL-101(Cr)", 2016, ACS Sustain. Chem. Eng. 4, p. 5761.
Demessence et al., "Strong CO2 Binding in a Water-Stable, Triazolate-Bridged Metal-Organic Framework Functionalized with Ethylenediamine", 2009, J. Am. Chem. Soc. 131, 8784.
Didas et al., "Effect of Amine Surface Coverage on the Co-Adsorption of CO2 and Water: Spectral Deconvolution of Adsorbed Species", 2014, J. Phys. Chem. Lett. 5, 23, p. 4194.
Drage, "Materials challenges for the development of solid sorbents for post-combustion carbon capture", 2012, J. Mater. Chem. 22, p. 2815.
Drisdell et al., "Probing the mechanism of CO2 capture in diamine-appended metal-organic frameworks using measured and simulated X-ray spectroscopy", 2015, Nature 519, p. 303, 2015, Phys Chem Chem Phys 17, p. 21448.
Gygi et al., "Hydrogen Storage in the Expanded Pore Metal-Organic Frameworks M2(dobpdc) (M=Mg, Mn, Fe, Co, Ni, Zn)" 2016, Chem. Mater. 28, p. 1128.
Hu et al., "Alkylamine-Tethered Stable Metal-Organic Framework for CO2 Capture from Flue Gas", 2014, ChemSusChem vol. 7, Issue 3, p. 734.
Jo et al., Fine-Tuning of the Carbon Dioxide Capture Capability of Diamine-Grafted Metal-Organic Framework Adsorbents Through Amine Functionalization, ChemSusChem vol. 10, Issue 3, p. 541-550.
Joos et al., "Molecular Simulation Study of the Competitive Adsorption of H2O and CO2 in Zeolite 13X", 2013, Langmuir 29, 15936.
Kapelewski et al., "M2(m-dobdc) (M=Mg, Mn, Fe, Co, Ni) Metal-Organic Frameworks Exhibiting Increased Charge Density and Enhanced H2 Binding at the Open Metal Sites", 2014, J. Am. Chem. Soc., 136, p. 12119.
Kim et al., "An ethylenediamine-grafted Y zeolite: a highly regenerable carbon dioxide adsorbent via temperature swind adsorption without urea formation", 2016, Energy Environ. Sci. 9, p. 1803.
Lee and Park, "A review on solid adsorbents for carbon dioxide capture", 2015, Ind. Eng. Chem. 23, p. 1.
Lee et al., "Diamine-functionalized metal-organic framework: exceptionally high CO2 capacities from ambient air and flue gas, ultrafast CO2 uptake rate, and adsorption mechanism", 2014, Energy Environ. Sci. 7, p. 744.
Lee et al., "Exceptional CO2 working capacity in a heterodiamine-grafted metal-organic framework", 2015, Chem. Sci. 6, p. 3697.
Liao et al., "Putting an ultrahigh concentration of amine groups into a metal-organic framework for CO2 capture at low pressures", 2016, Chem. Sci. 7, p. 6528.
Lin et al, "Enhanced selective CO2 adsorption on polyamine/MIL-101 (Cr) composites", 2014, J. Mater. Chem A, 2, 14658.
Lin et al., "Amine-functionalized metal-organic frameworks: structure, synthesis and applications", 2016, RSC Adv. 6, p. 32598.
Liu et al., 2012, Chem. Soc. Rev. 41, p. 2308.
Liu et al., 2012, Greenhouse Gases Sci. Technol. 2, p. 239.
Mason et al., 2015, J. Am. Chem. Soc. 137, p. 4787.
McDonald et al., "Enhanced carbon dioxide capture upon incorporation of N, N'-dimethylethylenediamine in the metal-organic framework CuBTTri", 2011, Chem. Sci. 2, 2022.
McDonald et al., 2012, J. Am. Chem. Soc. 134, p. 7056.
McDonald et al., "Cooperative insertion of CO2 in diamine-appended metal-organic frameworks", 2015, Nature 519, p. 303.
Montoro et al., 2012, J. Mater. Chem. 22, p. 10155.
Planas et al., 2013, "The Mechanism of Carbon Dioxide Adsorption in an Alkylamine-Functionalized Metal-Organic Framework," J. Am. Chem. Soc. 135, pp. 7402-7405.

(56) References Cited

OTHER PUBLICATIONS

Rochelle, "Amine Scrubbing for CO2 Capture", 2009, Science 325, p. 1652.
Sabouni et al., 2014, Environ. Sci. Pollut. Res. 21, p. 5427.
Samanta et al., 2012, Ind. Eng. Chem. Res. 51, p. 1438.
Sayari and Belmabkhout, 2010 J. Am. Chem. Soc. 132, p. 6312.
Serna-Guerrero et al., 2008, Ind. Eng. Chem. Res. 47, 9406.
Siegelman, R. et al., "Controlling Cooperative CO2 Adsorption in Diamine-Appended Mg 2 (dobpdc) Metal-Organic Frameworks," Journal of the American Chemical Society, vol. 139, No. 30, Jul. 19, 2017, pp. 10526-10538.
Sumida et al., 2012, Chem. Rev. 112, p. 724.
Taylor et al., 2016, J. Am. Chem. Soc. 138, p. 15019.
Ünveren et al., 2017, Petroleum 3, p. 37.
Vlaisavljevich, 2015, Chem, Sci. 6, 5177.
Wang and LeVan, 2010, J. Chem. Eng. Data 55, p. 3189.
Woerner, et al., "Simultaneous in Situ X-ray Diffraction and Calorimetric Studies as a Tool To Evaluate Gas Adsorption in Microporous Materials", 2016, J. Phys. Chem. C 120, p. 360.
Xiao et al., "Pore Environment Effects on Catalytic Cyclohexane Oxidation in Expanded Fe2(dobdc) Analogues", 2016, J. Am. Chem. Soc. 138, p. 14371.
Yu et al., 2017, Chem. Rev., (DOI: 10.1021/acs.chemrev.6b0062).
Zhou et al., "Introduction to Metal-Organic Frameworks", 2012, Chem. Rev. 112, p. 673.
Extended European Search Report for European Application No. 118753707.1 dated Nov. 19, 2020, 6 pages.

* cited by examiner

AMINE-APPENDED METAL-ORGANIC FRAMEWORKS EXHIBITING A NEW ADSORPTION MECHANISM FOR CARBON DIOXIDE SEPARATIONS

CROSS REFERENCE TO RELATED APPLICATION

This application is a Continuation of U.S. application Ser. No. 16/481,039, filed Jul. 25, 2019, which is a 371 of PCT/US2018/018541, filed Feb. 17, 2018, which claims priority to U.S. Provisional Patent Application No. 62/460,548, entitled "AMINE-APPENDED METAL-ORGANIC FRAMEWORKS EXHIBITING A NEW ADSORPTION MECHANISM FOR CARBON DIOXIDE SEPARATONS," filed Feb. 17, 2017, all of which are hereby incorporated by reference in entirety.

STATEMENT OF GOVERNMENT RIGHTS

This invention was made with government support under Grant Number DE-SC0001015 awarded by the Department of Energy. The government has certain rights in the invention.

FIELD OF THE PRESENT DISCLOSURE

The present application relates to adsorbents that enable effective capture of $CO_2$ at low partial pressures while being regenerable at moderate temperatures (e.g., 95-100° C.) with a low regeneration energy for carbon capture applications.

BACKGROUND OF THE PRESENT DISCLOSURE

Rising atmospheric levels of greenhouse gases, primarily $CO_2$, are linked to global climate change. See, Pachauri et al., 2014, "Climate Change 2014: Synthesis Report. Contribution of Working Groups I, II and III to the Fifth Assessment Report of the Intergovernmental Panel on Climate Change; IPCC: Geneva, Switzerland," pp. 1-151. In particular, the combustion of coal for energy generation accounts for approximately 30% of global $CO_2$ emissions. See, Quadrelli and Peterson, 2007, Energy Policy 35, 5938. Despite this, coal is projected to remain a major energy source in the near future, especially in rapidly industrializing nations. See, Quadrelli and Peterson, Id., and Akpan and Akpan, 2012, Int. J. Energy Econ. Policy 2, 21. Therefore, postcombustion carbon capture and sequestration (CCS) from coal flue gas, which consists of $CO_2$ (15-16%), $O_2$ (3-4%), $H_2O$ (5-7%), $N_2$ (70-75%), and trace impurities (e.g., $SO_x$, $NO_x$) at ambient pressure (Granite and Pennline, 2002, Ind. Eng. Chem. Res. 41, 5470) is needed to reduce global $CO_2$ emissions during the transition to cleaner energy sources. See, Pachauri et al., 2014, "Climate Change 2014: Synthesis Report. Contribution of Working Groups I, II and III to the Fifth Assessment Report of the Intergovernmental Panel on Climate Change; IPCC: Geneva, Switzerland," 1-151; Senftle and Carter, 2017, Acc. Chem. Res. 50, p. 472; Chu, 2009, Science 325, 1599; and Haszeldine, 2009, Science 325, 1647. Because 60-70% of the cost of CCS is accrued during the $CO_2$ separation stage, the development of improved adsorbents for carbon capture stands to limit substantially the rise in cost of electricity upon implementation of CCS. See Bhown and Freeman, 2011, Environ. Sci. Technol. 45, 8624; and House et al., 2009, Energy Environ. Sci. 2, 193. Specifically, a temperature swing adsorption (TSA) process requires an adsorbent that (i) selectively adsorbs $CO_2$ under typical coal flue gas conditions (150 mbar of $CO_2$ at 40° C.), (ii) captures 90% of the $CO_2$ from the stream, (iii) is regenerable at low temperatures under pure $CO_2$ to minimize regeneration costs, (iv) displays fast adsorption/desorption kinetics, and (v) possesses long-term stability to both water and adsorption/desorption cycling. See, House, 2009, Energy Environ. Sci. 2, 193; and Drage et al., 2012, Mater. Chem. 22, 2815.

The most widely employed sorbents for CCS are aqueous solutions of organic amines, such as monoethanolamine (MEA), which selectively react with $CO_2$ to form ammonium carbamate and/or bicarbonate species. See, Bhown and Freeman, 2011, Environ. Sci. Technol. 45, 8624; Boot-Handford, 2014, Energy Environ. Sci. 7, 130; and Rochelle, 2009, Science 325, 1652. However, amine solutions are prone to oxidative and thermal degradation (See, Boot-Handford, 2014, Energy Environ. Sci. 7, 130; Fredriksen and Jens, 2013, Energy Procedia, 37, 1770; and Gouedard, 2012, Int. J. Greenhouse Gas Control 10, 244) and suffer from low $CO_2$ working capacities, contributing to an underisable increase in the cost of electricity if employed for CCS. See, Bhown and Freeman, 2011, Environ. Sci. Technol. 45, 8624; House, 2009, Energy Environ. Sci. 2, 193; and Finkeenrath, 2011, "Cost and Performance of Carbon Dioxide Capture from Power Generation," International Energy Agency). To address these issues, solid adsorbents, including porous carbons, silicas, zeolites, and metal-organic frameworks, have been investigated as promising alternatives due to their high thermal stabilities and potentially lower regeneration energies. See, for example, Senftle and Carter, 2017, Acc. Chem. Res. 50, 472; Drage et al., 2012, Mater. Chem. 22, 2815; Yu et al., 2017, Chem. Rev. 117, 9674; Lee and Park, 2015, Ind. Eng. Chem. 23; Sabouni and Rohani, 2014, S. Environ. Sci. Pollut. Res. 21, 5427; Sumida et al., 2012, Chem. Rev. 112, 724; Liu et al., 2012, Greenhouse Gases: Sci. Technol. 2, 239; Samanta et al., 2012, Ind. Eng. Chem. Res. 51, 1438; and D'Alessandro, et al., 2010, Angew. Chem., Int. Ed. 49, 6058). Studies have revealed that most of these adsorbents are not applicable for CCS due to hydrolytic instability and/or competitive binding of water to the $CO_2$ adsorption sites. See, for example, Yu et al., 2017, Chem. Rev. 117, 9674; Sabouni et al., 2014, Environ. Sci. Pollut. Res. 21, 5427; Sumida et al., 2012, Chem. Rev. 112, 724; Liu et al., 2012, Greenhouse Gases: Sci. Technol. 2, 239; Samanta et al., Ind. Eng. Chem. Res. 51, 1438; D'Alessandro et al., 2012, Angew. Chem., Int. Ed. 49, 6058; Woerner, 2016, Phys. Chem. C 120, 360; Mason et al., 2015, J. Am. Chem. Soc. 137, 4787; Burtch, 2014, Chem. Rev. 114, 10575; Liu et al., 2012, Chem. Soc. Rev. 41, 2308; Wang and LeVan, 2010, Chem. Eng. Data 55, 3189.

On the other hand, amine-functionalized adsorbents (Lee and Park, 2015, J. Ind. Eng. Chem. 23, 1; Sumida et al., 2012, Chem. Rev. 112, 724; Samanta, 2012, Ind. Eng. Chem. Res. 51, 1438; D'Alessandro et al., 2010, Angew. Chem., Int. Ed. 2010, 49, 6058; Unveren et al., 2017, Petroleum 3, 37; Kim et al., 2016, Energy Environ. Sci. 9, 1803; Lin et al., 2016 RSC Adv. 2016, 6, 32598; Bollini et al., 2011, J. Mater. Chem. 21, 15100) can offer both high $CO_2$ selectivity and enhanced performance under humid conditions (Mason, 2015, J. Am. Chem. Soc., 137, 4787; Kim et al., 2016, Energy Environ. Sci. 9, 1803; Didas, 2014, J. Phys. Chem. Lett. 5, 4194; Bacsik, 2011, Langmuir 27, 11118; Sayari and Belmabkhout, 2010, J. Am. Chem. Soc. 132, 6312; and Sema-Guerrero, 2008, Ind. Eng. Chem. Res. 47, 9406) but they often exhibit slow adsorption kinetics (Mason, 2015, J. Am. Chem. Soc. 137, 4787) and require high regeneration temperatures. Thus, there remains an ongoing need for new adsorbents that perform well under humid conditions and can be regenerated at moderate temperatures under pure $CO_2$.

A new class of amine-functionalized adsorbents prepared by appending diamines to the open metal sites of metal-organic frameworks has been investigated. See, Siegelman, 2017, J. Am. Chem. Soc. 139, 10526; McDonald et al., 2015 Nature 519, 303; McDonald, 2012, J. Am. Chem. Soc. 134, 7056; Drisdell et al., 2015, Phys. Chem. Chem. Phys. 17, 21448; McDonald, 2011, Chem. Sci. 2, 2022; Demessence et al., 2009, J. Am. Chem. Soc. 131, 8784; Lee et al., 2017, ChemSusChem 10, 541; Lee et al., 2015, Chem. Sci. 6, 3697; Lee et al., 2014 Energy Environ. Sci. 7, 744; Liao et al., 2016, Chem. Sci. 7, 6528; Darunte et al., 2016, Sustainable Chem. Eng. 4, 5761; Yeon et al., 2015, J. Mater. Chem. A 3, 19177; Cao et al., 2013, Environ. Sci. 25, 2081; Hu et al., 2014, ChemSusChem 7, 734; Lin et al., 2014, J. Mater. Chem. A 2014, 2, 14658; Choi et al., 2012, J. Phys. Chem. Lett. 3, 1136; Montoro et al. 2012, J. Mater. Chem. 2012, 22, 10155). Metal organic frameworks—MOFs—are a type of coordination polymer having extended three dimensional framework structures. See, Morris and Wheatley, 2008, Angew. Chem. Int. Ed. 47, 4966. Metal-organic frameworks (MOFs) are porous crystalline materials prepared by the self-assembly of metal cations and polytopic ligands. MOFs can have large pore volumes and apparent surface areas (e.g., 8,000 $m_2/g$).

Alkylethylenediamine-appended variants of $Mg_2$(dobpdc) (dobpdc$^{4-}$=4,4'-dioxidobiphenyl-3,3'-dicarboxylate), a metal-organic framework (FIG. 1) possessing hexagonal one-dimensional channels lined with coordinatively unsaturated $Mg^{2+}$ sites, adsorb $CO_2$ via a unique cooperative mechanism involving the formation of ammonium carbamate chains (FIG. 2A). See, Siegelman et al., 2017, J. Am. Chem. Soc. 139, 10526; and McDonald et al., 2015, Nature 2015, 519, 303. This cooperative adsorption leads to step-shaped isotherms that enable high working capacities in a TSA process (FIG. 2B). In addition, previous mixed-gas equilibrium adsorption measurements indicate that these materials maintain their high capacity for $CO_2$ under humid conditions, a critical challenge for carbon capture. See Mason et al., 2015, J. Am. Chem. Soc. 137, 4787; McDonald et al., 2015, Nature 519, 303; and Jo et al., 2017, ChemSusChem 10, 541.

Owing to their highly exothermic differential enthalpies of adsorption, $Mg_2$(dobpdc) variants appended with primary-secondary (1°, 2°) alkylethylenediamines (Siegelman et al., 2017, J. Am. Chem. Soc. 139, 10526), secondary-secondary (2°, 2°) alkylethylenediamines (Siegelman et al., 2017, J. Am. Chem. Soc. 2017, 139, 10526; McDonald et al., 2015, Nature 519, 303; McDonald et al., 2012, J. Am. Chem. Soc. 134, 7056), and most primary-primary (1°, 1°) alkylethylenediamines (Jo et al., 2017, ChemSusChem 10, 541; Lee et al., 2014, Energy Environ. Sci. 7, 744) display step-shaped adsorption of $CO_2$ at very low partial pressures (≤1 mbar of $CO_2$ at 40° C.). As a result of their low step pressures, these adsorbents are well-suited for carbon capture from dilute streams such as air. However, this strong adsorption results in high desorption temperatures under pure $CO_2$ (140-200° C.), which greatly increases the regeneration costs associated with the use of these adsorbents. In contrast, primary-tertiary (1°, 3°) diamine-appended variants of $Mg_2$(dobpdc) can be regenerated at lower temperatures (75° C.), but due to their relatively high step pressures (≥100 mbar, 40° C.) they would capture only ≤30% of the $CO_2$ from a coal flue gas stream. A promising adsorbent would display step-shaped adsorption at ~15 mbar of $CO_2$ at 40° C. to enable 90% capture from a coal flue gas stream containing 150 mbar of $CO_2$ and minimal adsorption under 1 bar of $CO_2$ at ≤100° C. to enable regeneration of the $CO_2$-saturated bed with lower grade steam. More specifically, the ideal adsorbent would possess a free energy of adsorption ($\Delta$gads) as close as possible to that required for a $CO_2$ adsorption step (pstep) at 15 mbar at 40° C. [−10.9 kJ/mol, as determined from $\Delta$gads=RT ln(pstep/p0) with $p_0$=1 bar] (Siegelman, 2017, J. Am. Chem. Soc. 139, 10526) which will enable effective capture of $CO_2$ while the energy required for desorption is minimized. None of the alkylethylenediamine-appended variants of $Mg_2$(dobpdc) reported to date meet these criteria.

As such, given the above background adsorbents that show step-shaped adsorption of carbon dioxide, such as variants of the metal-organic framework $Mg_2$(dobpdc) (dobpdc$^{4-}$=4,4'-dioxidobiphenyl-3,3'-dicarboxylate) functionalized with alkylethylenediamines, offer promise for carbon capture applications. Such adsorbents are disclosed in McDonald et al., 2015, "Cooperative insertion of $CO_2$ in diamine-appended metal-organic frameworks," Nature 519, p. 303; and Long et al., "Alkylamine functionalized metal-organic frameworks for composite gas separations," International Publication Number WO2013059527 A1, Apr. 25, 2013; and McDonald, 2012, "Capture of Carbon Dioxide from Air and Flue Gas in the Alkylamine-Appended Metal-Organic Framework mmen-$Mg_2$(dobpdc)," J. Am. Chem. Soc. 134, p. 7056, each of which is hereby incorporated by reference. Such adsorbents are illustrated in FIG. 1.

These materials adsorb $CO_2$ by formation of ammonium carbamate chains, as illustrated in FIG. 2A, which leads to step-shaped adsorption isotherms that enable high working capacities, as illustrated in FIG. 2B. However, these materials are broadly split into two groups: those with low step pressures, which can achieve high capture rates of $CO_2$ but require regeneration at high temperatures (130-200° C.), and those with high step pressures, which can be regenerated at low temperatures (75° C.) but achieve very low capture rates from $CO_2$ mixtures.

Accordingly, what is needed in the art are adsorbents that enable effective capture of $CO_2$ at low partial pressures (e.g., a $CO_2$ adsorption step occurring at approximately 15 mbar at 40° C.) while being regenerable at moderate temperatures (95-100° C.) with a low regeneration energy. A regeneration temperature of <100° C. is ideal because it enables the adsorbent bed to be heated with low-grade steam, which greatly decreases the costs of carbon capture applications.

SUMMARY

Herein, a unique class of adsorbents is disclosed that are based on appending substituted-1,3-propanediamines to metal-organic frameworks. The metal-organic frameworks comprise a plurality of divalent cations and a plurality of isotopic linkers. comprising a plurality of metal ions. An example of such adsorption materials is the diamine 2,2-dimethyl-1,3-propanediamine (dmpn) appended to $Mg_2$(dobpdc) which shows adsorption properties well-suited to carbon capture applications (FIG. 3), with $CO_2$ removal from coal flue gas and crude biogas demonstrated herein. In particular, this adsorbent enables effective capture of $CO_2$ at low partial pressures (e.g., the 40° C. $CO_2$ adsorption step occurs at approximately 15 mbar) while being regenerable at moderate temperatures (95-100° C.) with a low regeneration energy. A regeneration temperature of <100° C. is ideal because it enables the adsorbent bed to be heated with low-grade steam, which should greatly decrease the costs of carbon capture applications. Another example of such adsorption materials is the diamine 2,2-diethyl-1,3-propanediamine (DEPDA) appended to $Mg_2(dobpdc)$, which shows similar adsorption properties. It is disclosed herein that a change in adsorption mechanism from formation of ammonium carbamate chains to a mixed mechanism involving formation of ammonium carbamate chains and carbamic acid pairs enables these promising adsorption properties. This change in adsorption mechanism is identified by a change in the shape of the adsorption isotherm, as it becomes broader than for other adsorbents in this family, and also in the different response of these isotherms to increasing temperature, wherein the step becomes broader and shorter at higher temperatures.

As such, one embodiment of the present disclosure provides an adsorption material comprising a metal-organic framework that, in turn, comprises a plurality of metal cations and a plurality of polytopic organic linker. The adsorption material further comprises a plurality of ligands. Each respective ligand in the plurality of ligands is amine appended to a divalent cation in the plurality of divalent cations of the metal-organic framework. Each respective ligand in the plurality of ligands comprising a substituted 1,3-propanediamine. The adsorption material has a $CO_2$ adsorption capacity of greater than 2.50 mmol/g at a $CO_2$ partial pressure of 150 mbar, at 40° C. Further, the adsorption material is configured to regenerate (e.g., fully regenerate) at less than 120° C.

In some embodiments, each respective ligand in the plurality of ligands has the structure:

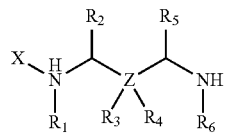

where, X indicates the amine of the respective ligand that is appended to a divalent cation in the plurality of divalent cations, Z is carbon, silicon, or germanium, and $R_1$, $R_2$, $R_3$, $R_4$, $R_5$, and $R_6$ are each independently selected from hydrogen, halogen, substituted or unsubstituted alkyl, substituted or unsubstituted heteroalkyl, substituted or unsubstituted aryl, substituted or unsubstituted heteroaryl, or unsubstituted heterocycloalkyl, with the provisos that when $R_3$ is hydrogen, $R_4$ is other than hydrogen or methyl, and when $R_4$ is H, $R_3$ is other than hydrogen or methyl.

In some embodiments, each respective ligand in the plurality of ligands has the structure:

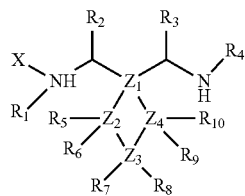

where X indicates the amine of the respective ligand that is appended to a divalent cation in the plurality of divalent cations, $Z_1$, is carbon, silicon, or germanium, $Z_2$, $Z_3$, and $Z_4$, are each independently carbon, silicon, germanium, sulfur or selenium, $R_1$, $R_2$, $R_3$, and $R_4$, are each independently selected from H, halogen, substituted or unsubstituted alkyl, substituted or unsubstituted heteroalkyl, substituted or unsubstituted aryl, substituted or unsubstituted heteroaryl, or substituted or unsubstituted heterocycloalkyl, and $R_5$, $R_6$, $R_7$, $R_8$, $R_9$ and $R_{10}$ are each independently selected from H, halogen, methyl, substituted methyl, ethyl, or substituted ethyl, with the provisos that when $Z_2$ is sulfur or selenium, $R_5$ and $R_6$ are not present, when $Z_3$ is sulfur or selenium, $R_7$ and $R_8$ are not present, and when $Z_4$ is sulfur or selenium, $R_9$ and $R_{10}$ are not present.

Another aspect of the present disclosure provides a method for abating $CO_2$ from a flue gas by contacting the flue gas with any of the adsorption materials disclosed herein to reversibly adsorb $CO_2$ from the flue gas thereby generating an adsorption material enriched for $CO_2$. The method further comprises thermally stripping a major portion of the $CO_2$ from the adsorption material enriched for $CO_2$ using a temperature swing adsorption method or a vacuum swing adsorption method. Suitable temperature swing adsorption methods and vacuum swing adsorption methods are disclosed in International Publication Number WO2013/059527 A1, which is hereby incorporated by reference.

Another aspect of the present disclosure provides a method for removing $CO_2$ from a biogas. The method comprises contacting the biogas with any of the adsorption materials disclosed herein to reversibly adsorb $CO_2$ from the biogas. In such embodiments, the biogas consists of between 25 percent to 65 percent $CO_2$ and the temperature of the biogas is up to 60° C. Further the $CH_4$ adsorption capacity of the adsorption material at 2 bar is less than 0.5 mmol/g at temperatures less than 75° C. In the method the contacting thereby generates an adsorption material enriched for $CO_2$ and a residual gas that is greater than 98 percent pure methane. In some such embodiments, the method further comprises stripping a major portion (e.g., more than 80 percent, more than 90 percent, more than 95 percent, more than 98 percent, more than 99 percent) of the $CO_2$ from the adsorption material enriched for $CO_2$ using a temperature swing adsorption method, a pressure swing adsorption method, a vacuum swing adsorption method, a concentration swing adsorption method, or a combination of these methods. Suitable temperature swing adsorption methods and vacuum swing adsorption methods are disclosed in International Publication Number WO2013/059527 A1, which is hereby incorporated by reference.

Another aspect of the present disclosure provides a method of sequestering carbon dioxide produced by a source. For instance, in some embodiments the source is a stream of gas that comprises carbon dioxide. The method comprises exposing the carbon dioxide containing stream to any of the adsorption materials of the present disclosure, whereby the carbon dioxide is reversibly sequestered into the adsorption material. In some such embodiments, the method further comprises regenerating the adsorption material enriched for $CO_2$ using a temperature swing adsorption method, vacuum swing adsorption, pressure swing adsorption, a concentration swing adsorption method, or combination thereof. Suitable temperature swing adsorption methods and vacuum swing adsorption methods are disclosed in International Publication Number WO2013/059527 A1, which is hereby incorporated by reference.

Figure 1:
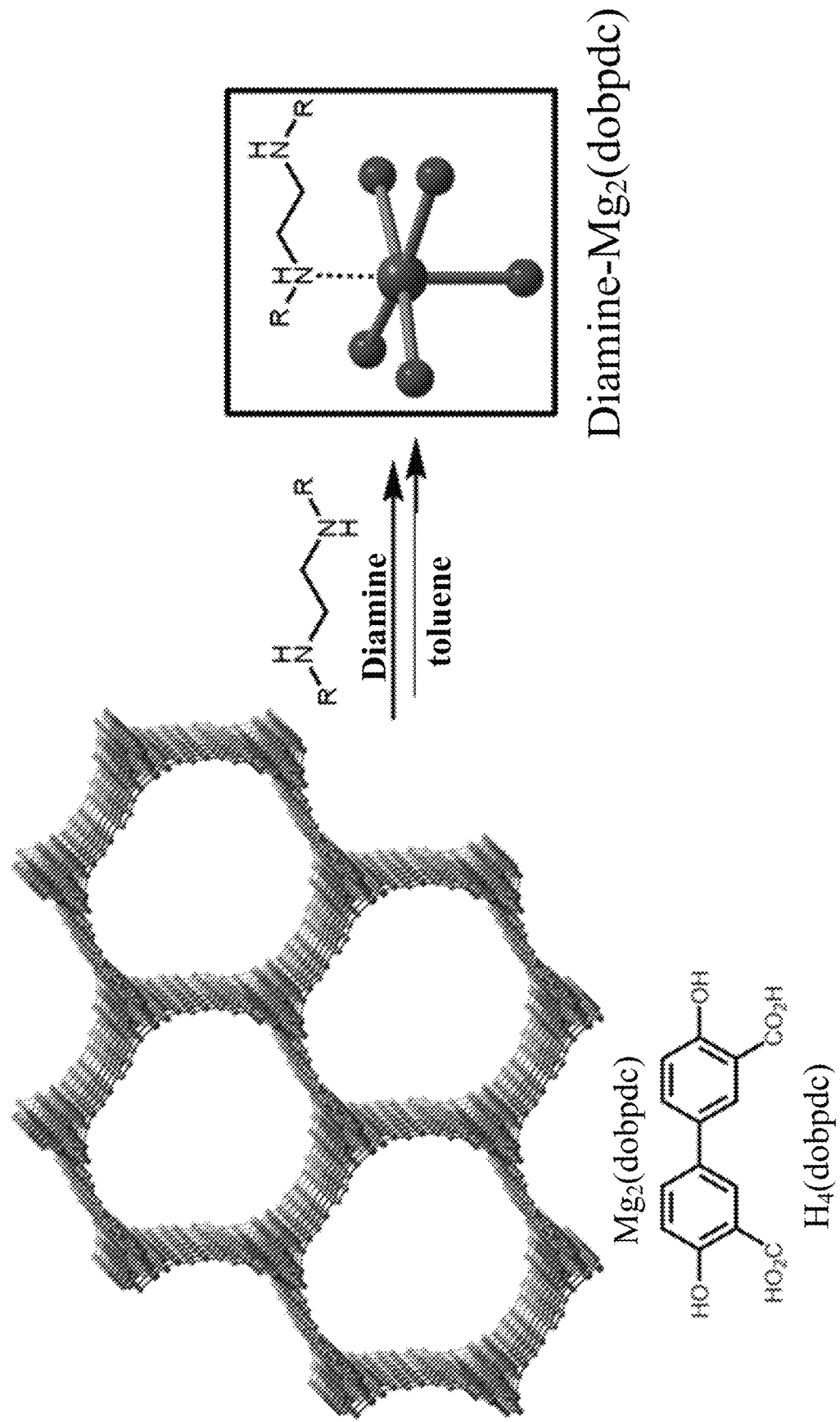
FIG. 1 illustrates ethylenediamine-appended variants of the metal-organic framework $Mg_2(dobpdc)$ ($dobpdc^{4-}$=4,4'- dioxidobiphenyl-3,3'-dicarboxylate) where dmpn-$Mg_2$(dobpdc) possesses a similar structure with the "diamine" changed to 2,2-dimethyl-1,3-propanediamine.
Figure 2A:
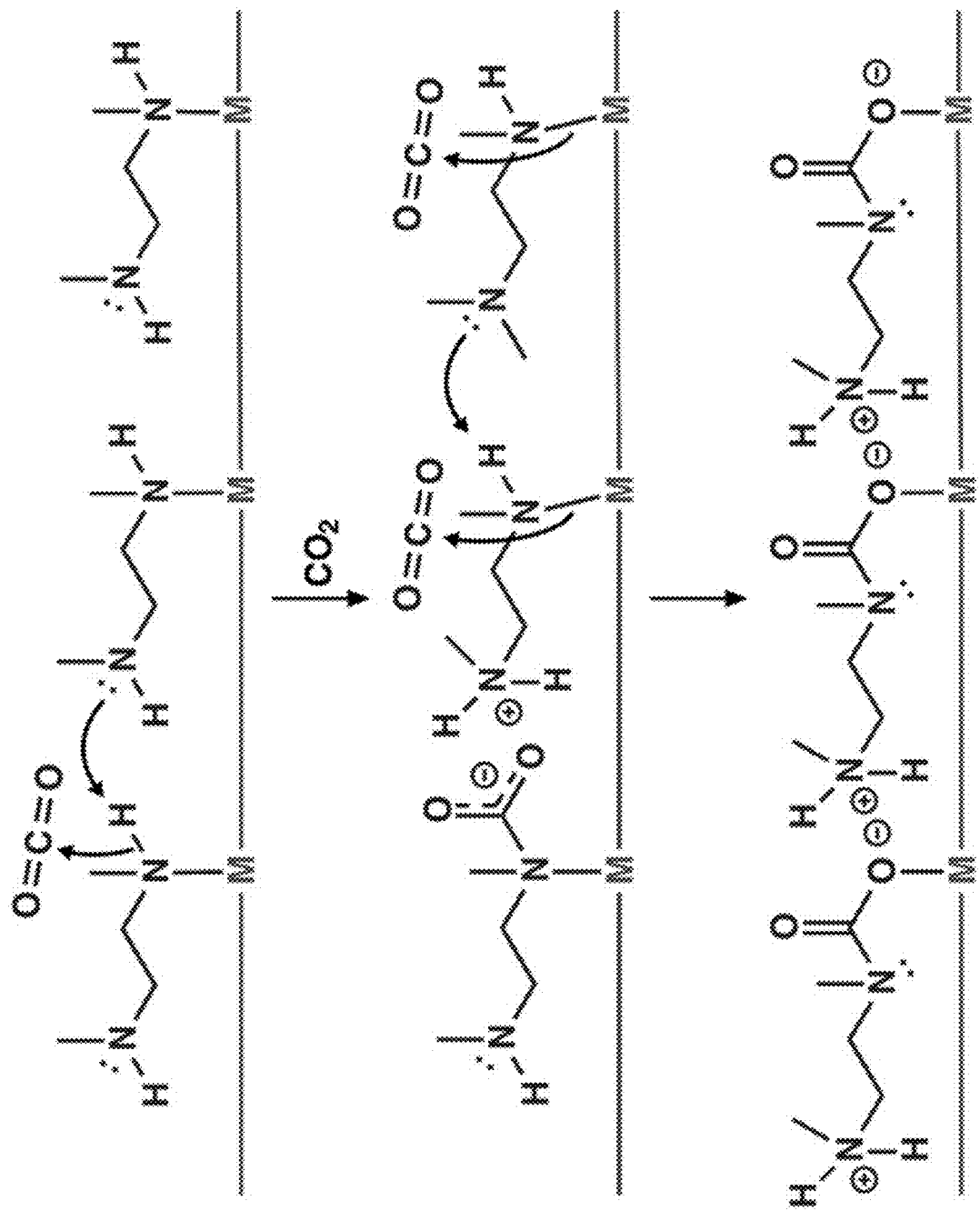

FIG. 2A illustrates cooperative formation of ammonium carbamate chains in ethylenediamine-appended variants of $Mg_2$(dobpdc).

Figure 2B:
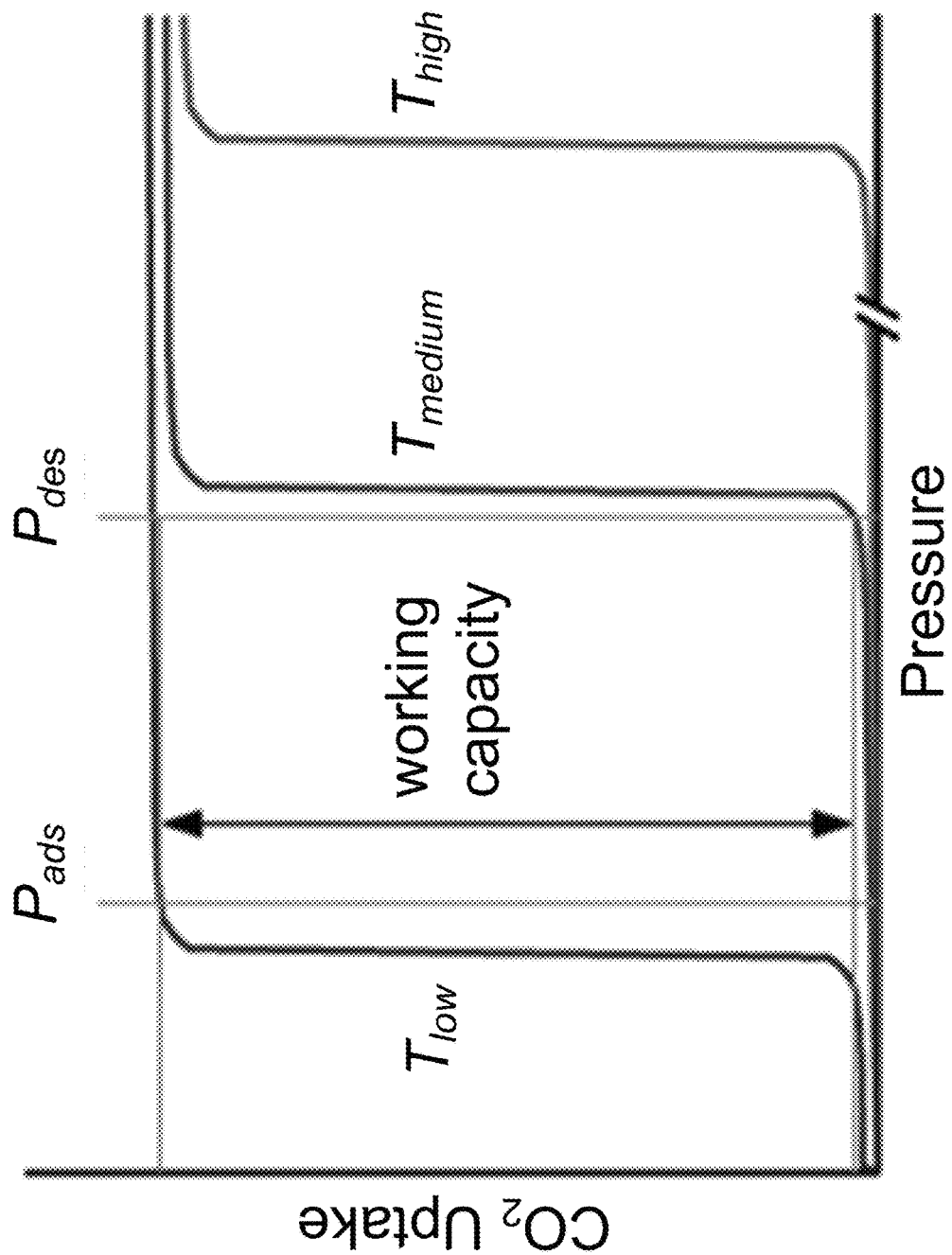

FIG. 2B illustrates how cooperative formation of ammonium carbamate chains in ethylenediamine-appended variants of $Mg_2$(dobpdc) lead to step-shaped $CO_2$ adsorption and desorption isotherms which enable high working capacities to be achieved.

Figure 2C:
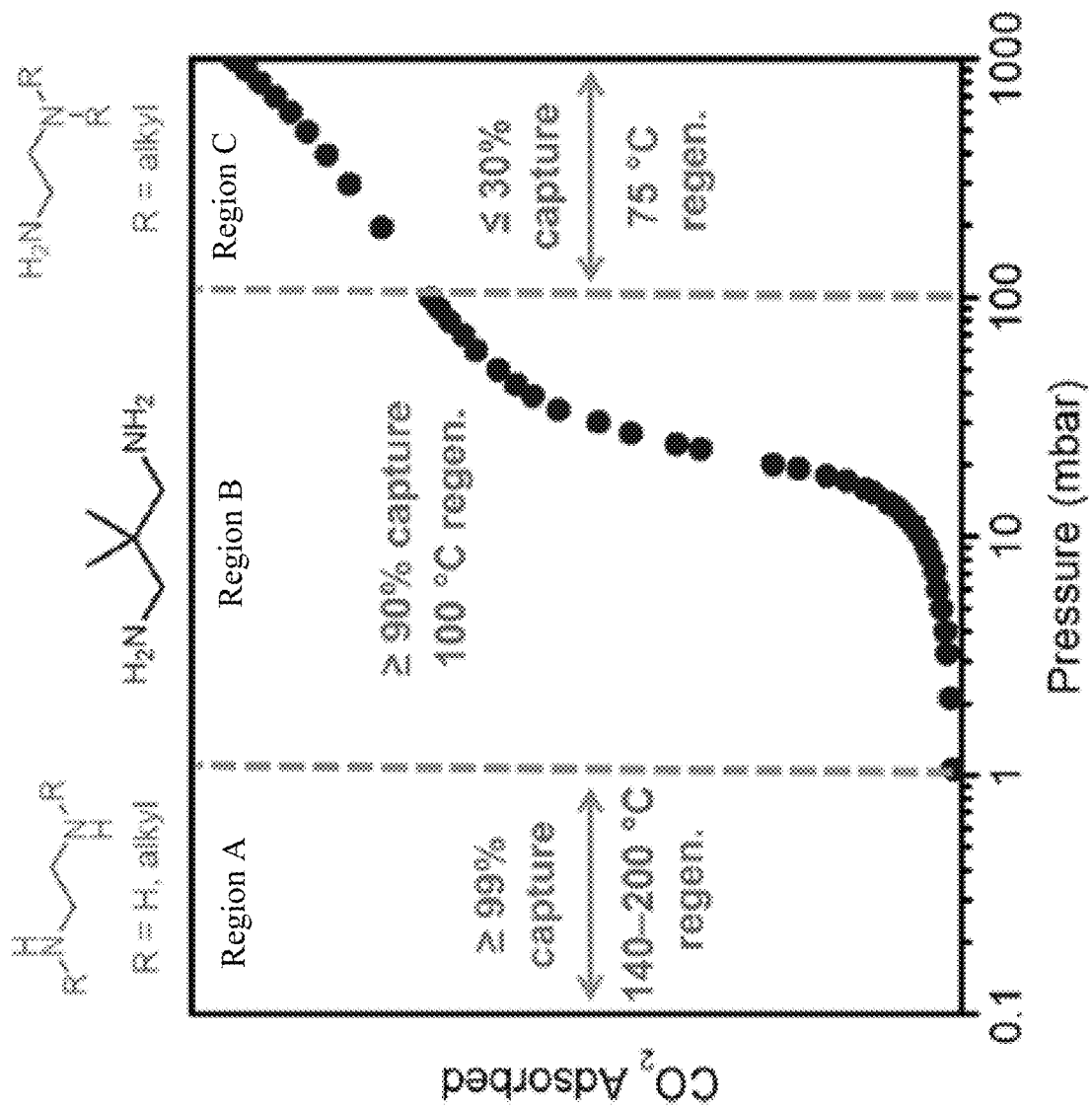

FIG. 2C summarizes of 40° C. $CO_2$ step pressures and regeneration temperatures under 1 bar of $CO_2$ for alkyldiamine-appended variants of $Mg_2$(dobpdc) in which compositions with properties described in region B have satisfactory properties and compounds with properties described in regions A and C have unsatisfactory properties in accordance with some embodiments of the present disclosure.

Figure 2D:
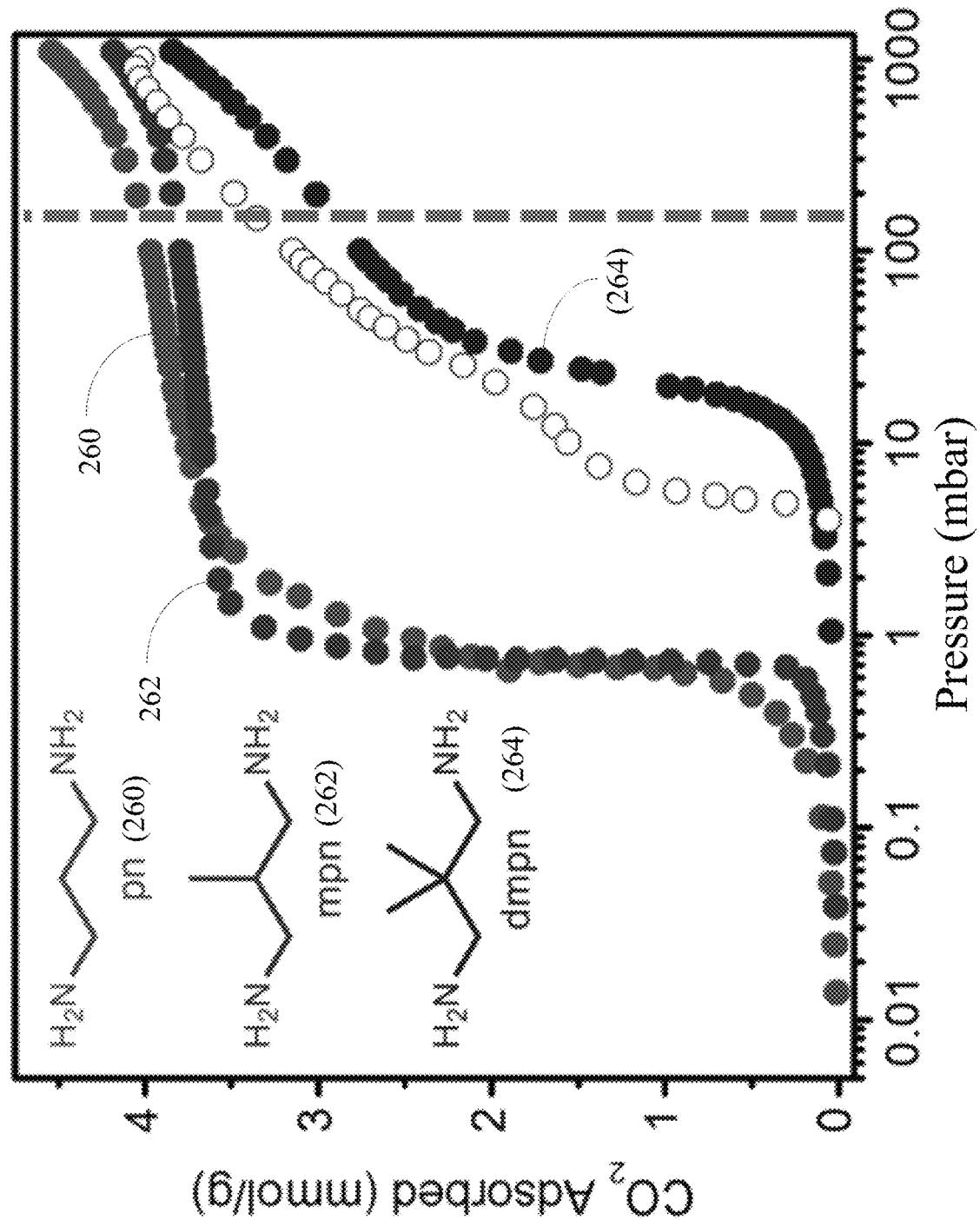

FIG. 2D illustrates (a) Isotherms for the adsorption of $CO_2$ at 40° C. $CO_2$ in pn-, mpn-, and dmpn-$Mg_2$(dobpdc) (desorption data shown with open circles). The dashed line indicates the approximate partial pressure of $CO_2$ in coal flue gas (150 mbar).

Figure 2E:
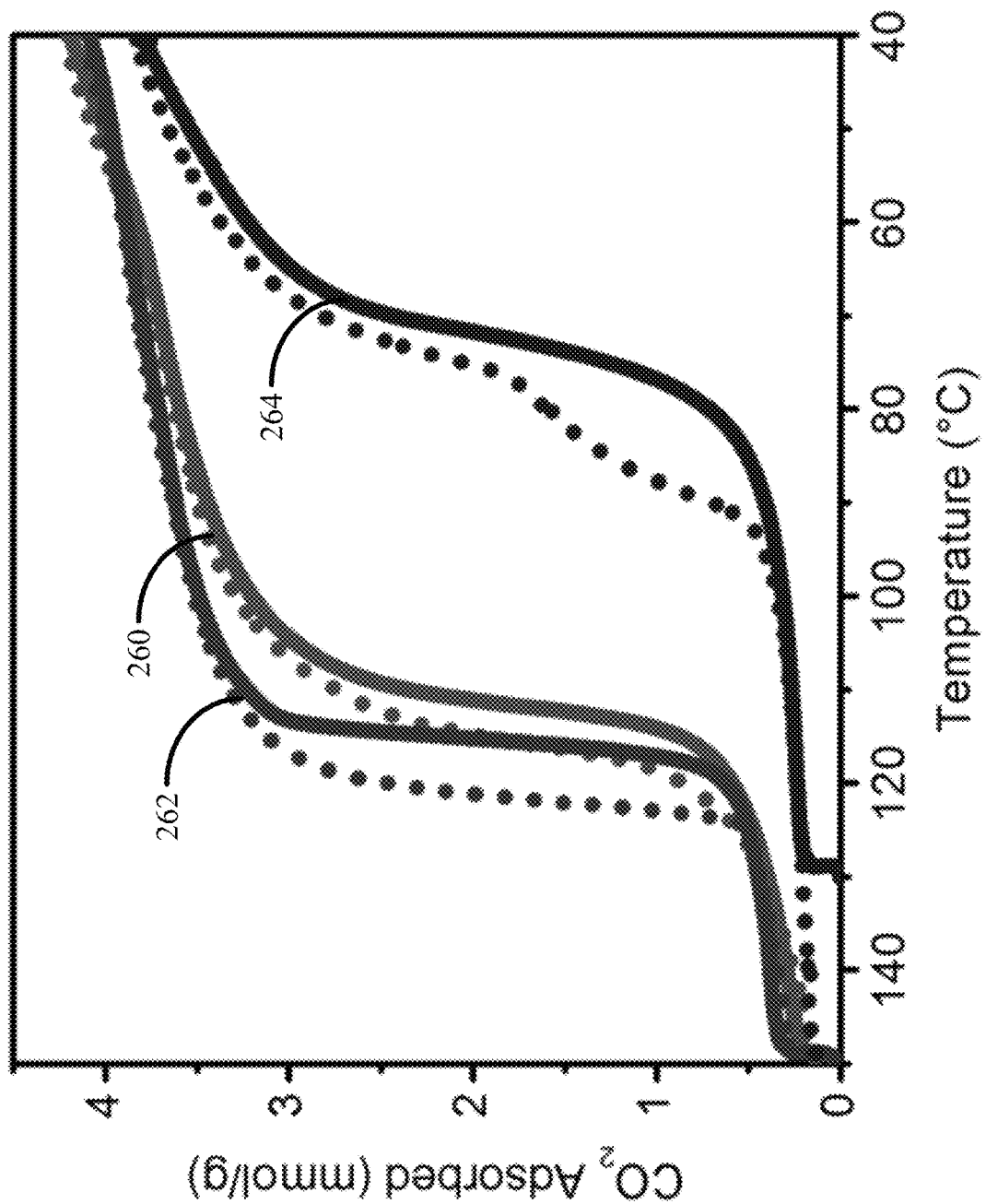

FIG. 2E illustrates (b) Adsorption (solid) and desorption (dotted) isobars of pn-(260), mpn-262), and dmpn-$Mg_2$(dobpdc) (264) under pure $CO_2$, as measured by thermogravimetric analysis.

Figure 3:
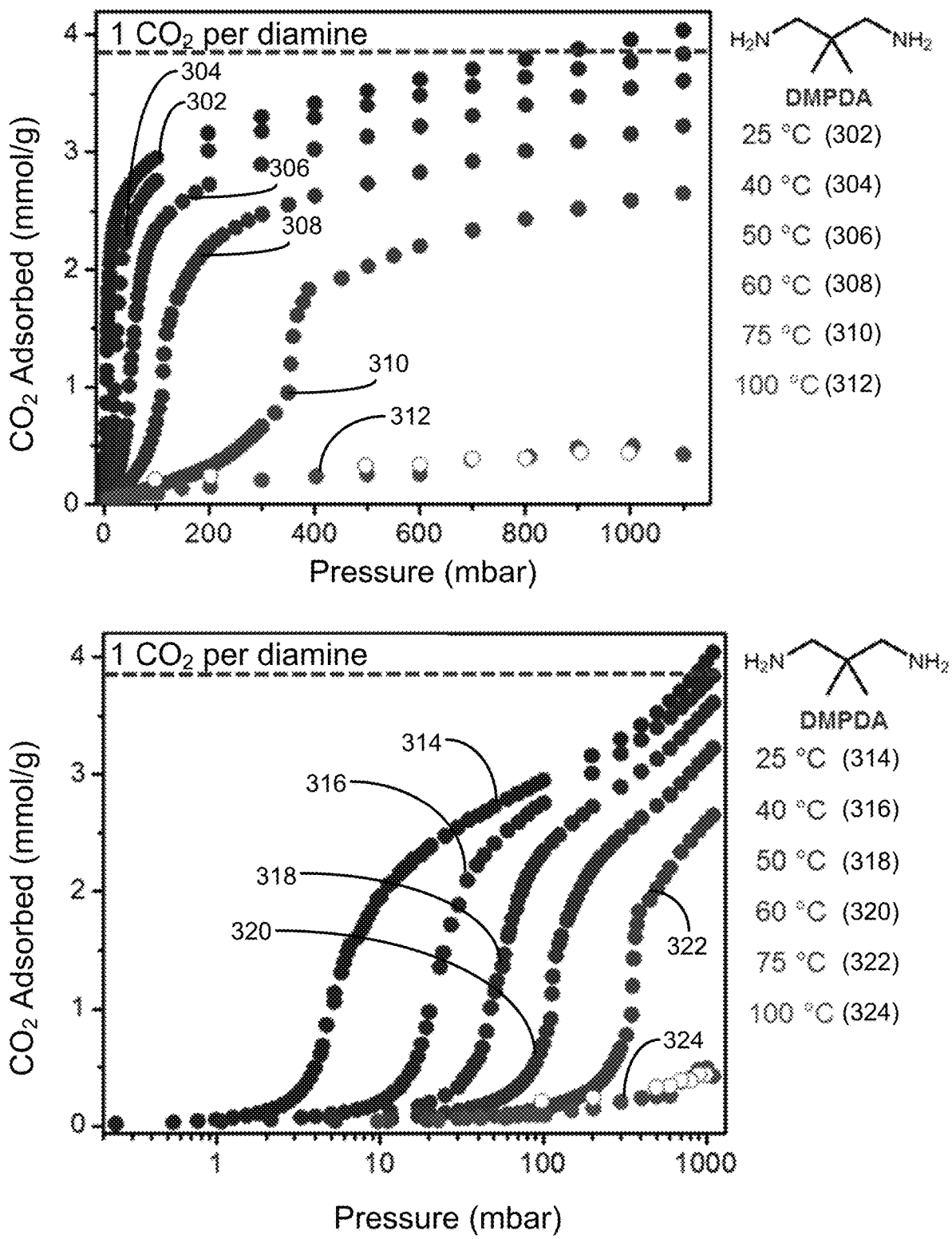

FIG. 3 illustrates $CO_2$ adsorption isotherms for dmpn-$Mg_2$(dobpdc) at 25, 40, 50, 60, 75, and 100° C., with desorption data at 100° C. shown with open circles, plotted on linear (top) and log (bottom) scales, in accordance with an embodiment of the present disclosure.

Figure 4:
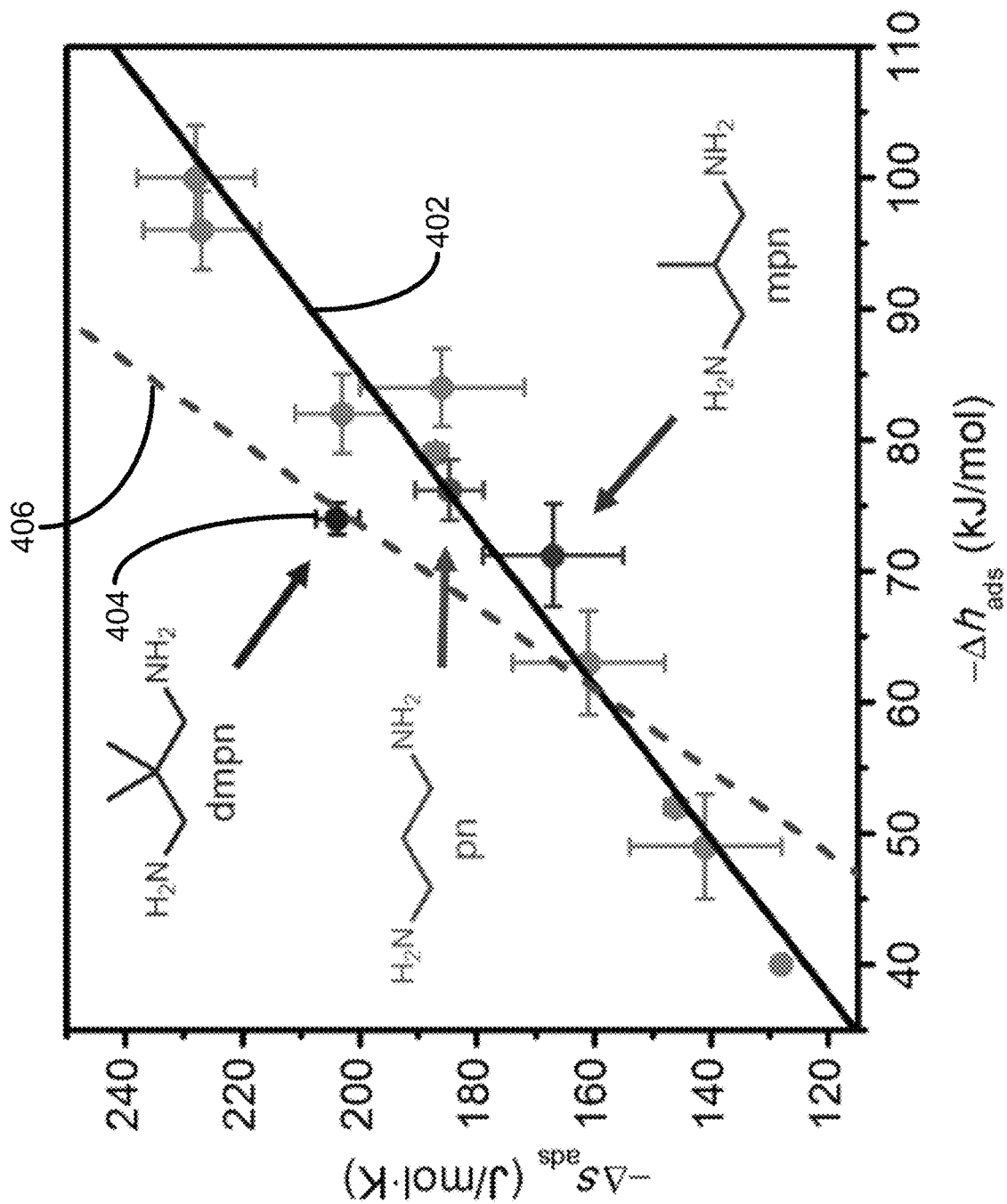

FIG. 4 illustrates the $CO_2$ differential adsorption entropy versus enthalpy for diamine-appended metal-organic frameworks that form ammonium carbamate chains and dmpn-$Mg_2$(dobpdc), here dmpn-$Mg_2$(dobpdc) is seen as an outlier on this plot, displaying a larger entropic penalty for $CO_2$ adsorption than expected given its enthalpy of adsorption, with differential enthalpies and entropies were calculated using the Clausius-Clapeyron relationships at a loading of 1 mmol/g (in the step), in accordance with the present disclosure.

Figure 5:
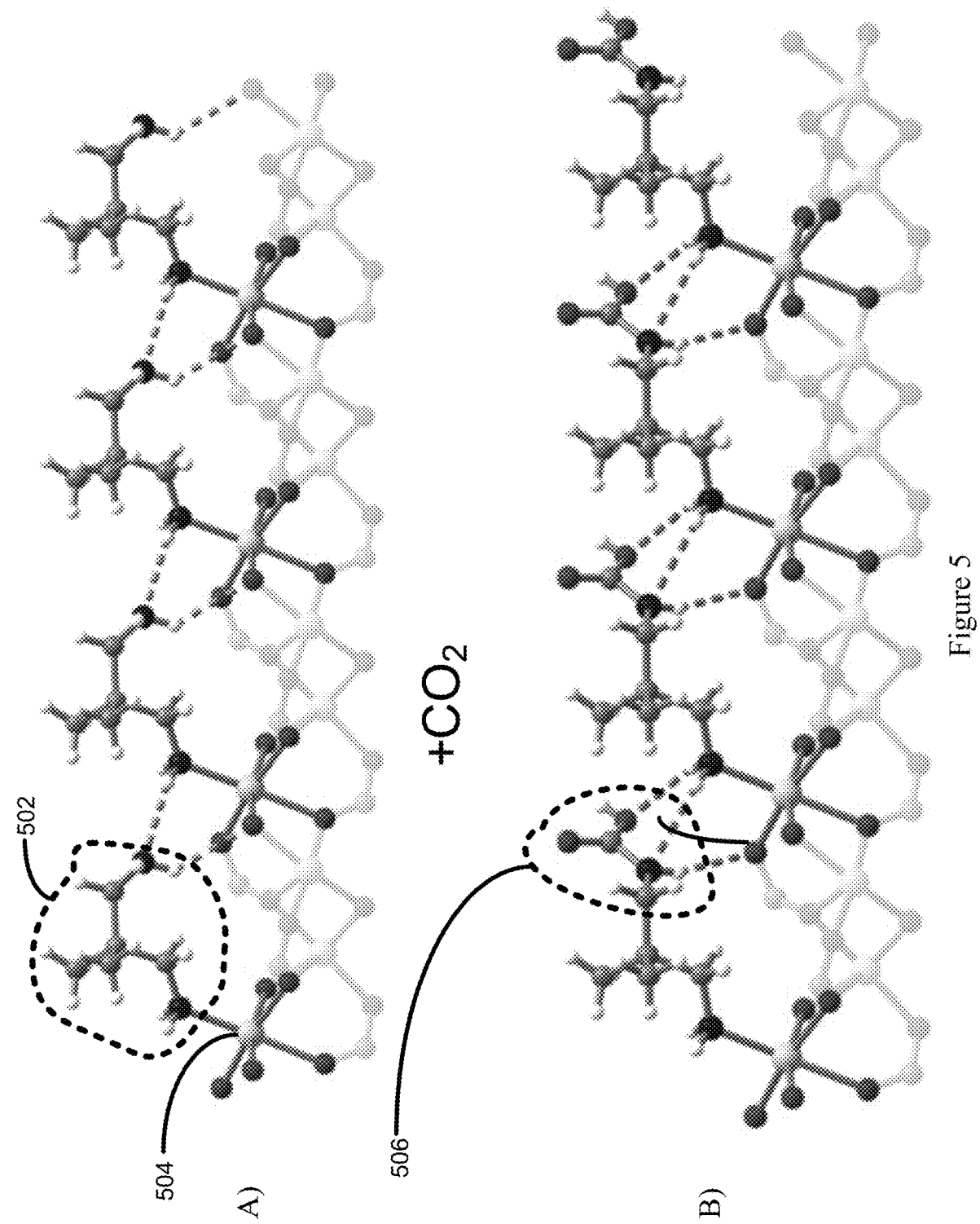

FIG. 5 illustrates a structural basis for the unique $CO_2$ adsorption mechanism for dmpn-$Zn_2$(dobpdc), in which panel a) provides the X-ray structure of dmpn-$Zn_2$(dobpdc) showing hydrogen-bonding between adjacent diamines down the c-axis whereas panel b) illustrates the structure of dmpn-$Zn_2$(dobpdc) upon exposure to $CO_2$, which leads to formation of carbamic acid pairs instead of ammonium carbamate chains, in accordance with an embodiment of the present disclosure.

Figure 6:
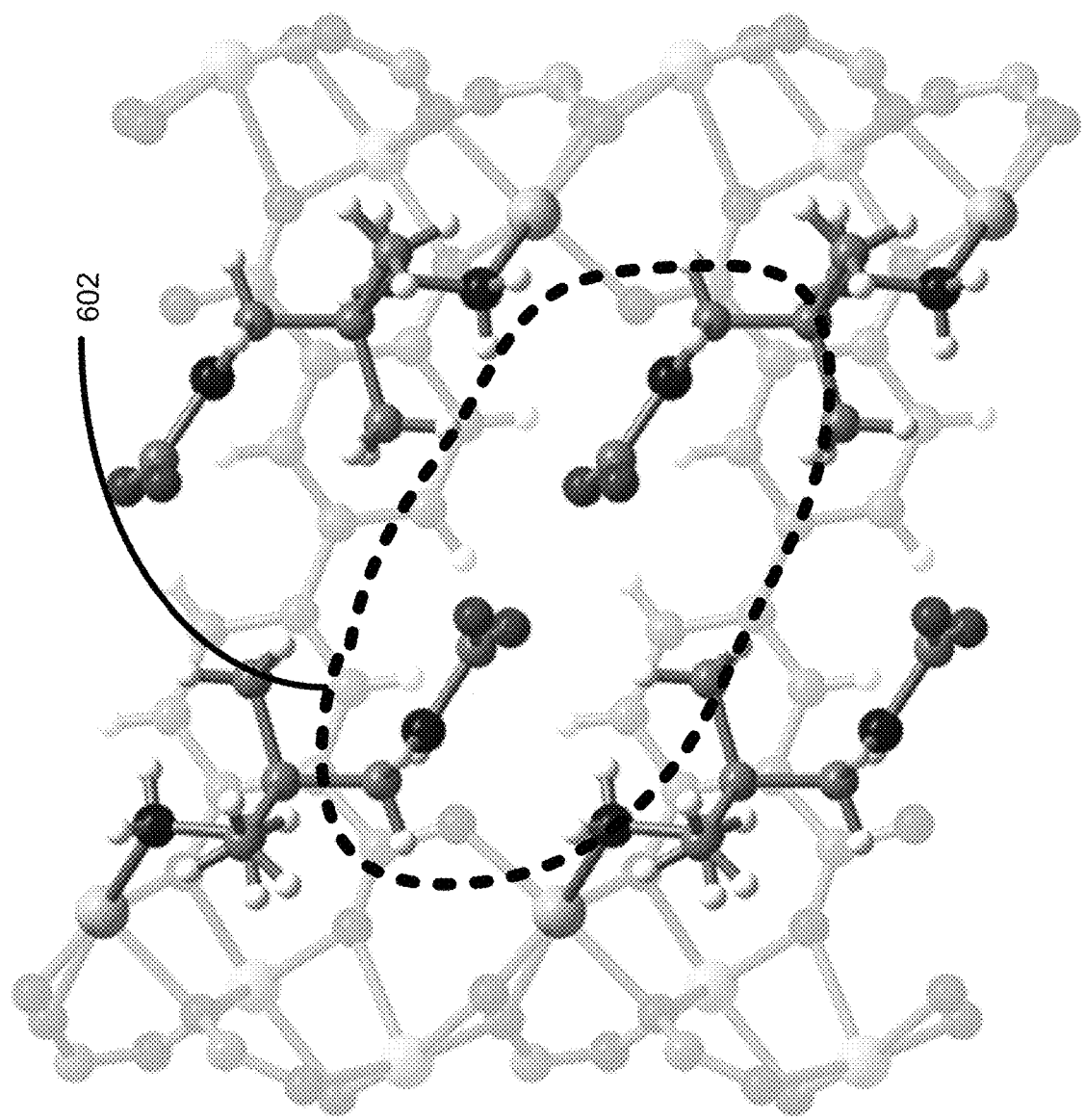

FIG. 6 further illustrates a structural basis for the unique $CO_2$ adsorption mechanism for dmpn-$Zn_2$(dobpdc) by providing a side view of two diagonally adjacent sets of diamines in dpmn-$Zn_2$(dobpdc) upon formation of carbamic acid pairs, in accordance with an embodiment of the present disclosure.

Figure 7:
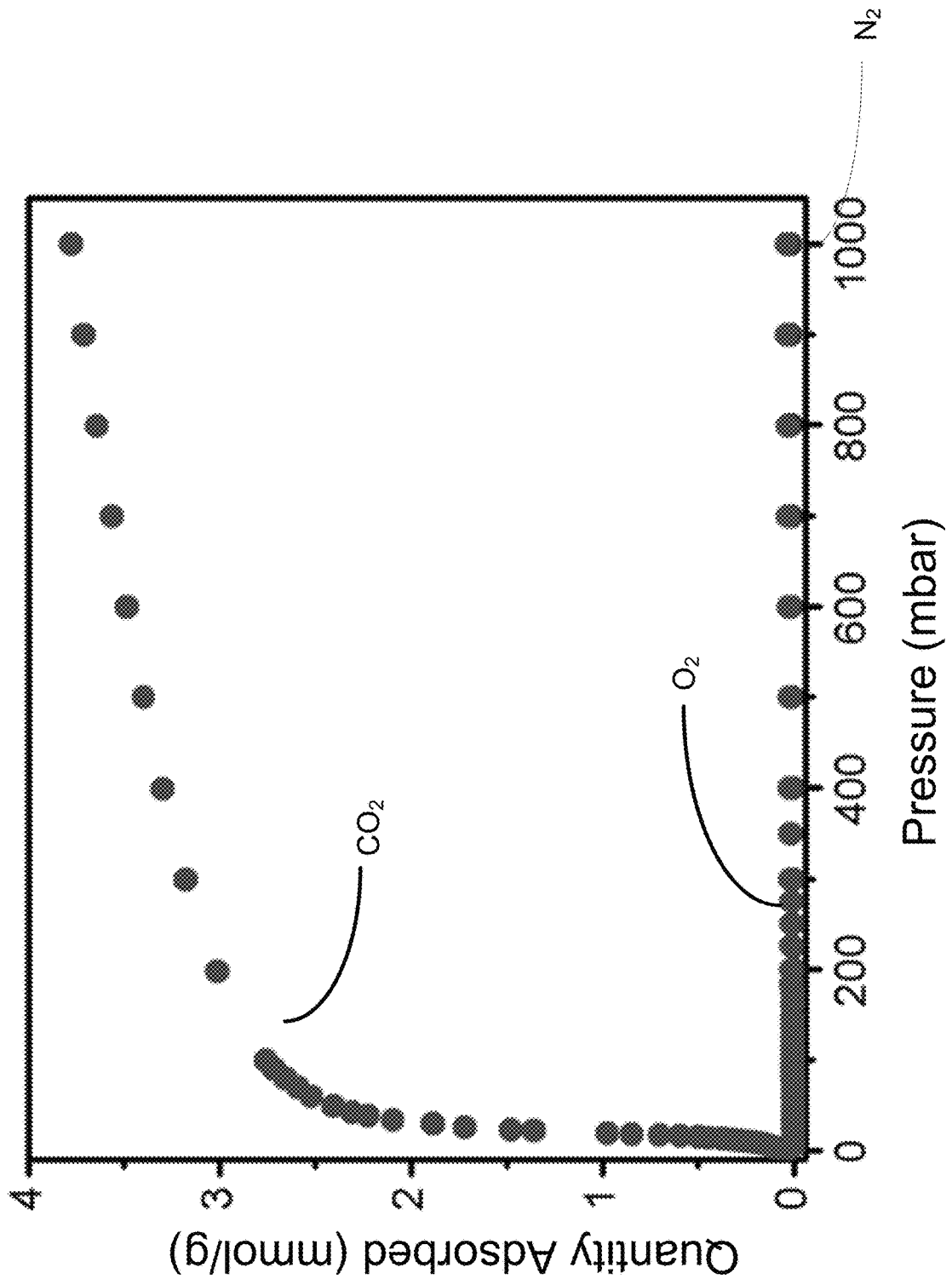

FIG. 7 illustrates the $CO_2$, $O_2$, and $N_2$ adsorption isotherms of dmpn-$Mg_2$(dobpdc) at 40° C. indicating adsorption capacities relevant to coal flue gas capture: $CO_2$: 2.91 mmol/g (150 mbar); $N_2$: 0.0165 mmol/g (750 mbar); $O_2$: 0.0015 mbar (40 mbar), in accordance with an embodiment of the present disclosure.

Figure 8:
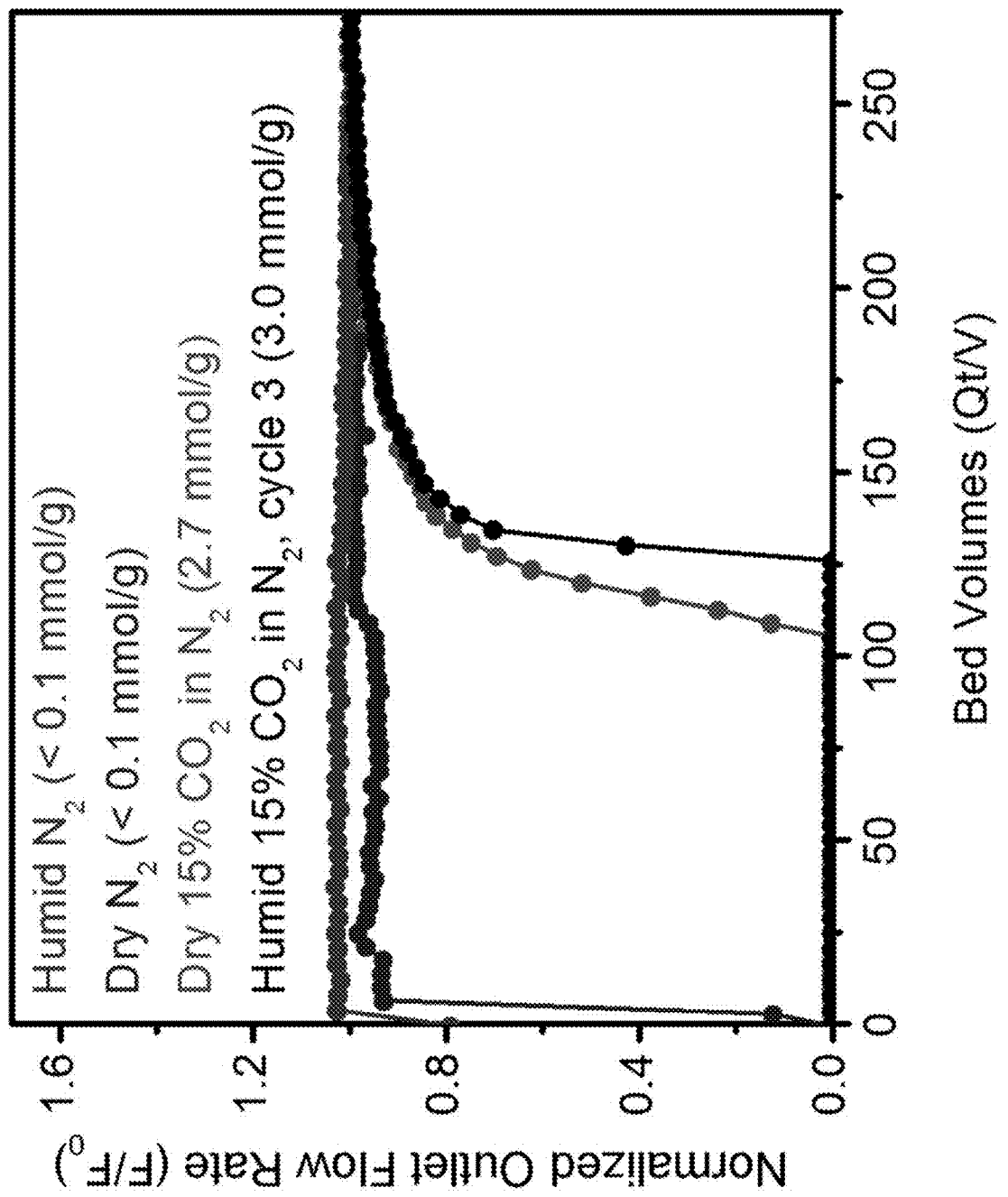

FIG. 8 illustrates 15% $CO_2$ in $N_2$ breakthrough measurement for dmpn-$Mg_2$(dobpdc) at 40° C., with a total feed pressure of 1 bar and a flow rate of 3.0 sccm, the calculated breakthrough capacities are 2.8 mmol/g $CO_2$ and 0.02 mmol/g $N_2$, the adsorbent bed was filled with He prior to switching the stream to 15 percent $CO_2$ in $N_2$, and a $CO_2/N_2$ selectivity of 690 was determined, in accordance with an embodiment of the present disclosure.

Figure 9:
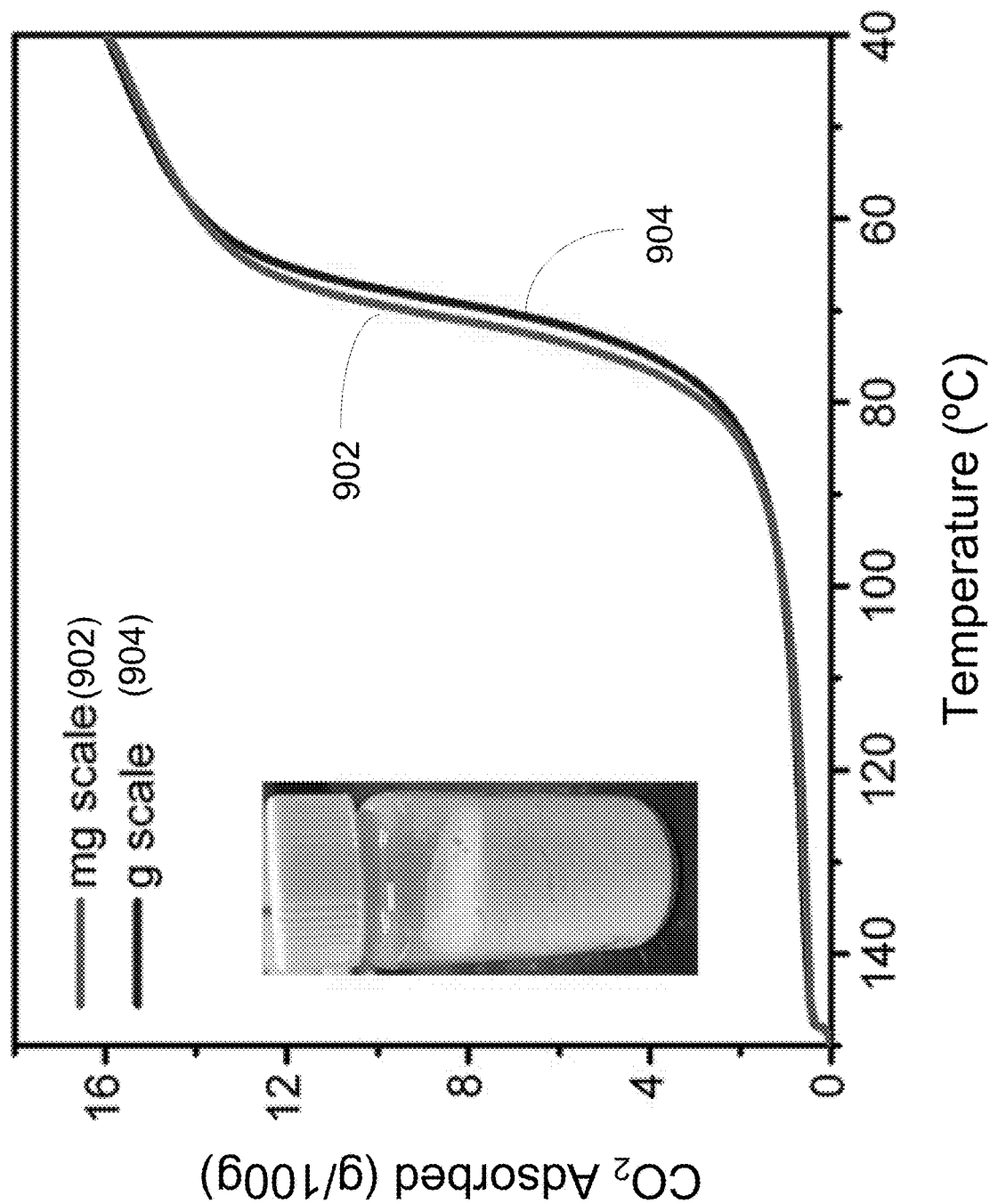

FIG. 9 illustrates the pure $CO_2$ isobar of dmpn-$Mg_2$(dobpdc) at atmospheric pressure prepared on mg (902) and 5 g (904) scale with an inset illustration of 5 grams of dpmn-$Mg_2$(dobpdc) prepared in a single batch, in accordance with an embodiment of the present disclosure.

Figure 10:
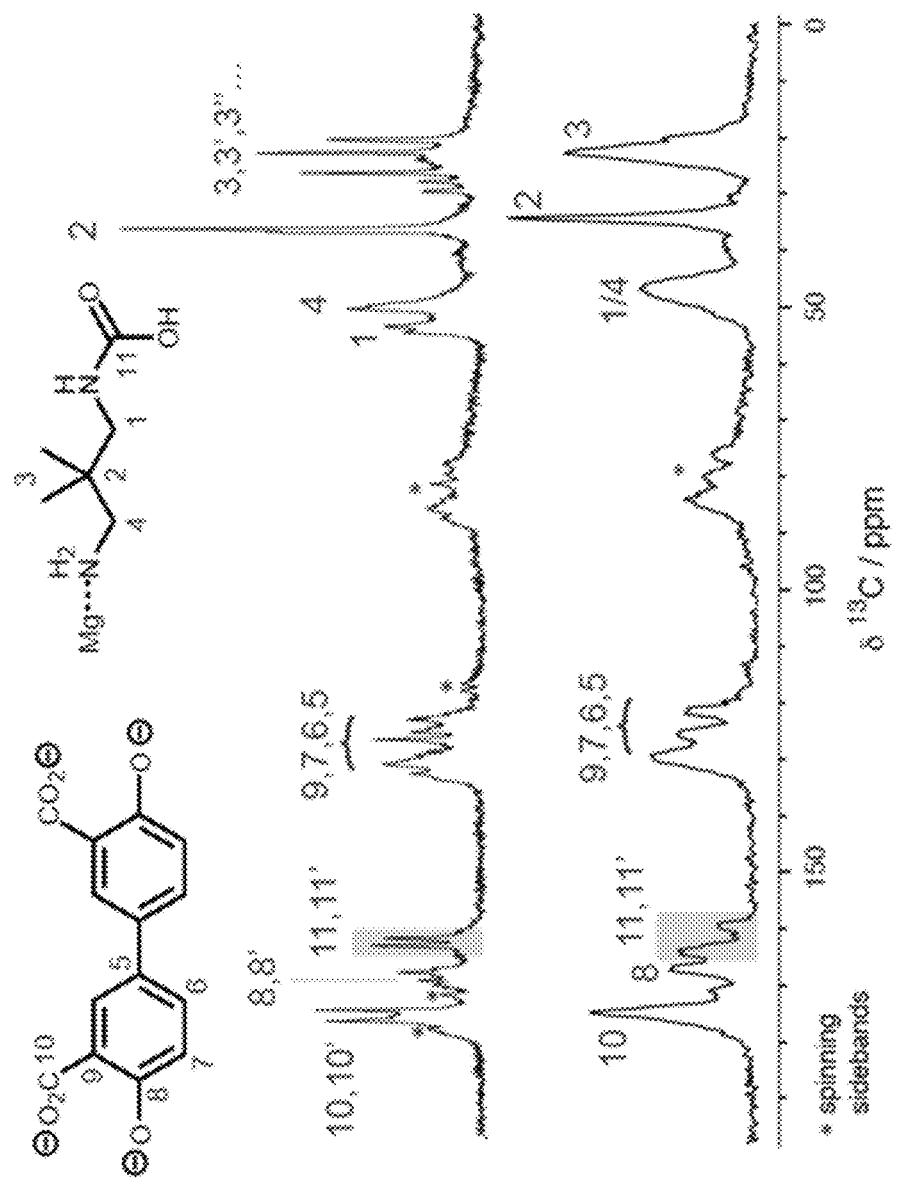

FIG. 10 illustrates a magic angle spinning solid state $^{13}C$ NMR spectra of dpmn-$Mg_2$(dobpdc) under dry $CO_2$ (top) and wet $CO_2$ (bottom), indicating that the signals due to $CO_2$ adsorption (labeled here as 11 and 11') are the same under dry and humid conditions, in accordance with an embodiment of the present disclosure.

Figure 11:
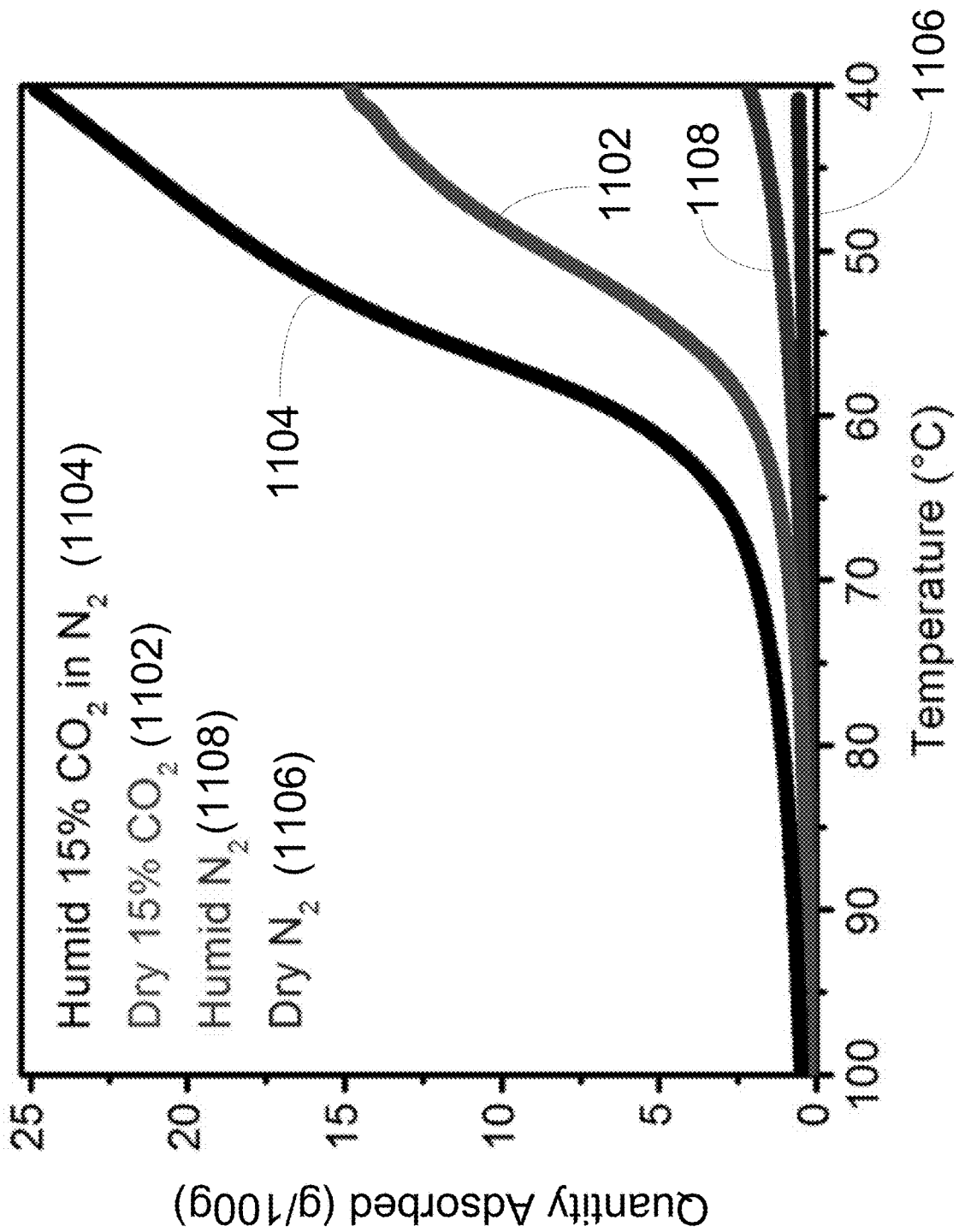

FIG. 11 illustrated humid 15% $CO_2$ in $N_2$(1104), dry 15% $CO_2$ in $N_2$(1102), humid $N_2$(1108), and dry $N_2$(1106) isobars for dmpn-$Mg_2$(dobpdc), as determined by thermogravimetric analysis (TGA), indicating that dpmn-$Mg_2$(dobpdc) shows enhanced adsorption of $CO_2$ under humid conditions, in accordance with an embodiment of the present disclosure.

Figure 12:
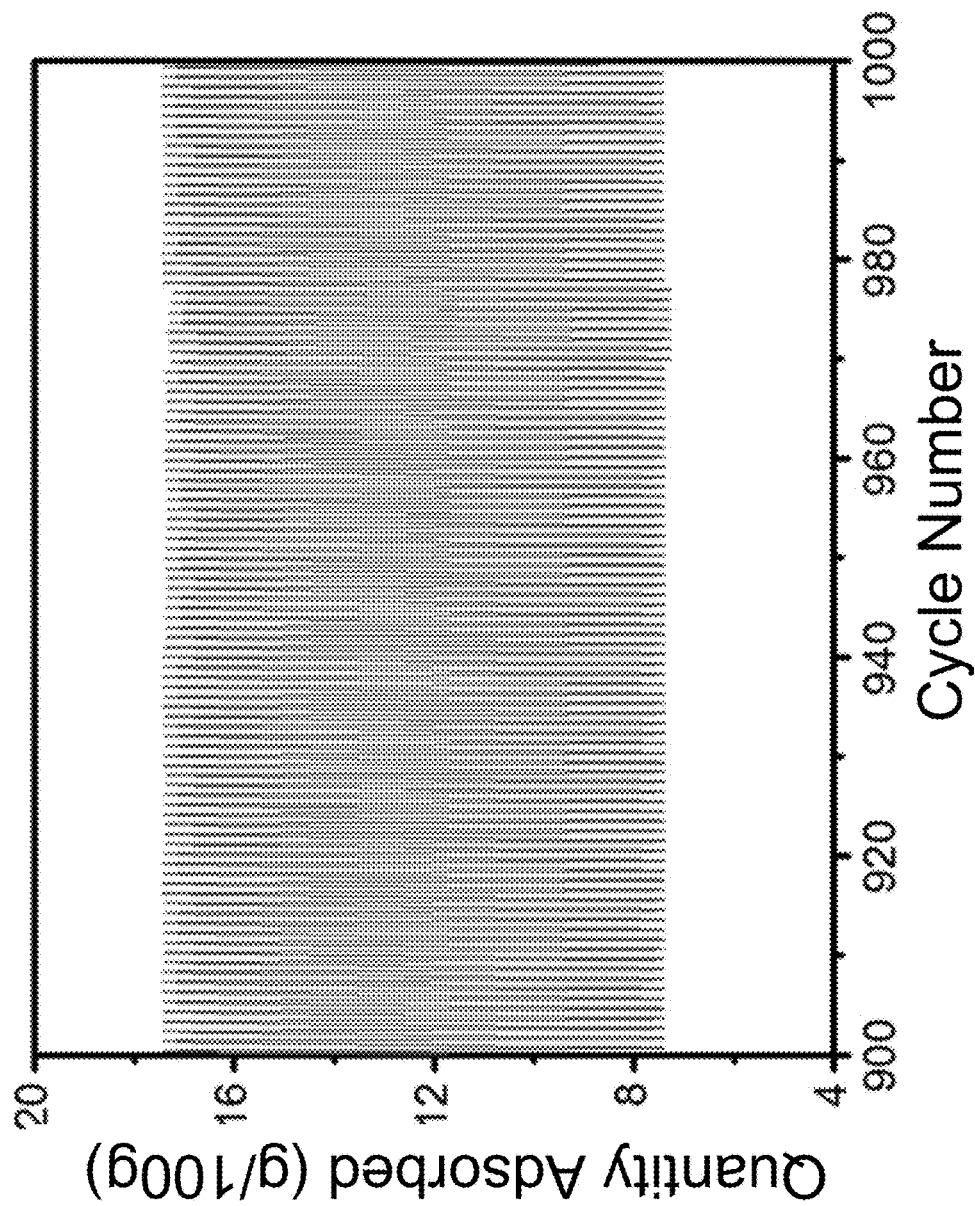

FIG. 12 illustrates the last 100 of 1000 adsorption/desorption cycles for dpmn-$Mg_2$(dobpdc) under humid coal flue gas conditions, with quantity of $CO_2/N_2/H_2O$ adsorbed (green) shown, with adsorption: 40° C., humid 15% $CO_2$ in $N_2$, 5 min.; desorption: 100° C., humid $CO_2$, 1 minute. Digestion of the material revealed that 97% of the diamine was remaining after this experiment (97% was remaining after 300 cycles as well), in accordance with an embodiment of the present disclosure.

Figure 13:
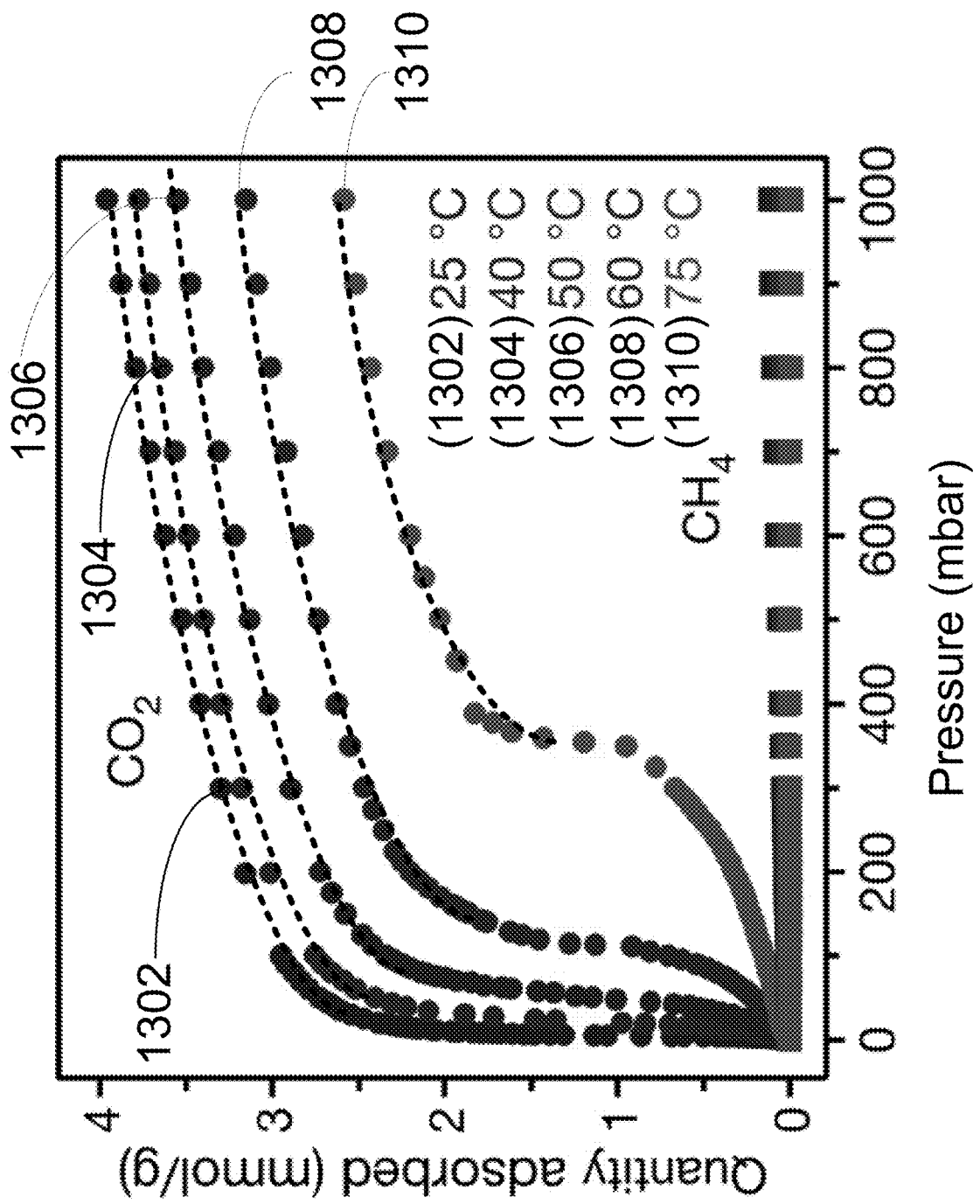

FIG. 13 illustrates low pressure $CO_2$ and $CH_4$ isotherms for dmpn-$Mg_2$(dobpdc), indicating selective adsorption of $CO_2$ over $CH_4$, in accordance with an embodiment of the present disclosure.

Figure 14:
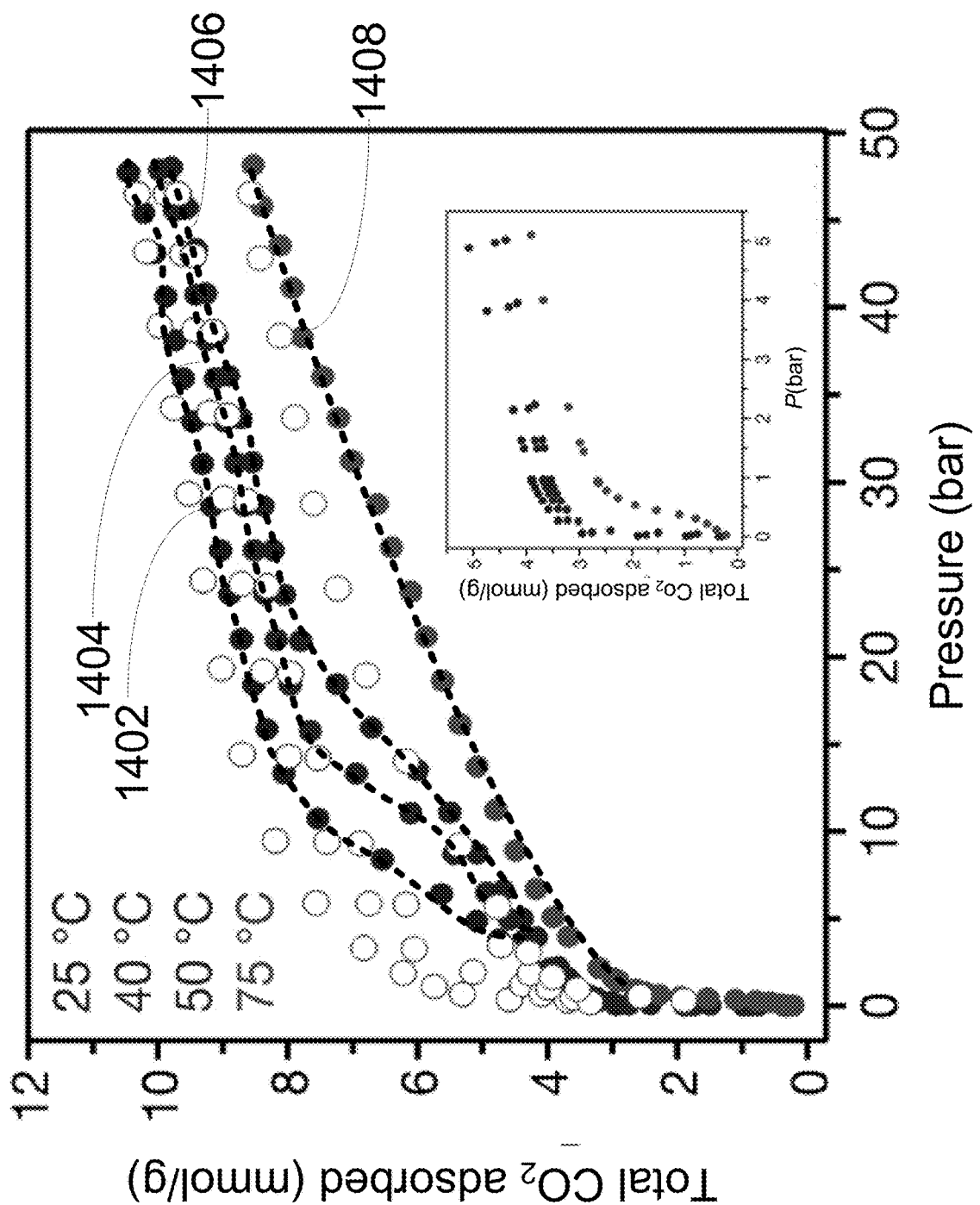

FIG. 14 illustrates high pressure $CO_2$ isotherms for dpmn-$Mg_2$(dobpdc), with open circles representing desorption isotherms, with an insert of the low pressure region, in accordance with an embodiment of the present disclosure.

Figure 15:
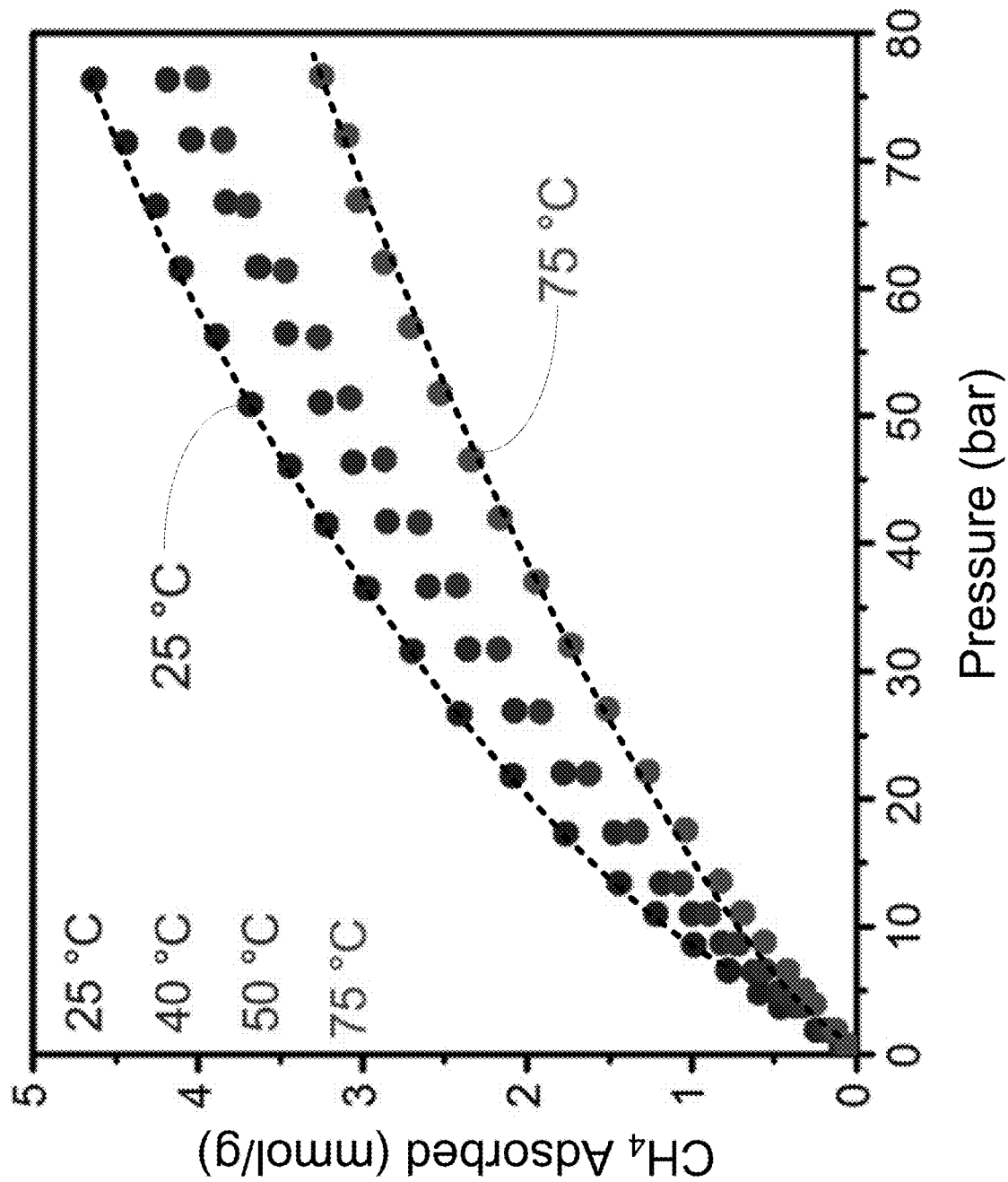

FIG. 15 illustrates high pressure $CH_4$ isotherms for dpmn-$Mg_2$(dobpdc), in accordance with an embodiment of the present disclosure.

Figure 16:
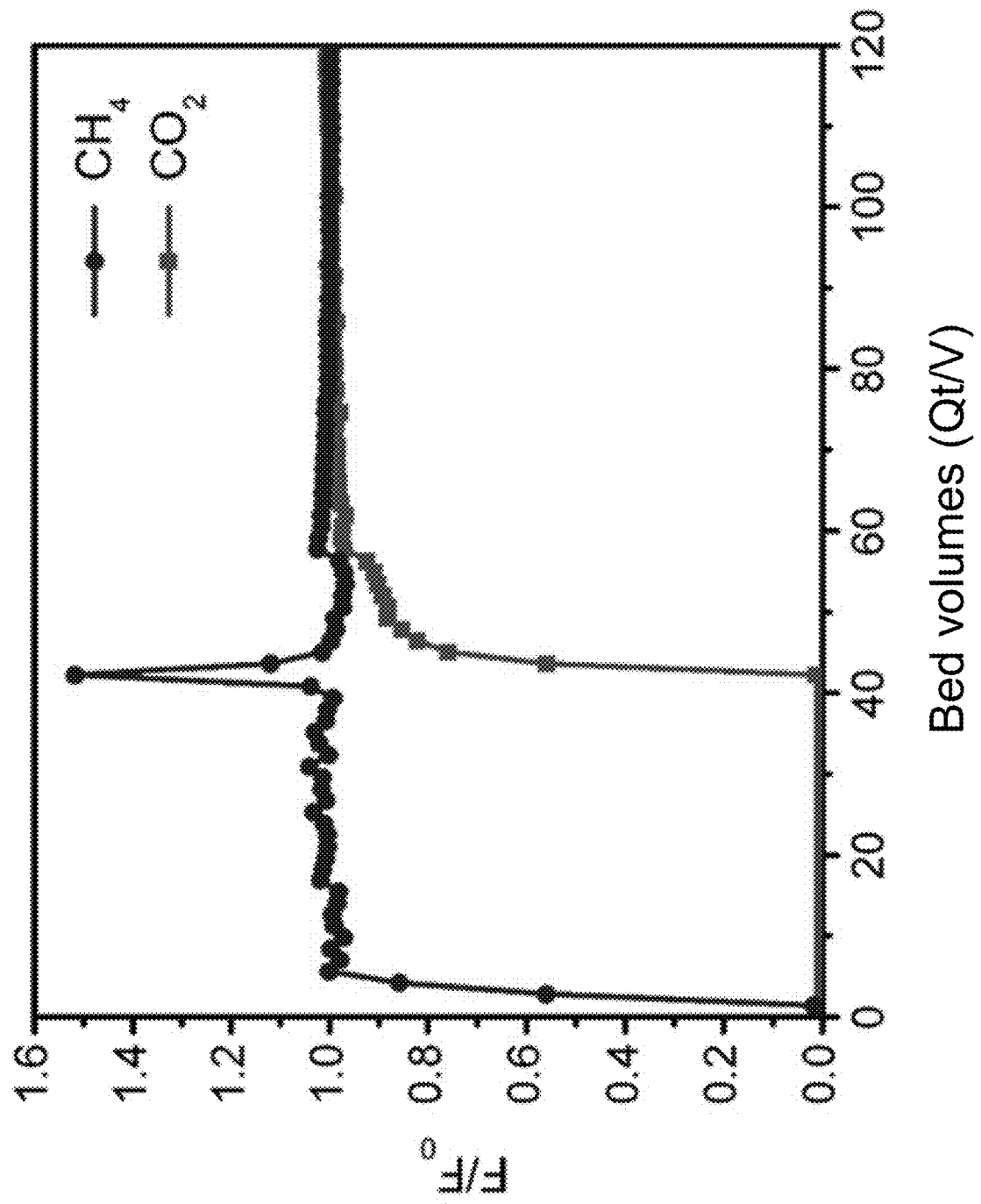

FIG. 16 illustrates 50% $CO_2$ in $CH_4$ breakthrough measurement for dmpn-$Mg_2$(dobpdc) at 40° C., with a total feed pressure of 4 bar and a flow rate of 3.1 sccm, in which the calculated breakthrough capacities are 3.2 mmol/g $CO_2$ and 0.08 mmol/g $CH_4$, and the adsorbent bed was filled with He prior to switching the stream to 50% $CO_2$ in $CH_4$, and a $CO_2/CH_4$ selectivity of 39 was determined, in accordance with an embodiment of the present disclosure.

Figure 17:
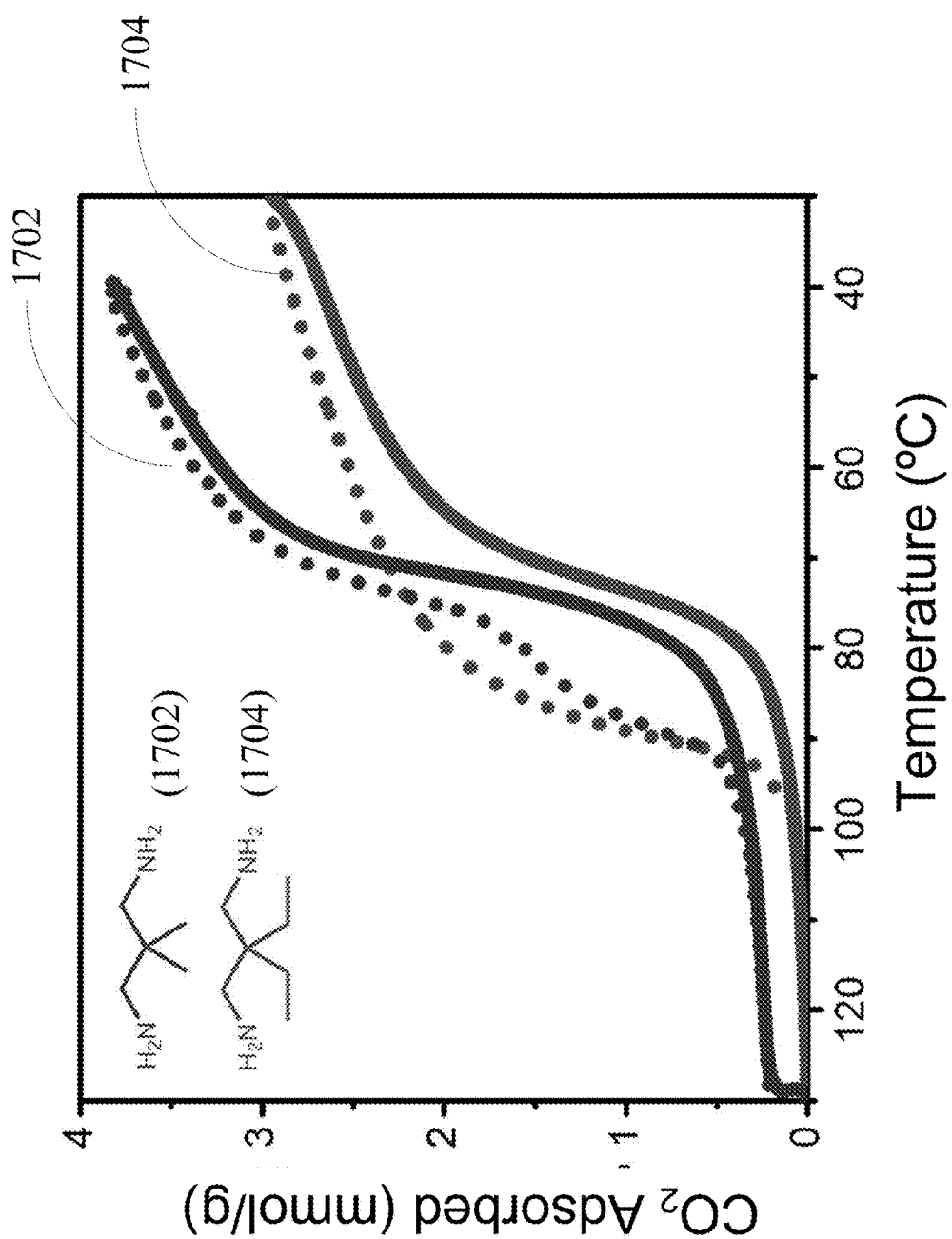

FIG. 17 illustrates that the diethyl analogue of dmpn shows a similar $CO_2$ adsorption profile as dpmn, and thus likely also operates by the same mechanism as dmpn in accordance with an embodiment of the present disclosure.

Figure 18:
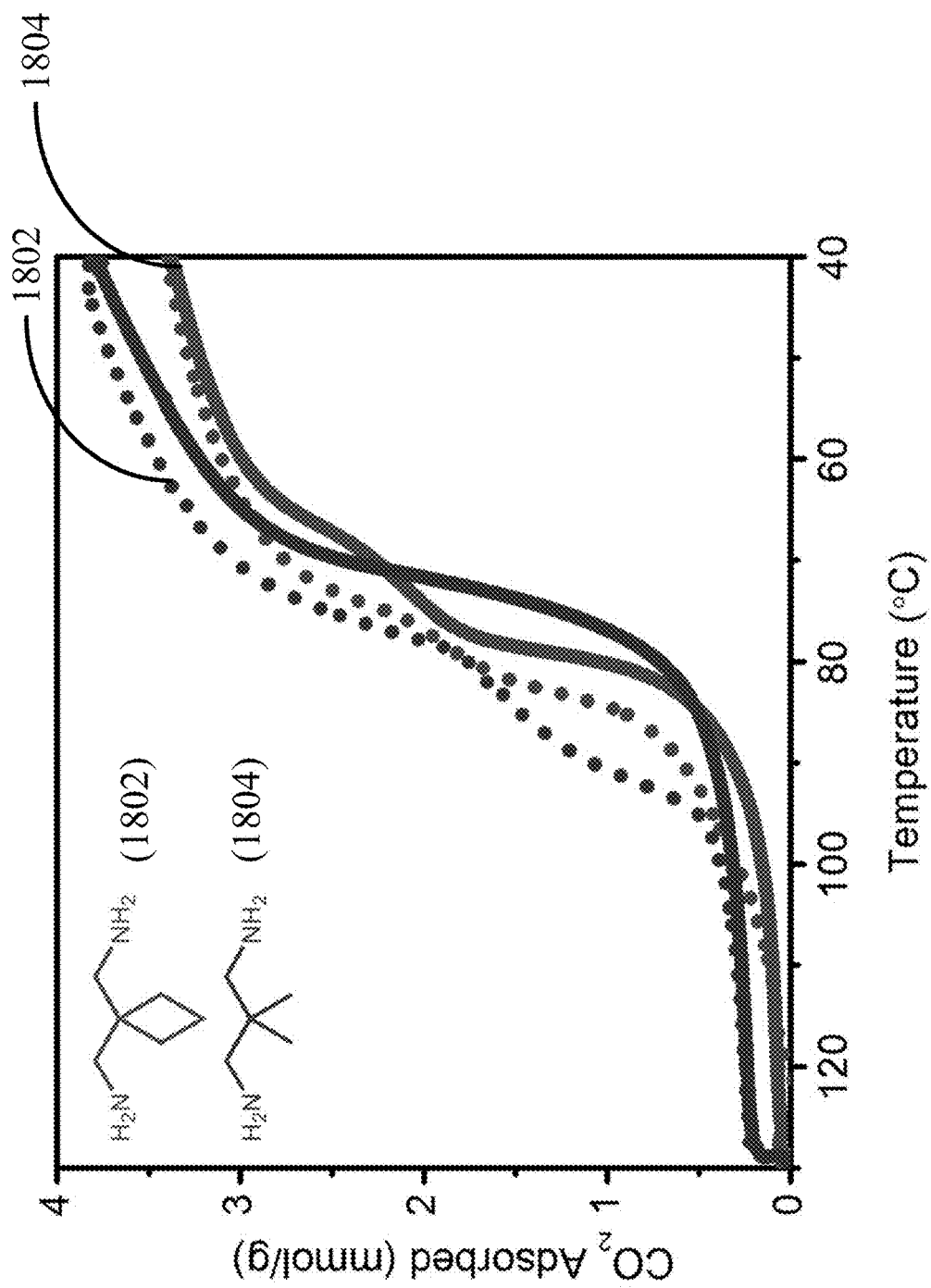

FIG. 18 illustrates that the cyclobutyl analogue of dmpn shows a similar $CO_2$ adsorption profile as dmpn, and thus likely also operates by the same mechanism as dmpn in accordance with an embodiment of the present disclosure.

Figure 19:
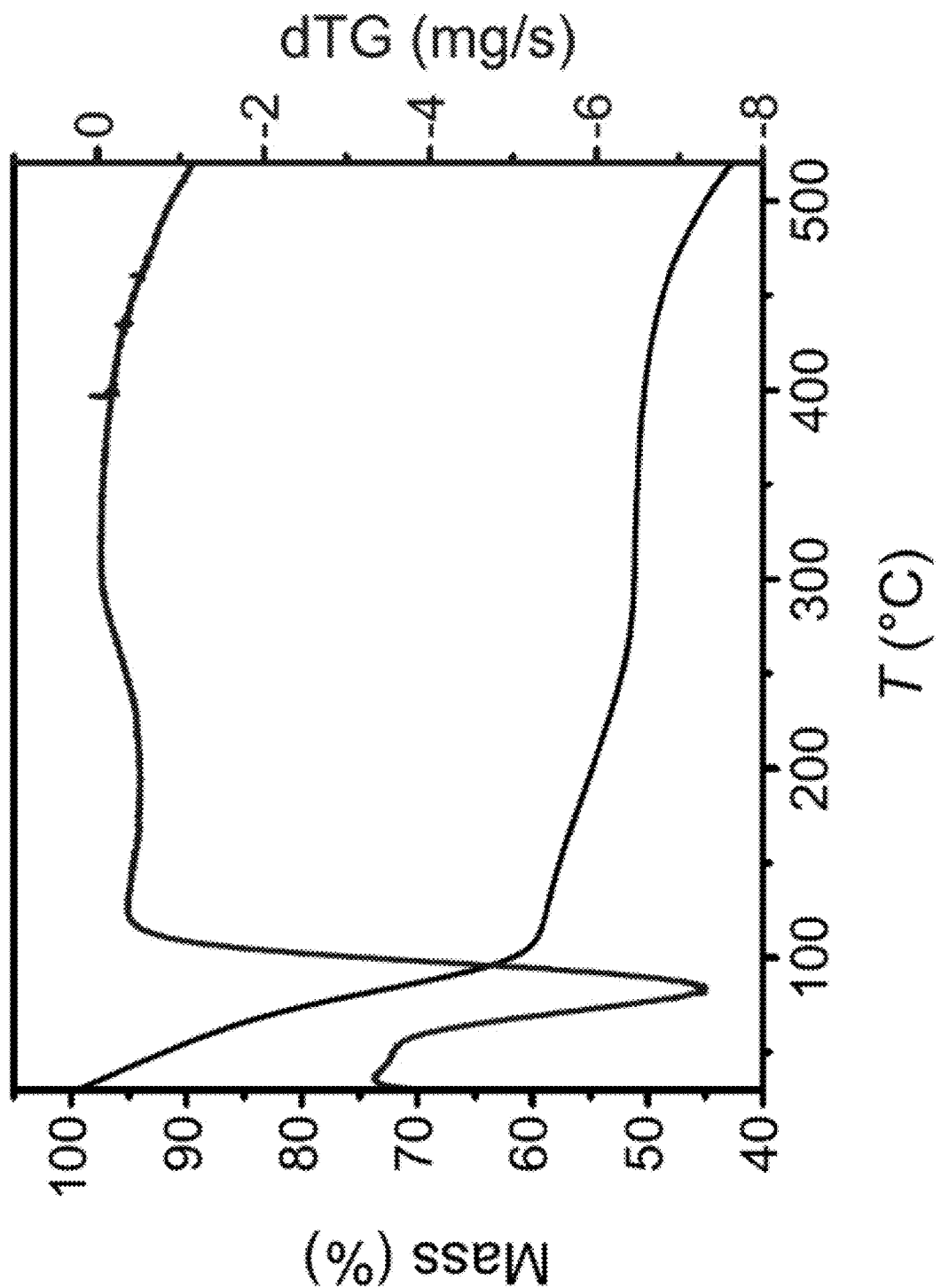

FIG. 19 illustrates thermogravimetric decomposition trace (black) and derivative decomposition trace (dTG, blue) for methanol-solvated $Mg_2$(dobpdc).

Figure 20:
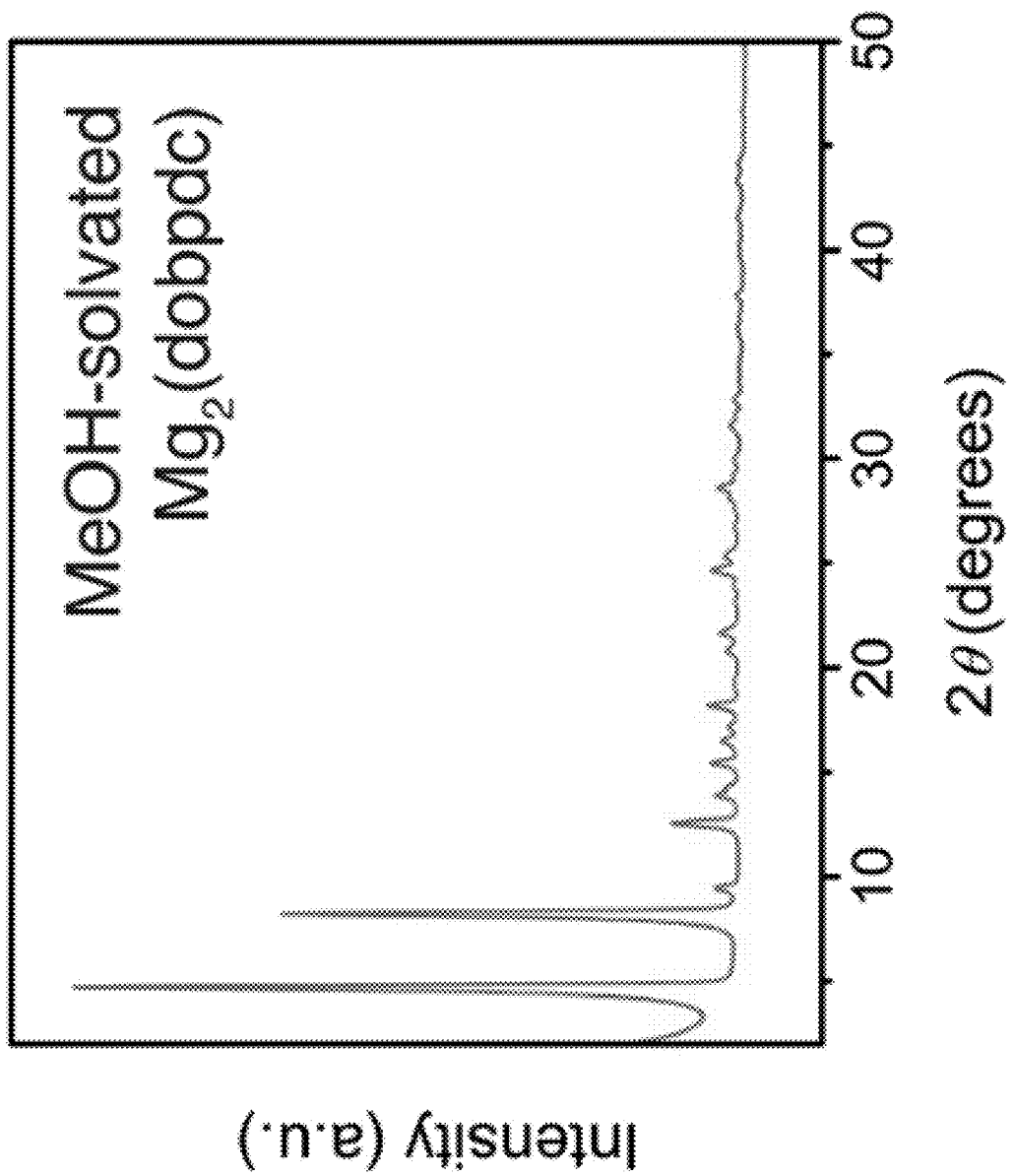

FIG. 20 illustrates the powder X-ray diffraction pattern ($\lambda$=1.5418 Å) upon gram-scale synthesis of methanol-solvated $Mg_2$(dobpdc).

Figure 21:
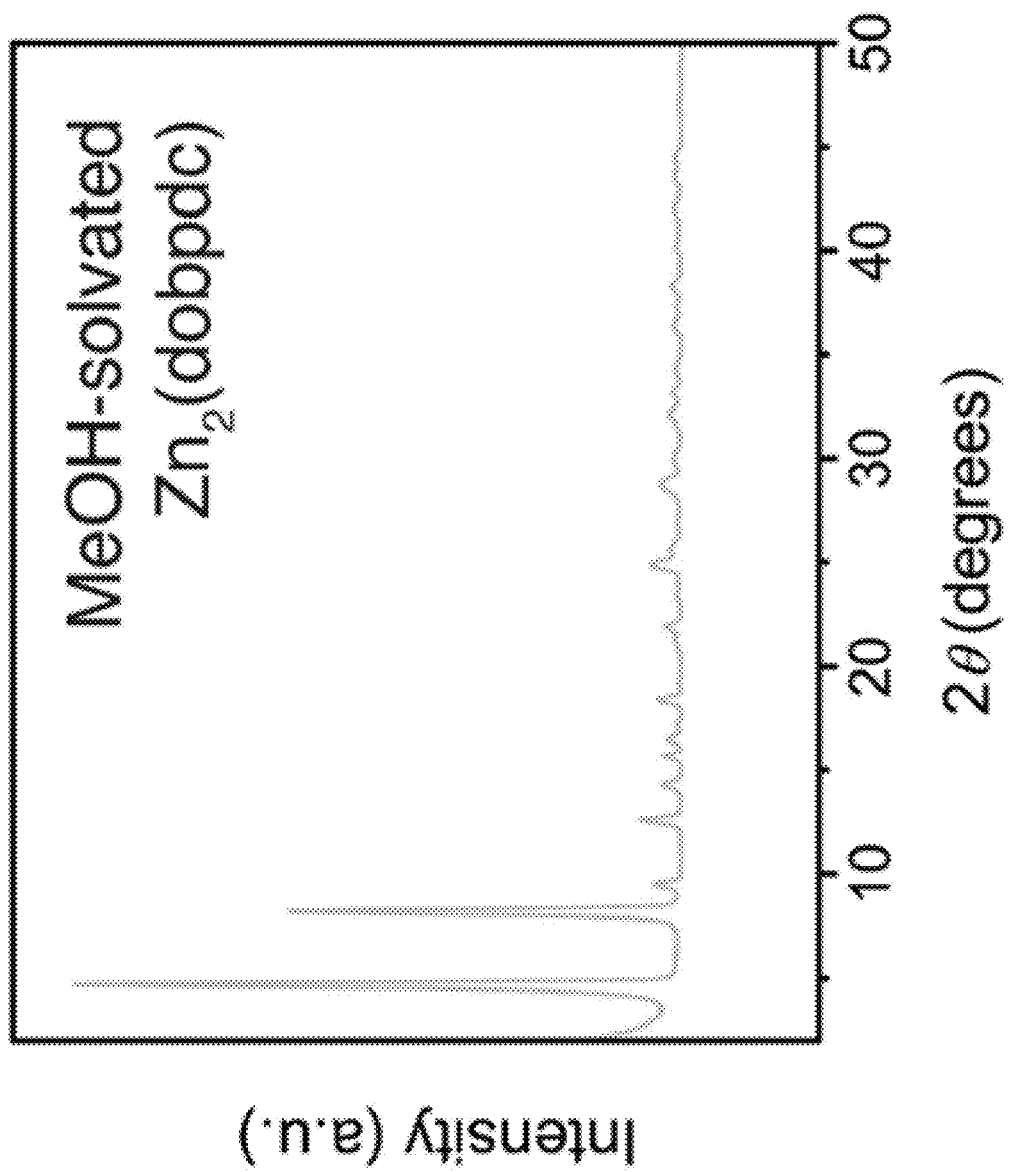

FIG. 21 illustrates the powder X-ray diffraction pattern ($\lambda$=1.5418 Å) upon gram-scale synthesis of methanol-solvated Zn(dobpdc).

Figure 22:
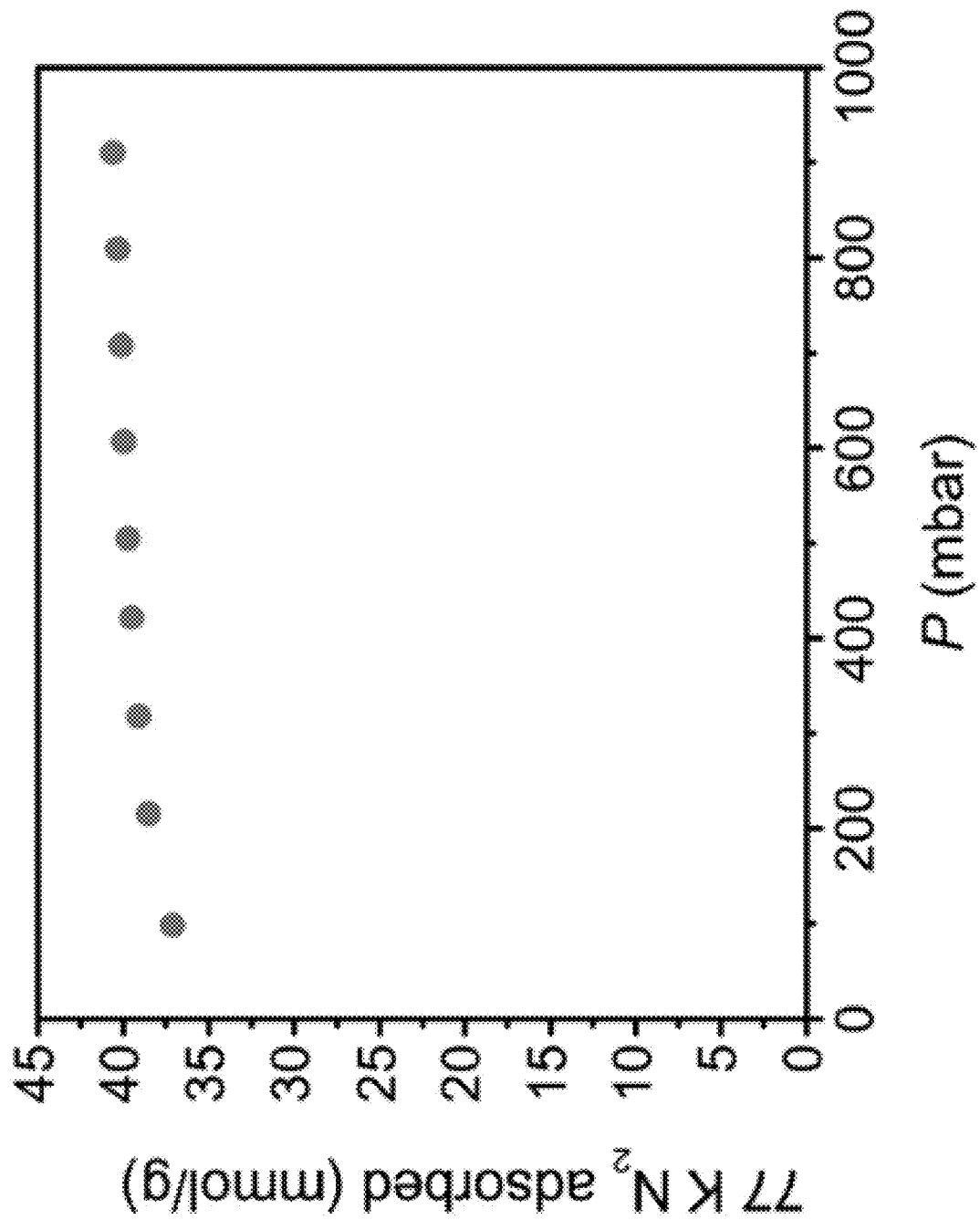

FIG. 22 illustrates 77 K $N_2$ adsorption isotherm for gram-scale syntheses of $Mg_2$(dobpdc) following activation at 250° C. The calculated Langmuir surface area is 4001(5) $m_2/g$.

Figure 23:
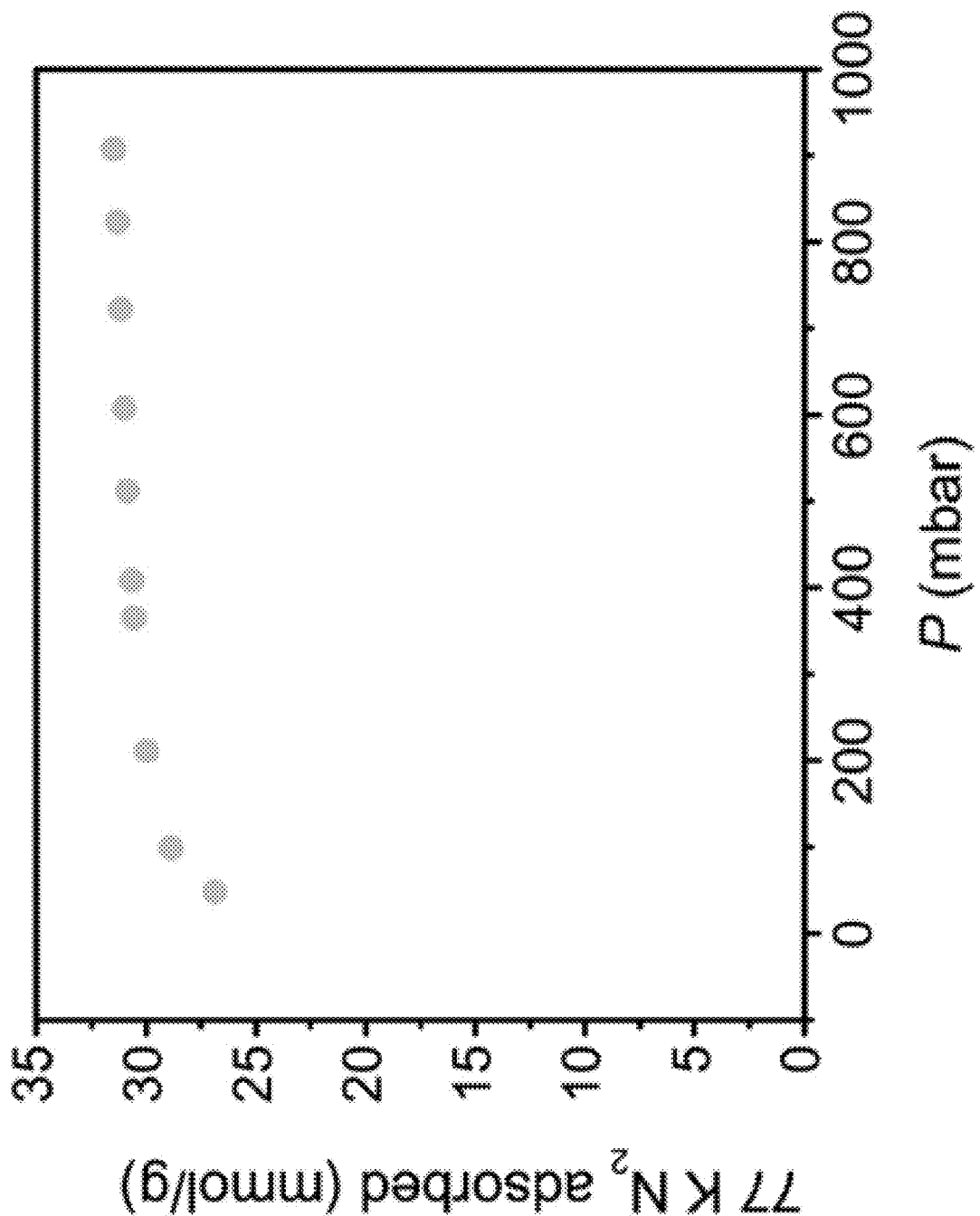

FIG. 23 illustrates 77 K $N_2$ adsorption isotherm for gram-scale syntheses of $Zn_2$(dobpdc) following activation at 250° C. The calculated Langmuir surface area is 3104(4) $m_2/g$ for $Zn_2$(dobpdc).

Figure 24:
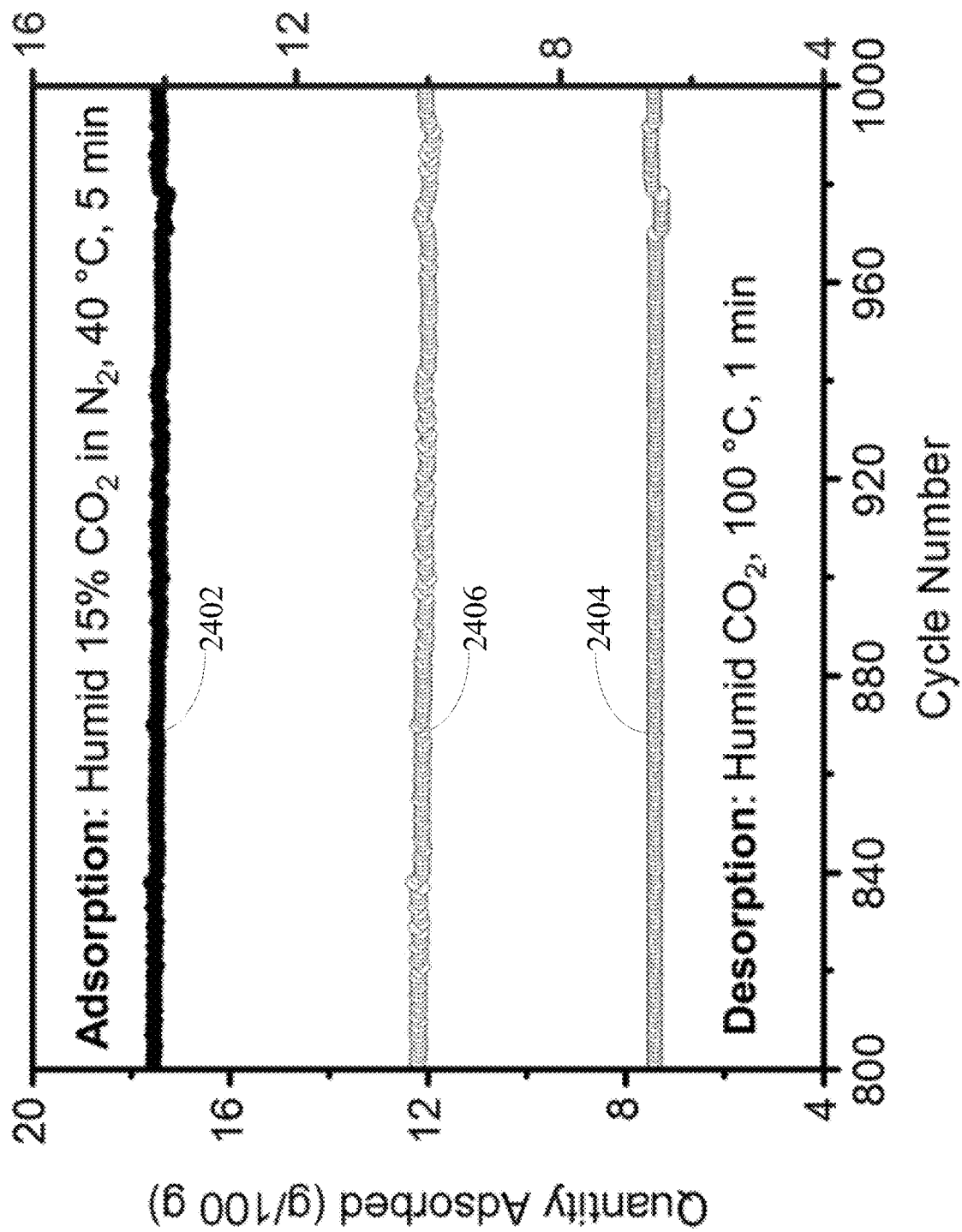

FIG. 24 illustrates adsorption maxima (line 2402), desorption minima (line 2404), and cycling capacities (line 2406) of the last 200 of 1000 humid cycles of dmpn-$Mg_2$(dobpdc), as determined by thermogravimetric analysis (TGA). The baseline value of 0 g/100 g is defined as the mass after activation under humid 15% $CO_2$ in $N_2$ for 20 minutes at 130° C. prior to the first cycle.

Figure 25A:
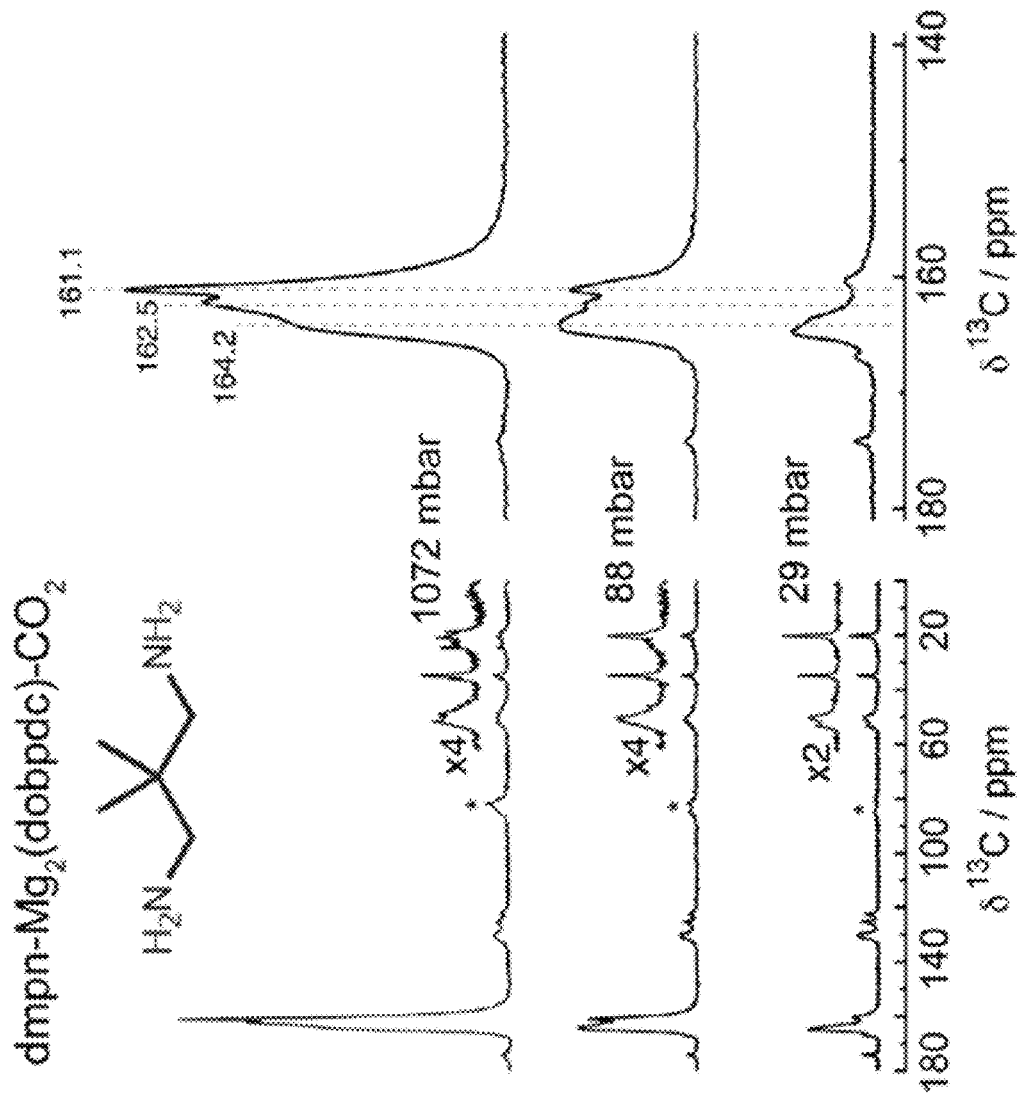

FIG. 25A illustrates room-temperature $^{13}C$ MAS NMR (7.1 T) spectra for dmpn-$Mg_2$(dobpdc) dosed with various pressures of $^{13}CO_2$. Spectra were acquired by cross-polarization from $^1H$. Sample spinning rates were 8 kHz.

Figure 25B:
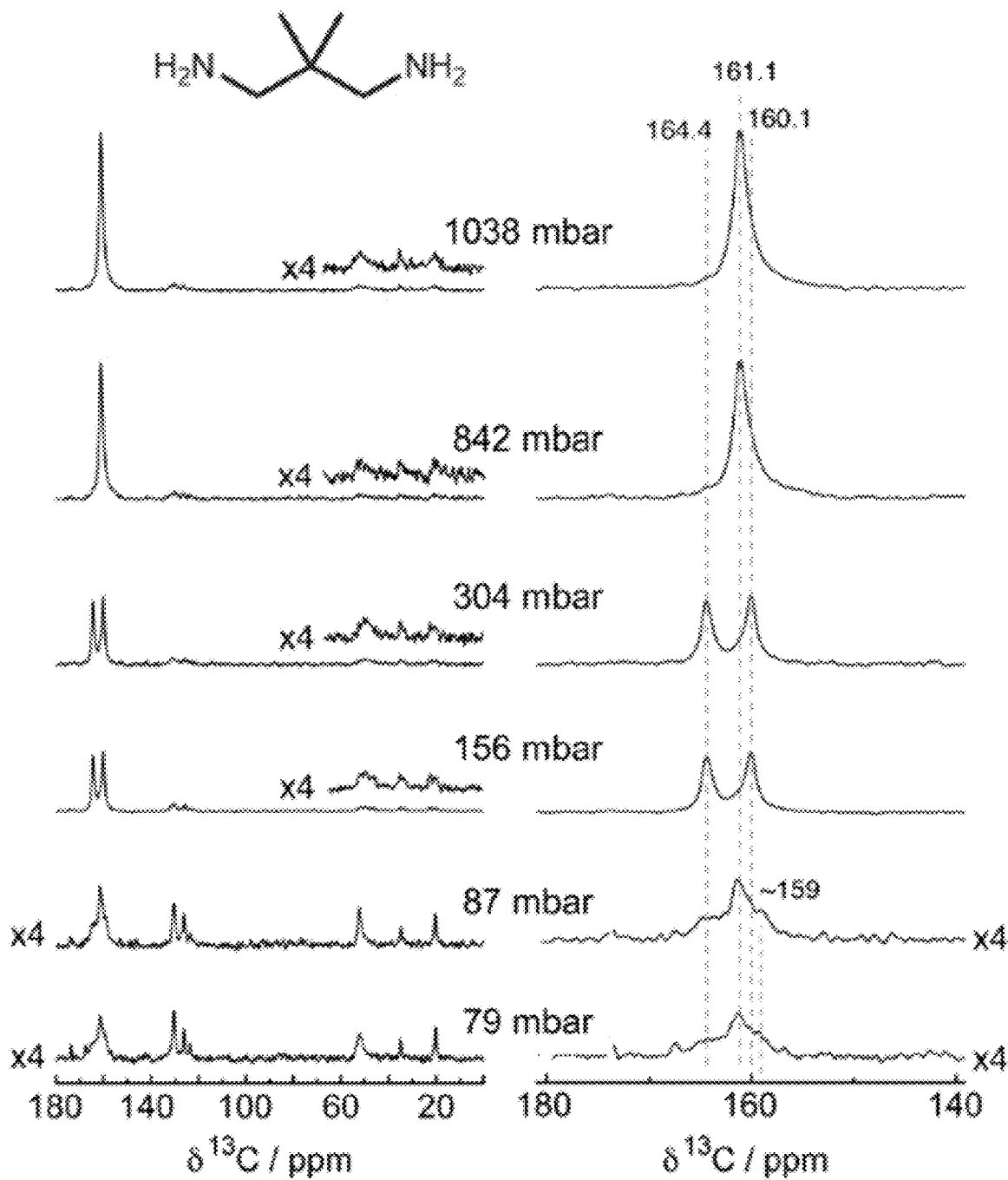

FIG. 25B illustrates room-temperature $^{13}C$ MAS NMR (7.1 T) spectra for dmpn-$Zn_2$(dobpdc) dosed with various pressures of $^{13}CO_2$. Spectra were acquired by cross-polarization from $^1H$. Sample spinning rates were 7, 10, 11, 10, 10, and 11 kHz for spectra at 79, 87, 156, 304, 842, and 1038 mbar, respectively.

Figure 26:
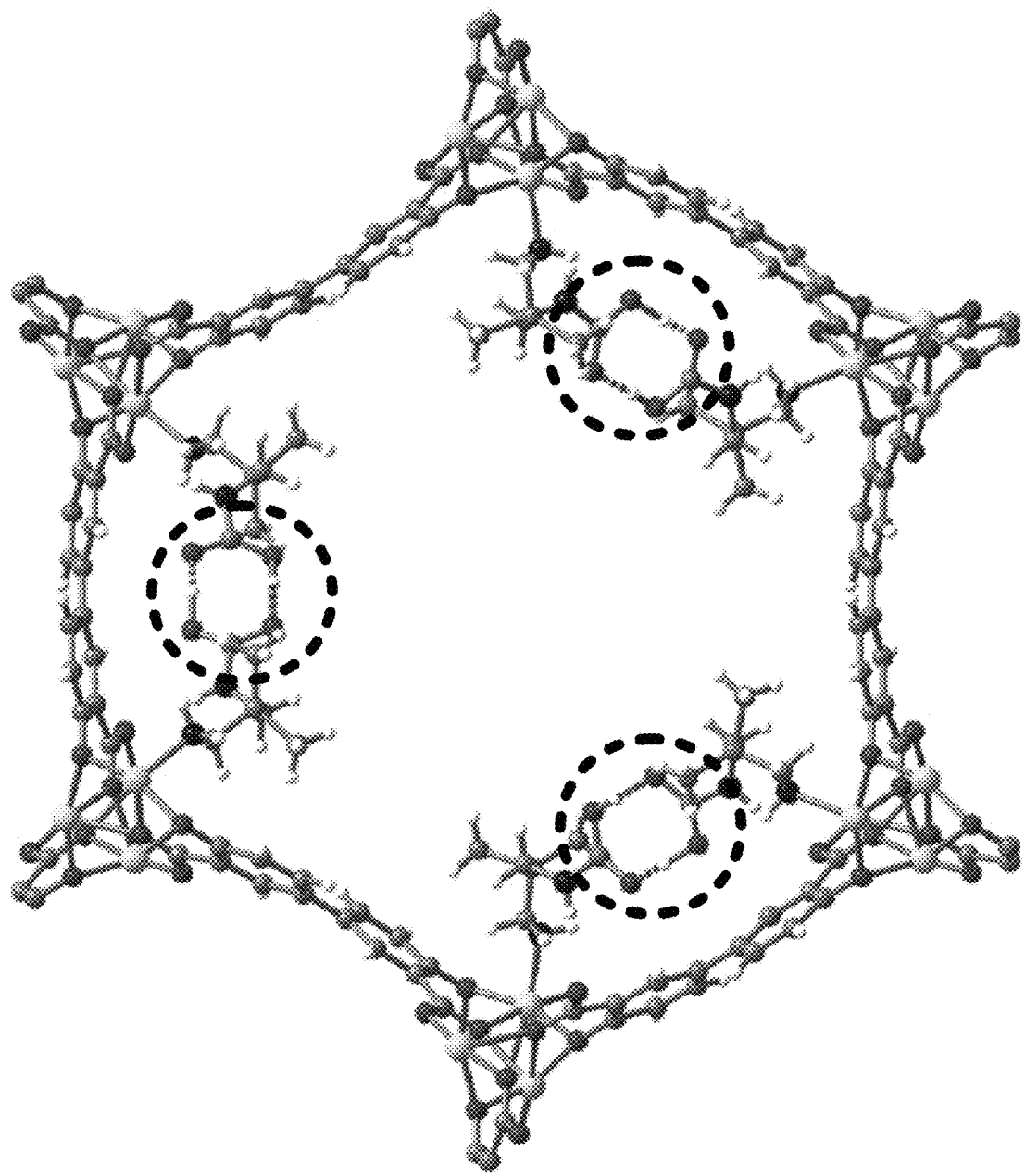

FIG. 26 illustrates a view down the c-axis of the single-crystal X-ray diffraction structure of the carbamic acid pairs formed upon $CO_2$ adsorption in dmpn-$Zn_2$(dobpdc) at 100 K.

DETAILED DESCRIPTION OF THE PRESENT DISCLOSURE

I. Introduction

Modifying the nitrogen substituents of diamines allows for rational tuning of the $CO_2$ step pressure for alkylethylenediamine-appended variants of $Mg_2$(dobpdc). See, Siegelman et al., 2017, J. Am. Chem. Soc. 139, 10526. However, as summarized in FIG. 2C, changing the substitution patterns on the nitrogen atoms led to step pressures that were either too high (≥100 mbar) or too low (≤1 mbar) for the efficient removal of $CO_2$ from coal flue gas. To address these shortcomings, a determination was made as to whether changing the substituents on the backbone of the diamine—specifically, switching from ethylenediamines to diaminopropanes—could tune the step pressure to ~15 mbar at 40° C. To this end, 1,3-diaminopropane (FIG. 2D, pn) (260) was appended to $Mg_2$(dobpdc), which produced an adsorbent displaying step-shaped adsorption of $CO_2$ with a similar step pressure (~0.5 mbar, 40° C.) as compared to other strongly adsorbing diamine-appended variants of $Mg_2$(dobpdc). However, in distinct contrast to variants of $Mg_2$(dobpdc) functionalized with primary-primary ethylenediamines, pn-$Mg_2$(dobpdc) displays almost no hysteresis upon $CO_2$ desorption, allowing for its near complete regeneration at 130° C. under pure $CO_2$. See FIG. 2E, curve 260). The addition of a methyl group (2-methyl-1,3-diaminopropane, mpn, 262) to the diamine backbone does not have a significant effect on the $CO_2$ adsorption step pressure or temperature compared to those of pn-$Mg_2$(dobpdc) (FIG. 2D).

Unexpectedly, with the addition of a second methyl group to the diamine backbone, 2,2-dimethyl-1,3-diaminopropane (dmpn, 264) led to a drastic change in the adsorption properties (264). For this adsorbent, the $CO_2$ adsorption step at 40° C. is broadened and shifted to a pressure of ~15 mbar, which is suitable for ~90% capture of $CO_2$ from coal flue gas (FIG. 2D). In addition, near-complete $CO_2$ desorption can be achieved at 95° C. under pure $CO_2$ (FIG. 2E), although an unusual hysteresis profile is apparent during desorption. This low $CO_2$ desorption temperature is particularly advantageous because the regeneration temperature of the adsorbent strongly affects the efficiency of a carbon capture process. See, Hefti, 2016, Faraday Discuss. 192, 153.

It has been observed (Siegelman et al., 2017, J. Am. Chem. Soc. 139, 10526) that the differential enthalpies and entropies of adsorption at a loading of 1 mmol/g (e.g., in the step) are linearly correlated for alkylethylenediamine-functionalized variants of $Mg_2$(dobpdc) (line 402 of FIG. 4; see Table 1 for individual values). Increasing the heat of adsorption generally decreases the step pressure (and thus increases the capture rate), but also increases the regeneration energy, whereas increasing the entropy of adsorption increases the temperature sensitivity of the step, enabling regeneration with smaller temperature swings. Thus, in FIG. 4, isothermal $CO_2$ step pressures decrease moving toward the upper right corner, as indicated by both stronger $CO_2$ binding (more negative Δhads) and reduced $CO_2$ and diamine mobility (more negative Δsads) in the adsorbed phase. Both mpn-$Mg_2$(dobpdc) and pn-$Mg_2$(dobpdc) obey this relationship and possess 40° C. step pressures (~0.5 mbar) similar to those of adsorbents with comparable differential enthalpies of adsorption. See, Siegelman et al., 2017, J. Am. Chem. Soc. 139, 10526; and McDonald et al., 2015, Nature 519, 303)

Performing the same analysis for dmpn-$Mg_2$(dobpdc), however, revealed it to be an outlier from this trend (404, FIG. 4), as it possesses a more negative differential entropy of adsorption (Δsads=−204±4 J/mol·K) than expected given its highly exothermic differential enthalpy of adsorption (Δhads=−74±1 kJ/mol). This increase in the entropic penalty for $CO_2$ adsorption in dmpn-$Mg_2$(dobpdc) compared to other adsorbents leads to its unique $CO_2$ step pressure and also contributes to the increased temperature sensitivity of its adsorption step, which enables a small temperature swing (40→100° C.) to be used to achieve a high working capacity for $CO_2$ adsorption. This increase in the entropic penalty for $CO_2$ adsorption in dmpn-$Mg_2$(dobpdc) over what would be predicted from the linear trendline followed by other alkyldiamines (−181 J/mol·K) leads to a Δgads at 40° C. of −10±2 kJ/mol. Importantly, this value is within the error of the Δgads calculated to be necessary to achieve step-shaped adsorption of $CO_2$ at 15 mbar and 40° C. (−10.9 kJ/mol), as indicated by its position on the dashed line 406 in FIG. 4. Although dmen-$Mg_2$(dobpdc) also lies on line 406, it exhibits a less negative Δhads (−63±4 kJ/mol) than dmpn-$Mg_2$(dobpdc) (−74±1 kJ/mol), which contributes to the larger temperature swing (ΔT=76° C.) required to move the adsorption step past 1 bar of $CO_2$ (see eq. 1 below in the "Calculations of Differential Enthalpies and Entropies of adsorption" portion of Section IV). The significant change in the differential entropy of adsorption between dmpn-$Mg_2$(dobpdc) and mpn-$Mg_2$(dobpdc) and pn-$Mg_2$(dobpdc) predominantly accounts for the difference in step pressures between these adsorbents at 40° C. (FIG. 2d). Notably, this represents a rare instance in which the adsorption properties of a material have been tuned by changing the differential entropy of adsorption.

The unique shape of the $CO_2$ adsorption isotherms and position of dmpn-$Mg_2$(dobpdc) as an outlier in FIG. 4 suggest that this material cooperatively adsorbs $CO_2$ by a different mechanism than other diamine-appended metal-organic frameworks. To probe this, single crystals of dmpn-$Zn_2$(dobpdc) were prepared and their structural properties studied by X-ray crystallography. See FIG. 5. In particular, the structure of diethyl ether-solvated dmpn-$Zn_2$(dobpdc) was first obtained in the absence of $CO_2$ (FIG. 5, panel a). Importantly, considerable unobstructed pore volume remains after diamine grafting, consistent with the high Brunauer-Emmett-Teller (BET) surface area of 948±3 $m^2$/g determined for dmpn-$Mg_2$(dobpdc) from the $N_2$ adsorption isotherm at 77 K. This should allow for rapid diffusion of $CO_2$ into and out of the pores. Interestingly, the presence of an extensive hydrogen-bonding network between adjacent diamines can be inferred from the close N . . . N contacts of 3.26(3) Å. In addition, the powder Xray diffraction pattern of dmpn-Mn2(dobpdc) is consistent with the presence of a similar hydrogen-bonding network. See, Siegelman et al., 2017, J. Am. Chem. Soc. 139, 13541. Likewise, the single crystal structure of toluene-solvated mpn-$Zn_2$(dobpdc) shows two distinct conformations involving hydrogen bonding between amines; the minor conformer involves hydrogen bonding along the c-axis, as in FIG. 5 panel a), 30.8(13) percent occupancy, whereas the major conformer, 57.1(13) percent occupancy, involves intramolecular hydrogen bonding between the terminal and metal-bound amines of a single diamine. See, Siegelman et al., 2017, J. Am. Chem. Soc. 139, 13541. These interactions are not available to alkylethylenediamine-appended variants of $Zn_2$(dobpdc) because adjacent diamines are unable to reach one another down the c-axis (Siegelman et al., 2017, J. Am. Chem. Soc. 139, 10526; McDonald et al., 2015, Nature 519, 303) and likely contribute significantly to the observed stability of dmpn-$Mg_2$(dobpdc) to adsorption/desorption cycling (FIG. 24).

Remarkably, dosing activated single crystals of dmpn-$Zn_2$(dobpdc) with 1 bar of $CO_2$ allowed for the acquisition of the Xray diffraction structure corresponding to the unidentified species observed by solid-state $^{13}$C NMR spectroscopy (FIG. 25). In contrast to all other diamine-appended metal organic frameworks studied to date (Siegelman et al., 2017, J. Am. Chem. Soc. 139, 10526; McDonald, 2015, Nature 519, 303) dmpn-$Zn_2$(dobpdc) was found to form carbamic acid pairs bridging diagonally adjacent diamines upon exposure to $CO_2$ (FIGS. 6 and 26). While the bridging hydrogen atoms could not be located in the structure, their presence was inferred from the close O . . . O contacts of 2.38(4) and 2.88(4) Å, respectively. These pairs are connected by hydrogen-bonding interactions along the c-axis and thus form an extended ladderlike structure running down the pores of the framework (FIG. 5B). Importantly, significant unoccupied pore volume remains even after $CO_2$ adsorption, enabling facile gas transport through the pores (FIG. 26). Although previous density functional theory (DFT) calculations suggested that the formation of carbamic acid pairs would not be expected to proceed cooperatively ((a) Vlaisavljevich, 2015, Chem. Sci. 6, 5177; Planas, 2013, J. Am. Chem. Soc. 135, 7402) the presence of hydrogen-bonding interactions along the c-axis in this structure may impart some degree of cooperativity. However, such interactions are also present in the absence of $CO_2$ (Figure, panel A), and therefore, any cooperative effects are likely offset by similar hydrogen-bonding interactions between adjacent carbamic acid pairs, between carbamic acid pairs and adjacent free amines, and between adjacent free amines. Therefore, the carbamic acid pairs likely dominate in the poststep regimes of the $CO_2$ isotherms of dmpn-$M_2$(dobpdc) (M=Mg, Mn, Co, Zn), with insertion to form ammonium carbamate chains occurring predominantly near the $CO_2$ adsorption step. The combination of a primarily noncooperative adsorption isotherm for the carbamic acid pairs and a step-shaped adsorption isotherm for the ammonium carbamate chains likely gives rise to the distinct isotherm shapes of dmpn-functionalized analogues of $M_2$(dobpdc).

Notably, dmpn-$Ni_2$(dobpdc), which possesses M-N bonds that are too strong to allow for $CO_2$ insertion to form ammoniumcarbamate chains (McDonald, 2015, Nature 2015, 519, 303) likely adsorbs $CO_2$ exclusively via the formation of carbamic acid pairs and exhibits a noncooperative adsorption profile. Although carbamic acid pairs have not been experimentally observed in a diamine-appended metal-organic framework until now, previous DFT calculations found that carbamic acid pairs of a different geometry were comparable in energy to the experimentally observed ammonium carbamate chains with N,N'-dimethylethylenediamine in place of dmpn (McDonald, 2015, Nature, 519, 303; Vlaisavljevich, 2015, Chem. Sci. 6, 5177; Planas, 2013 J. Am. Chem. Soc. 135, 7402.) The present results constitute the first crystallographic observation of carbamic acid pair formation in a porous solid and thus serve as corroborating evidence for the formation of carbamic acid species stabilized by hydrogen bonding in other adsorbents. Consistent with this assessment, the solid-state $^{13}$C NMR resonances previously ascribed to carbamic acid species were observed at ~160 ppm (Mafra, 2017, J. Am. Chem. Soc. 139, 389; Pinto, 2011, J. Chem. Mater. 23, 1387; Moore, 2015, Environ. Sci. Technol. 49, 13684; Foo, 2017, ChemSusChem 10, 266) similar in chemical shift to the resonance at 161.1 ppm we assign to carbamic acid pairs in the $^{13}$C NMR spectra of dmpn-$Zn_2$(dobpdc) (FIGS. 25A, 25B). In addition, DFT calculations using the single-crystal X-ray diffraction structure (FIG. 5, panel B) afforded a predicted chemical shift of 161.1 ppm for the observed carbamic acid pairs. On the basis of this assignment, the species observed at intermediate pressures (156 and 304 mbar) at 160.1 ppm in the $^{13}$C NMR spectra of dmpn-$Zn_2$(dobpdc) is possibly an unpaired carbamic acid intermediate. Together, the $^{13}$C NMR and X-ray diffraction experiments corroborate that dmpn-$M_2$(dobpdc) (M=Mg, Mn, Co, Zn) form a complex mixture of ammonium carbamate and carbamic acid species upon $CO_2$ adsorption.

Thus, the structure of the amine-appended adsorbent shows significant hydrogen-bonding between amines down the c-axis, which likely contribute to the stability of this material in the absence of $CO_2$ (vide infra) (FIG. 5, panel a). Upon exposure to 1 bar of $CO_2$, dmpn-$Zn_2$(dobpdc) forms carbamic acid pairs between diagonally adjacent diamines, running down the c-axis of the framework (FIG. 5, panels 5a-b), which is an adsorption mechanism unique to this diamine. In particular, FIG. 5, panel a, shows the dmpn ligand 502 amine appended to a first zinc ion 504. FIG. 5, panel b, shows the formation of a carbamate upon the incorporation of a $CO_2$ molecule 506 by the dmpn ligand 502. FIG. 6 shows a side view of two diagonally adjacent sets of diamines forming a carbamic acid pair 602 in dmpn-$Zn_2$(dobpdc) upon formation of carbamic acid pairs, in accordance with an embodiment of the present disclosure. The change in mechanism is responsible for the change in the adsorption profile of dmpn-$Mg_2$(dobpdc), and thus the unusual isotherm shape is diagnostic of a change in adsorption mechanism. Thus, the promising $CO_2$ adsorption properties of dmpn-$Mg_2$(dobpdc) are accounted for by its unique combination of adsorption mechanisms and the resultant unexpectedly high entropy of adsorption.

It is expected that closely related adsorbents (e.g., adsorbents prepared by appending 2-substituted- and 2,2-disubstituted-1,3-propanediamines to $Mg_2$(dobpdc) and related metal-organic frameworks possessing open metal sites)

would also adsorb $CO_2$ via this new adsorption mechanism and thus also possess the desirable adsorption properties of dmpn-$Mg_2$(dobpdc). Indeed, we have found that the diethyl analogue of dmpn, namely 2,2-diethyl-1,3-diaminopropane, shows a similar adsorption profile as dmpn, and thus likely also follows the same mechanism as dmpn (FIG. 17). In addition, the diamine with a cyclobutyl group in place of the methyl groups also shows a similar $CO_2$ adsorption profile as dmpn (FIG. 18).

As such, the present invention provides an adsorption material that comprises a metal-organic framework and a plurality of ligands. The metal-organic framework comprises a plurality of divalent cations and a plurality of polytopic organic linkers. Each respective ligand in the plurality of ligands is amine appended to a respective divalent cation in the plurality of divalent cations of the metal-organic framework. Each respective ligand in the plurality of ligands comprises a substituted 1,3-propanediamine. The adsorbent has a $CO_2$ adsorption capacity of greater than 2.50 mmol/g at 150 mbar $CO_2$ at 40° C. Moreover, the adsorbent is configured to regenerate at less than 120° C. An example ligand is diamine 2,2-dimethyl-1, 3-propanediamine. An example of the polytopic organic linker is 4,4'-dioxidobiphenyl-3,3'-dicarboxylate. Example applications for the adsorption material are removal of $CO_2$ from flue gas and biogasses.

Before the invention is described in greater detail, it is to be understood that the invention is not limited to particular embodiments described herein as such embodiments may vary. It is also to be understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

It is noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method may be carried out in the order of events recited or in any other order that is logically possible. Although any methods and materials similar or equivalent to those described herein may also be used in the practice or testing of the invention, representative illustrative methods and materials are now described.

In describing the present invention, the following terms will be employed, and are defined as indicated below.

II. Definitions

Where substituent groups are specified by their conventional chemical formulae, written from left to right, the structures optionally also encompass the chemically identical substituents, which would result from writing the structure from right to left, e.g., —$CH_2O$— is intended to also optionally recite —$OCH_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl." Alkyl groups that are limited to hydrocarbon groups are termed "homoalkyl". Exemplary alkyl groups include the monounsaturated $C_{9-10}$, oleoyl chain or the diunsaturated $C_{9-10, 12-13}$ linoeyl chain.

The term "alkylene" by itself or as part of another substituent means a divalent radical derived from an alkane, as exemplified, but not limited, by —$CH_2CH_2CH_2CH_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The terms "aryloxy" and "heteroaryloxy" are used in their conventional sense, and refer to those aryl or heteroaryl groups attached to the remainder of the molecule via an oxygen atom.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$,—S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, and —CH=CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —CO$_2$R'— represents both —C(O)OR' and —OC(O)R'.

The terms "cycloalkyl" and "heterocycloalkyl," by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Further exemplary cycloalkyl groups include steroids, e.g., cholesterol and its derivatives. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo(C$_1$-C$_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl substituent groups (or rings) that contain from one to four heteroatoms selected from N, O, S, Si and B, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes aryl, heteroaryl and heteroarene rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl, and "heteroaryl") are meant to optionally include both substituted and unsubstituted forms of the indicated species. Exemplary substituents for these species are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: H, substituted or unsubstituted aryl, substituted or unsubstituted heteroaryl, substituted or unsubstituted heterocycloalkyl, —OR', =O, =NR', =N—OR', —NR'R", —SR', halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like). These terms encompass groups considered exemplary "alkyl group substituents", which are components of exemplary "substituted alkyl" and "substituted heteroalkyl" moieties.

Similar to the substituents described for the alkyl radical, substituents for the aryl heteroaryl and heteroarene groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"", —NR—C(NR'R")=NR"', —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system. Each of the above-named groups is attached to the heteroarene or heteroaryl nucleus directly or through a heteroatom (e.g., P, N, O, S, Si, or B); and where R', R", R"' and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R"' and R"" groups when more than one of these groups is present.

Two of the substituents on adjacent atoms of the aryl, heteroarene or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl, heteroarene or heteroaryl ring may optionally be replaced with a substituent of the formula —(CRR')$_s$—X—(CR"R"')$_d$—, where s and d are independently integers of from 0 to 3, and X is —O—, —NR'—, —S—, —S(O)—, —S(O)$_2$—, or —S(O)$_2$NR'—. The substituents R, R', R" and R"' are preferably independently selected from hydrogen or substituted or unsubstituted (C$_1$-C$_6$)alkyl. These terms encompass groups considered exemplary "aryl group substituents", which are components of exemplary "substituted aryl" "substituted heteroarene" and "substituted heteroaryl" moieties.

As used herein, the term "acyl" describes a substituent containing a carbonyl residue, C(O)R. Exemplary species for R include H, halogen, substituted or unsubstituted alkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non-aromatic rings. Examples of "fused ring systems" are naphthalenes, indoles, quinolines, chromenes and the like.

As used herein, the term "heteroatom" includes oxygen (O), nitrogen (N), sulfur (S) and silicon (Si), boron (B) and phosphorous (P).

In the present disclosure, the symbol "R", unless otherwise defined, is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

The compounds disclosed herein may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present invention, whether radioactive or not, are intended to be encompassed within the scope of the present invention.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassiumcalcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present invention contain both basic and acidic functionalities that allow the compounds to be converted into either base or acid addition salts. Hydrates of the salts are also included.

The term "—COOH" as this term is used refers to is meant to optionally include —C(O)O$^-$ and —C(O)O$^-$X$^+$, wherein X$^+$ is a cationic counter-ion. Likewise, a substituent having the formula —N(R)(R) is meant to optionally include —N$^+$H(R)(R) and —N$^+$H(R)(R)Y$^-$, wherein Y$^-$ represents an anionic counter-ion. Exemplary polymers of the invention include a protonated carboxylic moiety (COOH). Exemplary polymers of the invention include a deprotonated carboxylic moiety (COO$^-$). Various polymers of the invention include both a protonated carboxylic moiety and a deprotonated carboxylic moiety.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure or be stereoisomeric mixtures. In addition, it is understood that, in any compound described herein having one or more double bond(s) generating geometrical isomers that can be defined as E or Z, each double bond may independently be E or Z a mixture thereof. Likewise, it is understood that, in any compound described, all tautomeric forms are also intended to be included.

Below are examples of specific embodiments of the present disclosure. The examples are offered for illustrative purposes only, and are not intended to limit the scope of the present invention in any way.

III. Compositions

One aspect of the present disclosure provides an adsorption material. The adsorption material comprises a metal-organic framework comprising a plurality of divalent cations and a plurality of polytopic organic linkers. The adsorption material further comprises a plurality of ligands. Each respective ligand in the plurality of ligands is amine appended to a divalent cation in the plurality of divalent cations of the metal-organic framework. Each respective ligand in the plurality of ligands comprises a substituted 1,3-propanediamine. In such embodiments, the adsorbent has a $CO_2$ adsorption capacity of greater than 2.50 mmol/g at 150 mbar $CO_2$ at 40° C. Further, the adsorption material is configured to regenerate at less than 120° C.

In some such embodiments, each respective ligand in the plurality of ligands has the structure:

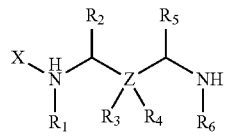

where X labels an amine of the respective ligand that is appended to a divalent cation in the plurality of divalent cations. That is, X is not an actual atom of the respective ligand but rather labels the amine on the left portion of the chemical structure given above. In such embodiments, Z is carbon, silicon or germanium, $R_1$, $R_2$, $R_3$, $R_4$, $R_5$, and $R_6$ are each independently selected from H, halogen, substituted or unsubstituted alkyl, substituted or unsubstituted heteroalkyl, substituted or unsubstituted aryl, substituted or unsubstituted heteroaryl, or substituted or unsubstituted heterocycloalkyl. In some such embodiments, when $R_3$ is H, $R_4$ is other than H or methyl, and when $R_4$ is H, $R_3$ is other than H or methyl. In some such embodiments, one of $R_3$ and $R_4$ is H and the other of $R_3$ and $R_4$ is a substituted or unsubstituted alkyl. In some such embodiments, $R_1$, $R_2$, $R_3$, $R_4$, $R_5$, and $R_6$ are each independently H, halogen, substituted or unsubstituted n-alkyl or a substituted or unsubstituted branched-chain alkyl. In some such embodiments Z is carbon.

In some such embodiments, the metal-organic framework comprises $M_2$(dobpdc), each M is a divalent cation in the plurality of cations and is in the group consisting of Mg, Ca, Mn, Cr, Fe, Co, Ni, Cu, and Zn, each dobpdc is a polytopic organic linker in the plurality of polytopic organic linkers and has the composition 4,4'-dioxidobiphenyl-3,3'-dicarboxylate, Z is carbon, and $R_3$ and $R_4$ are each methyl.

In some such embodiments, each respective ligand in the plurality of ligands has the structure:

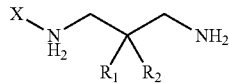

where X labels an amine of the respective ligand that is appended to a divalent cation in the plurality of divalent cations, each divalent cation in the plurality of divalent cations is Mg, Ca, Mn, Cr, Fe, Co, Ni, Cu, or Zn, and $R_1$ and $R_2$ are independently selected from H, halogen, substituted or unsubstituted alkyl, substituted or unsubstituted heteroalkyl, substituted or unsubstituted aryl, substituted or unsubstituted heteroaryl, or substituted or unsubstituted heterocycloalkyl, with the provisos that when $R_1$ is H, $R_2$ is other than H or methyl, and when $R_2$ is H, $R_1$ is other than H or methyl. In some such embodiments, the propane 1 and/or 3 positions are also substituted, for example, with one or more hydroxyl, halogen, and/or alkyl. In some such embodiments, the propane 1 and/or 3 positions are also substituted, for example, with halogen, substituted or unsubstituted alkyl, substituted or unsubstituted heteroalkyl, substituted or unsubstituted aryl, substituted or unsubstituted heteroaryl, or substituted or unsubstituted heterocycloalkyl.

In some such embodiments, each respective ligand in the plurality of ligands has the structure:

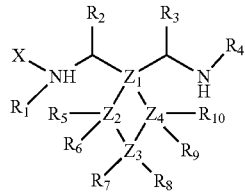

where X labels an amine of the respective ligand that is appended to a divalent cation in the plurality of divalent cations, $Z_1$, is carbon, silicon, or germanium, $Z_2$, $Z_3$, and $Z_4$, are each independently carbon, silicon, germanium, sulfur or selenium, $R_1$, $R_2$, $R_3$, and $R_4$, are each independently selected from H, halogen, substituted or unsubstituted alkyl, substituted or unsubstituted heteroalkyl, substituted or unsubstituted aryl, substituted or unsubstituted heteroaryl, or substituted or unsubstituted heterocycloalkyl, and $R_5$, $R_6$, $R_7$, $R_8$, $R_9$ and $R_{10}$ are each independently selected from H, halogen, methyl, substituted methyl, ethyl, or substituted ethyl, with the provisos that when $Z_2$ is sulfur or selenium, $R_5$ and $R_6$ are not present, when $Z_3$ is sulfur or selenium, $R_7$ and $R_8$ are not present, and when $Z_4$ is sulfur or selenium, $R_9$ and $R_{10}$ are not present. In some such embodiments, $Z_1$, $Z_2$, $Z_3$, and $Z_4$, are each carbon. In some such embodiments, $R_1$, $R_2$, $R_3$, and $R_4$ are each independently H, halogen, substituted or unsubstituted n-alkyl or a substituted or unsubstituted branched-chain alkyl.

Another aspect of the present disclosure provides an adsorption material as disclosed above in which each divalent cation in the plurality of divalent cations is Mg, Ca, Mn, Cr, Fe, Co, Ni, Cu, or Zn.

Another aspect of the present disclosure provides an adsorption material as disclosed above in which each polytopic organic linker in the plurality of polytopic organic linkers is 4,4'-dioxidobiphenyl-3,3'-dicarboxylate (dobpdc$^{4-}$).

Another aspect of the present disclosure provides an adsorption material as disclosed above in which each polytopic organic linker in the plurality of polytopic organic linkers is: 4,4"-dioxido-[1,1':4',1"-terphenyl]-3,3"-dicarboxylate (dotpdc$^{4-}$), 2,5-dioxidobenzene-1,4-dicarboxylate (dobdc$^{4-}$), 3,3' dioxide-biphenyl-4,4'-dicarboxylate (para-carboxylate-dobpdc$^{4-}$), 1,3,5-benzenetristetrazolate (BTT), 1,3,5-benzenetristriazolate (BTTri), 1,3,5-benzenetrispyrazolate (BTP), or 1,3,5-benzenetriscarboxylate (BTC).

Another aspect of the present disclosure provides an adsorption material as disclosed above in which each divalent cation in the plurality of divalent cations is Mg, Ca, Mn, Cr, Fe, Co, Ni, Cu, or Zn, and each polytopic organic linker in the plurality of polytopic organic linker is 4,4'-dioxido-biphenyl-3,3'-dicarboxylate (dobpdc$^{4-}$).

Another aspect of the present disclosure provides an adsorption material as disclosed above in which the metal-organic framework is a framework selected from the group of frameworks consisting essentially of (a) M-BTT, where each M is a divalent cation in the plurality of cations and is in the group consisting of Ca, Fe, Mn, Cu, Co, Ni, Cr, and Cd, and each BTT is a polytopic organic linker in the plurality of polytopic organic linkers and has the composition 1,3,5-benzenetristetrazolate, and (b) Q-BTTri, where each Q is a divalent cation in the plurality of cations and is in the group consisting of Cr, Mn, Fe, Co, Ni, and Cu, and each BTTri is a polytopic organic linker in the plurality of polytopic organic linkers and has the composition 1,3,5-benzenetristriazolate.

Another aspect of the present disclosure provides an adsorption material as disclosed above in which the metal-organic framework is a framework selected from the group of frameworks consisting essentially of (a) M-BTP, where each M is a divalent cation in the plurality of cations and is in the group consisting of Co, Ni, and Zn, and each BTP is a polytopic organic linker in the plurality of polytopic organic linkers and has the composition 1,3,5-benzenetrispyrazolate, and (b) $Q_3(BTC)_2$, where each Q is a divalent cation in the plurality of cations and is in the group consisting of Cu and Cr, and each BTC is a polytopic organic linker in the plurality of polytopic organic linkers and has the composition 1,3,5-benzenetriscarboxylate.

Another aspect of the present disclosure provides an adsorption material as disclosed above in which the metal-organic framework comprises $M_2$(dobdc), each M is a divalent cation in the plurality of cations and is in the group consisting of Mg, Ca, Mn, Cr, Fe, Co, Ni, Cu, or Zn, and each dobdc$^{4-}$ is a polytopic organic linker in the plurality of polytopic organic linkers and has the composition 2,5-dioxido-1,4-benzenedicarboxylate.

Another aspect of the present disclosure provides an adsorption material as disclosed above in which the metal-organic framework comprises open metal sites and ligand occupied metal sites.

Another aspect of the present disclosure provides an adsorption material as disclosed above in which each divalent cation in the plurality of divalent cations is Mg.

Another aspect of the present disclosure provides an adsorption material as disclosed above in which the differential entropy of $CO_2$ adsorption of the adsorption material is less than −175 J/mol·K.

Another aspect of the present disclosure provides an adsorption material as disclosed above in which the differential enthalpy of $CO_2$ adsorption of the adsorption material is less than −85 kJ/mol.

Another aspect of the present disclosure provides an adsorption material as disclosed above in which the differential entropy of $CO_2$ adsorption of the adsorption material is less than −200 J/mol·K, and the differential enthalpy of $CO_2$ adsorption of the adsorption material is less than −80 kJ/mol.

Another aspect of the present disclosure provides an adsorption material as disclosed above in which exposure of the adsorption material to $CO_2$ results in the formation of carbamic acid pairs between adjacent ligands in the plurality of ligands in the adsorption material.

Another aspect of the present disclosure provides an adsorption material as disclosed above in which the adsorption material has a $CO_2$ adsorption capacity of between 2.50 and 3.00 mmol/g at 150 mbar $CO_2$ at 40° C.

Another aspect of the present disclosure provides an adsorption material as disclosed above in which the adsorption material has a working capacity of greater than of 2.3 mmol/g over less than a 70° C. temperature differential for $CO_2$.

Another aspect of the present disclosure provides an adsorption material as disclosed above further comprising an absorbed gas (e.g., carbon dioxide).

Another aspect of the present disclosure provides an adsorption material as disclosed above in which the plurality of divalent cations and the plurality of polytopic organic linkers form hexagonal one-dimensional channels lined with coordinatively unsaturated divalent cations from the plurality of divalent cations.

Another aspect of the present disclosure provides an adsorption material as disclosed above in which the adsorption material exhibits an adsorption profile indicative of a $CO_2$ adsorption mechanism that comprises formation of ammonium carbamate chains and carbamic acid pairs.

In some embodiments, the entropy of $CO_2$ adsorption of the adsorption material is greater than −175 J/mol·K. In some embodiments, the entropy of $CO_2$ adsorption of the adsorption material is greater than −185 J/mol·K. In some embodiments, the entropy of $CO_2$ adsorption of the adsorption material is greater than −195 J/mol·K.

In some embodiments, the adsorption material has a heat of $CO_2$ adsorption is less than −85 kJ/mol. In some embodiments, the adsorption material has a heat of $CO_2$ adsorption is less than −75 kJ/mol.

In some embodiments, exposure of the adsorption material to $CO_2$ results in the formation of carbamic acid pairs between adjacent ligands in the plurality of ligands in the adsorption material as illustrated in FIG. 6 for dmpn-$Zn_2$(dobpdc).

In some embodiments, the metal-organic framework comprises $M_2$(dobpdc), where M is Mg, Ca, Mn, Cr, Fe, Co, Ni, Cu, or Zn, and dobpdc is 4,4'-dioxidobiphenyl-3,3'-dicarboxylate.

In some embodiments, each respective ligand in the plurality of ligands has the structure:

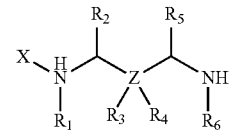

where X is label of the amine of the ligand that coordinates with a divalent cation of the metal-organic framework (e.g., Mg, Ca, Mn, Cr, Fe, Co, Ni, Cu, or Zn), $R_1$, $R_2$, $R_5$, and $R_6$ are each independently selected from H, halogen, substituted or unsubstituted alkyl, substituted or unsubstituted heteroalkyl, substituted or unsubstituted aryl, substituted or unsubstituted heteroaryl, or substituted or unsubstituted heterocycloalkyl, Z is carbon, silicon, germanium, sulfur, or selenium, and where one of $R_1$ and $R_2$ is H and the other of $R_1$ and $R_2$ is a substituted or unsubstituted alkyl other than methyl. In some embodiments, the metal-organic framework comprises $M_2$(dobpdc), M is Mg, Ca, Mn, Cr, Fe, Co, Ni, Cu, or Zn, and $R_3$ and $R_4$ are each methyl.

In some embodiments, the metal-organic framework is a framework selected from the group of frameworks consisting essentially of M-BTT where (M is the divalent cation and is Ca, Fe, Mn, Cu, Co, Ni, Cr, or Cd) and (BTT is the polytopic organic linker and is 1,3,5-benzenetristetrazolate) and M-BTTri where (M is the divalent cation and is Cr, Mn, Fe, Co, Ni, or Cu) and (BTTri is the polytopic organic linker and is 1,3,5-benzenetristriazolate). Such metal-organic frameworks are disclosed in International Publication Number WO2013/059527 A1, which is hereby incorporated by reference.

In some embodiments, the metal-organic framework is a framework selected from the group of frameworks consisting essentially of M-BTP where (M is the divalent cation and is Co, Ni, or Zn) (BTP is the polytopic organic linker and is 1,3,5-benzenetrispyrazolate) and $M_3(BTC)_2$ where (M is the divalent cation and is Cu or Cr) and (BTC is the polytopic organic linker and is 1,3,5-benzenetriscarboxylate). Such metal-organic frameworks are disclosed in International Publication Number WO2013/059527 A1, which is hereby incorporated by reference.

In some embodiments, the metal-organic framework is a framework selected from the group of frameworks consisting essentially of M-BTP where (M is the divalent cation and is Co, Ni, Zn) (BTP is the polytopic organic linker and is 1,3,5-benzenetrispyrazolate) and $M_3(BTC)_2$ where (M is the divalent cation and is Cu or Cr) and (BTC is the polytopic organic linker and is 1,3,5-benzenetriscarboxylate). Such metal-organic frameworks are disclosed in International Publication Number WO2013/059527 A1, which is hereby incorporated by reference.

In some embodiments, the metal-organic framework comprises $M_2(dobdc)$, where M is the divalent cation and is Mg, Ca, Mn, Cr, Fe, Co, Ni, Cu, or Zn, and dobdc is the polytopic organic linker and is 2,5-dioxido-1,4-benzenedicarboxylate.

In some embodiments, the metal-organic framework comprises open metal sites and ligand occupied metal sites.

In some embodiments, the adsorption material has a $CO_2$ adsorption capacity of greater than 2.80 mmol/g at 150 mbar $CO_2$ at 40° C., and the adsorption material has a $CO_2$ adsorption capacity of less than 0.75 mmol/g at 1 bar $CO_2$ at 100° C.

In some embodiments, the adsorption material has a $CO_2$ adsorption capacity of greater than 2.85 mmol/g at 150 mbar $CO_2$ at 40° C., and the adsorption material has a $CO_2$ adsorption capacity of less than 0.55 mmol/g at 1 bar $CO_2$ at 100° C.

In some embodiments, the adsorption material has a working capacity of greater than of 2.3 mmol/g over less than a 70° C. temperature differential for $CO_2$.

IV. Methods

Another aspect of the present disclosure provides methods of synthesizing the adsorption materials of the present disclosure and for testing their physical properties.

General procedures. All synthetic manipulations were carried out under air unless noted otherwise. All diamines and solvents were purchased from commercial sources and used without further purification. The ligand $H_4$dobpdc was purchased from Hangzhou Trylead Chemical Technology Co. The metal-organic frameworks $M_2(dobpdc)$ (M=Mg, Mn, Co, Ni, Zn) were prepared according to modified literature procedures, as discussed below. Powder X-ray diffraction patterns (FIGS. 20 and 21) and 77 K $N_2$ adsorption isotherms (FIGS. 22 and 23) for these materials are consistent with those from the literature. See, Siegelman et al., 2017, J. Am. Chem. Soc. 139, 10526; and McDonald et al., 2015, Nature 519, 303. $^1$H NMR spectra for digestion experiments were collected on a Bruker AMX 300 MHz NMR spectrometer and referenced to residual DMSO (δ 2.50 ppm). Attenuated total reflectance (ATR) infrared (IR) spectra were collected on a PerkinElmer Spectrum 400 Fourier transform (FT) IR spectrometer. Differential scanning calorimetry (DSC) measurements were carried out using a TA Instruments Q200 differential scanning calorimeter. Laboratory powder X-ray diffraction patterns were collected using a Bruker AXS D8 Advance diffractometer using Cu Ku radiation (λ=1.5418 Å).

Synthesis of Diamine-Appended $M_2(dobpdc)$ (M=Mg, Ni) Compounds. See Siegelman, 2017, J. Am. Chem. Soc. 139, 10526. A 20 mL scintillation vial was charged with 4 mL of toluene and 1 mL of the diamine (for 2,2-dimethyl-1,3-diaminopropane, the diamine was melted prior to use). Methanol-solvated $M_2(dobpdc)$ (~20 mg, M=Mg or Ni) was filtered and washed with successive aliquots of toluene (2×10 mL). Note: $M_2(dobpdc)$ should not be allowed to dry completely as this can in some cases lead to decomposition of the framework. See, McDonald et al., 2012, J. Am. Chem. Soc. 134, 7056. Next, $M_2(dobpdc)$ was added to the diamine solution, and the vial was swirled several times and allowed to stand at room temperature for 24 hours. The mixture was then filtered, and the resulting powder was thoroughly washed with toluene (3×20 mL) and allowed to dry for two minutes, yielding ~30 mg of the diamine-appended metal-organic framework. In all cases, $^1$H NMR digestion experiments (See $^1$H NMR Analysis of Digested Metal-Organic Frameworks, below) confirmed that the ratios of diamine to $Mg^{2+}$ sites were >10000, as set forth in Table 2 below, indicative of solvation by excess diamine.

TABLE 2

Representative diamine loadings for diamine-appended $Mg_2(dobpdc)$ analogues calculated from the ratio of diamine peak integral(s) to ligand peak integrals by 1H NMR following sample digestion with DC1 in DMSO-$d_6$. For samples in which more than one diamine peak could be integrated cleanly, the reported diamine loading is an average of the ratios calculated using each diamine peak. Error is estimated as ±5%. All samples were prepared through the newly developed rapid synthetic method of submerging methanol-solvated $Mg_2(dobpdc)$ in a 20 v/v % solution of diamine in toluene. In the table (*) indicates that dry toluene and dry diamine were required to achieve high diamine loadings for 2°/2° diamines.

| | Diamine loading (% per $Mg^{2+}$) |
|---|---|
| N,N'-dimethylethylenediamine (m-2-m)* | 93% |
| N,N'-diethylethylenediamine (e-2-e)* | 93% |
| i-2-i* | 70% |
| N-methylethylenediamine (m-2) | 118% |
| N-ethylethylenediamine (e-2) | 103% |
| N-isopropylethylenediamine (i-2) | 102% |
| mm-2 | 104% |

TABLE 2-continued

Representative diamine loadings for diamine-appended $Mg_2(dobpdc)$ analogues calculated from the ratio of diamine peak integral(s) to ligand peak integrals by 1H NMR following sample digestion with DCl in DMSO-$d_6$. For samples in which more than one diamine peak could be integrated cleanly, the reported diamine loading is an average of the ratios calculated using each diamine peak. Error is estimated as ±5%. All samples were prepared through the newly developed rapid synthetic method of submerging methanol-solvated $Mg_2(dobpdc)$ in a 20 v/v % solution of diamine in toluene. In the table (*) indicates that dry toluene and dry diamine were required to achieve high diamine loadings for 2°/2° diamines.

| | Diamine loading (% per $Mg^{2+}$) |
|---|---|
| ee-2 | 102% |
| ii-2 | 103% |

Activation of the samples at 130-150° C. for 20-30 minutes under flowing $N_2$ was sufficient to remove the excess diamine from the pores. A modified procedure (Bacsik et al., 2011, Langmuir 27, 11118) was used to prepare small-scale samples of dmpn-appended $M_2(dobpdc)$ (M=Mn, Co, Zn) as discussed below. Powder Xray diffraction patterns, infrared spectra, pure $CO_2$ adsorption/desorption isobars, and thermogravimetric $N_2$ decomposition curves for all new diamine-appended metal-organic frameworks prepared in this work were performed as discussed below.

Gram-Scale Synthesis of $Zn_2(dobpdc)$ Powder. The previously published synthetic route for $Zn_2(dobpdc)$ powder (McDonald et al., 2015, Nature 519 (7543), 303) was found to be readily scalable at increased concentration. In a round-bottom flask, 2.74 g (10.0 mmol) $H_4(dobpdc)$ and 8.35 g (32.0 mmol) $ZnBr_2.2H_2O$ were dissolved in a mixture of 250 mL of ethanol and 250 mL of N,N-dimethylformamide (DMF). The solution was stirred for twelve hours at 120° C., producing an off-white powder. The reaction solution was decanted, and the powder was soaked three times in 200 mL of DMF for six hours at 60° C. and three times in 200 mL of methanol for six hours at 60° C. The material was then filtered and fully desolvated by heating at 250° C. under dynamic vacuum for 12 hours. Following desolvation, the activated material was stored in a $N_2$-filled glovebox.

Synthesis of Diamine-Appended $Zn_2(dobpdc)$ Powders. The frameworks m-2-m-$Zn_2(dobpdc)$ (m-2-m="mmen"=N,N'-dimethylethylenediamine), e-2-e-$Zn_2(dobpdc)$ (e-2-e=N,N'-diethylethylenediamine), e-2-$Zn_2(dobpdc)$ (e-2=N-ethylethylenediamine), and i-2-$Zn_2(dobpdc)$ (i-2=N-isopropylethylenediamine) were prepared through modification of the previously reported procedure for the mmen-$M_2(dobpdc)$ series of frameworks. For m-2-m-$Zn_2$(dobpdc), 15 mg of fully desolvated $Zn_2(dobpdc)$ was submerged in 0.8 mL of 20% (v/v) dry m-2-m in hexanes (20 equiv diamine per $Zn^{2+}$) in a 4 mL vial in a $N_2$-filled glovebox. For e-2-e-, e-2-, and i-2-$Zn_2(dobpdc)$, solutions of 20% (v/v) diamine in hexanes (e-2-e) or toluene (e-2, i-2) were dried by stirring over $CaH_2$ for three hours at 60° C. In a $N_2$-filled glovebag, a quantity of diamine solution corresponding to 10 (e-2), 30 (e-2-e), or 50 (i-2) equiv diamine per $Zn^{2+}$ was transferred by syringe to a 4 mL scintillation vial containing 20 mg of fully-desolvated $Zn_2(dobpdc)$. In all cases, the suspension was left undisturbed for a minimum of four hours. For m-2-m and e-2-e, the resulting diamine-appended powder was soaked three times in 4 mL-portions of dry hexanes and was stored under dry hexanes. For e-2 and i-2, the diamine-appended powder was filtered and washed with three 10 mL portions of toluene followed by three 10 mL portions of hexanes. All diamine-appended $Zn_2(dobpdc)$ frameworks were stored under nitrogen and characterized by thermogravimetric analysis within 24 hours of preparation. For example, FIG. 19 illustrates thermogravimetric decomposition trace (curve 1902) and derivative decomposition trace (dTG, 1904) for methanol-solvated $Mg_2(dobpdc)$. Note that attempts to prepare m-2-$Zn_2$(dobpdc) (m-2=N-methylethylenediamine) following this procedure resulted in loss of crystallinity of the powder.

$^1$H NMR Analysis of Digested Metal-Organic Frameworks. To analyze diamine loading, ~5 mg of each diamine-appended $Mg_2(dobpdc)$ powder was digested in a solution of 20 μL of 35 wt. % DCl in $D_2O$ and 1 mL of DMSO-$d_6$. The solution was sonicated and/or heated at 60° C. until the solid fully dissolved. $^1$H NMR spectra were acquired on Bruker AV-300, ABV-400, or AVQ-400 instruments at the University of California, Berkeley NMR facility. Diamine loadings were determined from the ratios of the integrated diamine resonances to those of the ligand.

Powder X-Ray Diffraction. Laboratory powder X-ray diffraction patterns were collected using a Bruker AXS D8 Advance diffractometer with Cu Kα radiation (λ=1.5418 Å), a Göbel mirror, and a Lynxeye linear position-sensitive detector, and the following optics: fixed divergence slit (0.6 mm), receiving slit (3 mm), and secondary-beam Soller slits (2.5°). Generator settings were 40 kV and 40 mA. All powder X-ray diffraction patterns were collected at room temperature in air on as-synthesized samples immediately following filtration.

Infrared Spectroscopy. Infrared spectra were collected using a PerkinElmer Avatar Spectrum 400 FTIR spectrophotometer equipped with a Pike attenuated total reflectance (ATR) accessory. Spectra for all diamine-appended $Mg_2$(dobpdc) analogues were collected for as-synthesized samples. For m-2-m-, e-2-e-, m-2-, e-2-, mm-2-, and ee-2-$Mg_2(dobpdc)$, in situ FTIR spectra were collected on activated and $CO_2$-dosed samples at room temperature by enclosing the ATR accessory within a plastic glovebag with positive gas pressure. Prior to collecting spectra, the glovebag was evacuated and exchanged with the desired gas three times and then purged for one hour. Spectra of activated samples were collected within the glovebag under positive $N_2$ pressure at room temperature following activation of the samples in 20 mL scintillation vials under flowing $N_2$ for two hours at 120° C. Spectra of $CO_2$-dosed samples were collected following collection of spectra under $N_2$ using the same sample aliquots.

$CO_2$ Isobars of Diamine-Appended $Zn_2(dobpdc)$ Powders. Isobars of diamine-appended $Zn_2(dobpdc)$ powders under 100% $CO_2$ were collected using a TA Instruments Q5000 TGA with a flow rate of 25 mL/min for all gases. Masses were uncorrected for buoyancy effects. The frameworks m-2-m- and e-2-e-$Zn_2(dobpdc)$ were transferred as slurries in hexanes to the tared aluminum analysis pans, while the frameworks e-2- and i-2-$Zn_2(dobpdc)$ were transferred rapidly in air as dry powders. The frameworks were first activated under flowing $N_2$ using the following conditions: 1 h at 50° C. for m-2-m- and e-2-e-$Zn_2(dobpdc)$; 45 min at 50° C. for i-2-Zn$_2$(dobpdc); and 25 min at 100° C. for e-2-Zn$_2$(dobpdc). To observe the cooperative adsorption step temperature, the cooling branch of the isobar started at a temperature above the step temperature. Therefore, prior to cooling, the temperature was rapidly increased to 80° C. for m-2-m, e-2-e, and e-2, or to 120° C. for i-2. Upon reaching the set temperature, the gas was switched to 100% CO$_2$, the mass was normalized to 0, and the cooling branch of the isobar was initiated. For e-2-e-Zn$_2$(dobpdc), the maximum temperature of initial CO$_2$ exposure was restricted to 80° C. to minimize diamine volatilization; however, the rapid rise in CO$_2$ adsorption upon exposure to CO$_2$ at 80° C. is consistent with a CO$_2$ insertion threshold at or above this temperature. Note that this additional heating step between activation and CO$_2$ was not required for the single crystal experiments, in which CO$_2$ was dosed at 25° C. following activation.

Calculations of Differential Enthalpies and Entropies of Adsorption. Isotherms were fit by linear interpolation. Using the isotherm fits, the exact pressures ($p_q$) corresponding to specific CO$_2$ loadings (q) were determined at different temperatures (T). The Clausius-Clapeyron relationship, equation 1 below, was used to calculate the differential enthalpies of adsorption ($\Delta h_{ads}$) based on the slopes of the linear trendlines fit to ln($p_q$) vs 1/T at constant values of q. The y-intercepts of these linear trendlines are equal to $-\Delta_{Sads}/R$ at each loading (with $p_0$=1 bar) (See, Campbell and Sellers, 2013, Chem. Rev. 113, 4106) and thus were used to determine the corresponding differential entropies of adsorption:

$$\ln(p_q) = \left(\frac{\Delta h_{ads}}{R}\right)\left(\frac{1}{T}\right) + c. \quad (1)$$

Single-Crystal and Powder X-ray Diffraction Structures. Single crystals of Zn$_2$(dobpdc) and diamine-appended analogues were prepared according to modified literature procedures. See, Siegelman et al., 2017, J. Am. Chem. Soc. 139, 10526. Additional details and structures are included in the Supporting Information of Milner et al., 2017, J. Am. Chem. Soc. 139, 13541-13553.

VI. Technical Applications

In one aspect of the present disclosure, there is provided a number of technical applications for the adsorption material.

One such application is carbon capture from coal flue gas, such as powerplant exhaust. The increasing atmospheric levels of carbon dioxide (CO$_2$), which are contributing to global climate change, warrant new strategies for reducing CO$_2$ emissions from point sources such as power plants. In particular, coal-fueled power plants are responsible for 30-40% of global CO$_2$ emissions. See, Quadrelli et al., 2007, "The energy-climate challenge: Recent trends in CO$_2$ emissions from fuel combustion," Energy Policy 35, pp. 5938-5952, which is hereby incorporated by reference. Thus, there remains a continuing need for the development of new adsorbents for carbon capture from coal flue gas, a gas stream consisting of CO$_2$ (15-16%), O$_2$ (3-4%), H$_2$O (5-7%), N$_2$ (70-75%), and trace impurities (e.g. SO$_2$, NO$_x$) at ambient pressure and 40° C. See, Planas et al., 2013, "The Mechanism of Carbon Dioxide Adsorption in an Alkylamine-Functionalized Metal-Organic Framework," J. Am. Chem. Soc. 135, pp. 7402-7405, which is hereby incorporated by reference. In particular, for a temperature swing adsorption process an adsorbent should possess the following properties: (a) a high working capacity with a minimal temperature swing, in order to minimize regeneration energy costs; (b) high selectivity for CO$_2$ over the other constituents of coal flue gas; (c) 90% capture of CO$_2$ under flue gas conditions; (d) effective performance under humid conditions; and (d) long-term stability to adsorption/desorption cycling under humid conditions. Herein, it is demonstrated that dmpn-Mg$_2$(dobpdc) possess all of these characteristics, making it an extremely promising adsorbent for carbon capture from coal flue gas.

Another such application is carbon capture from crude biogas such as crude biogas, natural gas, or landfill gas. Biogas, for instance the CO$_2$/CH$_4$ mixtures produced by the breakdown of organic matter, is a renewable fuel source with the potential to replace traditional fossil fuel sources. Removal of CO$_2$ from the crude biogas mixtures is one of the most challenging aspects of upgrading this promising fuel source to pipeline quality methane. Therefore, the use of adsorbents to selectively remove CO$_2$ from high pressure CO$_2$/CH$_4$ mixtures with a high working capacity and minimal regeneration energy has the potential to greatly reduce the cost of using biogas in place of natural gas for applications in the energy sector. Some embodiments of the present disclosure provide a method that comprises contacting a biogas, natural gas, landfill gas, or non-renewable gas comprising CO$_2$ and CH$_4$ with any adsorption material of the present disclosure to reversibly adsorb CO$_2$ from the gas thereby generating an adsorption material enriched for CO$_2$ and a residual gas that is greater than 80 percent pure methane, 90 percent pure methane, or 98 percent pure methane. In some such embodiments, the method further comprises stripping a major portion of the CO$_2$ from the adsorption material enriched for CO$_2$ using a temperature swing adsorption method, vacuum swing adsorption method, a pressure swing adsorption method, a concentration swing adsorption method, or a combination thereof.

The disclosed compositions (adsorption materials) can be used to strip a major portion of the CO$_2$ from the adsorption material enriched for CO$_2$ using a temperature swing adsorption method or a vacuum swing adsorption method. Example temperature swing adsorption methods and vacuum swing adsorption methods are disclosed in International Publication Number WO2013/059527 A1, which is hereby incorporated by reference.

Another aspect of the present disclosure provides a method for abating CO$_2$ from a flue gas, such as natural gas flue gas. In such embodiments, the flue gas is contacted with any adsorption material of the present disclosure to reversibly adsorb CO$_2$ from the flue gas thereby generating an adsorption material enriched for CO$_2$ and then stripping a major portion of the CO$_2$ from the adsorption material enriched for CO$_2$ using a using a temperature swing adsorption method, vacuum swing adsorption method, a pressure swing adsorption method, a concentration swing adsorption method, or a combination thereof.

Another other aspect of the present disclosure provides air capture methods in which excess CO$_2$ in the atmosphere is reduced in order to address CO$_2$ contribution from mobile sources such as automobile and airplane emissions for abating CO$_2$ from a flue gas, such as natural gas flue gas. In some such embodiments, atmospheric air is contacted with any adsorption material of the present disclosure to reversibly adsorb CO$_2$ from the air thereby generating an adsorption material enriched for CO$_2$ and then stripping a major portion of the CO$_2$ from the adsorption material enriched for CO$_2$ using a using a temperature swing adsorption method, vacuum swing adsorption method, a pressure swing adsorption method, a concentration swing adsorption method, or a combination thereof.

Still another aspect of the present disclosure provides a method of sequestering carbon dioxide produced by a source. The method comprises exposing the carbon dioxide to an adsorption material of the present disclosure whereby the carbon dioxide is reversibly sequestered into the adsorption material. In some such embodiments, the method further comprises regenerating the adsorption material enriched for $CO_2$ using a temperature swing adsorption method, vacuum swing adsorption method, a pressure swing adsorption method, a concentration swing adsorption method, or a combination thereof.

Still another aspect of the present disclosure provides a method of sequestering carbon dioxide from a multi-component gas mixture. In some such embodiments the multi-component gas mixture comprises $CO_2$ and at least one of $N_2$, $H_2O$, and $O_2$. The method comprises exposing the multi-component gas mixture to an adsorption material of the present disclosure whereby a least fifty percent, at least sixty percent, or at least eighty percent of the carbon dioxide within the multi-component gas mixture is reversibly sequestered into the adsorption material. In some such embodiments, the method further comprises regenerating the adsorption material enriched for $CO_2$ using a temperature swing adsorption method, vacuum swing adsorption method, a pressure swing adsorption method, a concentration swing adsorption method, or a combination thereof.

EXAMPLES

Example 1—coal flue gas. The adsorption isotherms of dmpn-$Mg_2$(dobpdc) indicates that is capable of approximately 90% capture of $CO_2$ from coal flue gas stream at 40° C. (e.g., the 40° C. step occurs at approximately 15 mbar). Based on the 150 mbar $CO_2$ adsorption capacity at 40° C. of 2.92 mmol/g and the 1 bar $CO_2$ adsorption capacity at 100° C. of 0.49 mmol/g, a working capacity of 2.42 mmol/g (9.1 wt %) can be achieved with only a 60° C. temperature swing. See, FIG. 3. Using this working capacity along with the average differential enthalpy of adsorption reversible heat capacity (1.46 J/g·° C.) and the average differential enthalpy of adsorption (−71.5 kJ/mol) of dmpn-$Mg_2$(dobpdc), a regeneration energy of 2.4 MJ/kg $CO_2$ was determined. These values are superior to those obtained for aqueous monoethanolamine, the leading sorbent for carbon capture and sequestration, where a 2 wt % working capacity can be achieved with a 80° C. temperature swing (40° C. to 120° C.) and a regeneration energy of 3.6-4.5 MJ/kg $CO_2$.

In addition, dmpn-$Mg_2$(dobpdc) shows tremendous non-competitive selectivity for $CO_2$ over $N_2$ (882) and $O_2$ (517) under dry flue gas conditions. See, FIG. 7. Reflecting the excellent selectivity of dmpn-$Mg_2$(dobpdc) for $CO_2$ over $N_2$, breakthrough measurements using a 15% $CO_2$ in $N_2$ stream showed rapid breakthrough of $N_2$ (0.02 mmol/g adsorbed) before $CO_2$ breakthrough (2.8 mmol/g adsorbed). See FIG. 8. Breakthrough experiments with a humid (~2% water) 15% $CO_2$ in $N_2$ feed on an adsorbent column pre-saturated with water showed equivalent or improved breakthrough capacities and selectivities for $CO_2$ over 3 consecutive cycles.

Lastly, dmpn is available commercially in large quantities, and it has been demonstrated that dmpn-$Mg_2$(dobpdc) can be prepared on 5 gram scale with no change in its adsorption properties. See FIG. 9 in which the $CO_2$ isobar for dmpn-$Mg_2$(dobpdc) prepared on a mg scale 902 is compared to the $CO_2$ isobar for dmpn-$Mg_2$(dobpdc) prepared on a gram scale 904. Thus, the use of dmpn-$Mg_2$(dobpdc) in place of aqueous amine sorbents should allow for reduced process costs and improved efficiency for carbon capture from coal flue gas.

Solid states $^3C$ NMR experiments. Due to the presence of 5-7% water in coal flue gas, the performance of adsorbents under humid conditions is also an important factor for determining their applicability for carbon capture. Solid state $^{13}C$ NMR experiments confirm that the mechanism for $CO_2$ adsorption in dmpn-$Mg_2$(dobpdc) is the same under dry and humid conditions, reflecting the robustness of the combination of adsorption mechanisms. See FIG. 10.

Performance of dmpn-$Mg_2$(dobpdc) under Humid Flue Gas Conditions. Although dmpn-$Mg_2$(dobpdc) shows promising properties in single-component measurements, assessing its performance for carbon capture under humid conditions is relevant due to the high water content (5-7%) of coal flue gas. In general, materials bearing open metal coordination sites adsorb water and $CO_2$ at the same binding sites, with more favorable adsorption of water, generally leading water to outcompete $CO_2$ in multicomponent measurements. See, Woerner et al., 2016, J. Phys. Chem. C 120, 360; Mason et al., 2015, J. Am. Chem. Soc. 137, 4787; Datta et al., 2015, Science 350, 302; Joos et al., 2013, Langmuir 29, 15936; and Liu et al., 2010, Langmuir 26, 14301. In contrast, isothermal measurements confirm that the average differential heat of adsorption for water in dmpn-$Mg_2$(dobpdc) is −47±1 kJ/mol, which is less negative than that for $CO_2$ (−73±1 kJ/mol) due to the different binding modes of these two adsorbates. However, these single component measurements do not necessarily reflect the ability of dmpn-$Mg_2$(dobpdc) to competitively adsorb $CO_2$ under humid conditions.

Multicomponent measurements of $CO_2$ adsorption in the presence of water are more informative for evaluating the potential of dmpn-$Mg_2$(dobpdc) for carbon capture. See, Mason et al., 2015, J. Am. Chem. Soc. 137, 4787. Therefore, humid thermogravimetric analysis (TGA) measurements were performed by bubbling the incident gas stream through water to study the ability of dmpn-$Mg_2$(dobpdc) to adsorb $CO_2$ under humid conditions (FIG. 11). One drawback of these measurements is that the exact composition of gases adsorbed cannot be reliably determined, although comparison of the mass changes observed with different gas streams provides insight into the behavior of the adsorbent under dry and humid conditions. The compound dmpn-$Mg_2$(dobpdc) adsorbs a negligible amount of dry $N_2$ at 40° C. (line 1106, FIG. 11). Therefore, $N_2$ coadsorption can be assumed to be negligible in these multicomponent measurements. Cooling dmpn-$Mg_2$(dobpdc) below 60° C. under a humid $N_2$ stream led to an increase in mass relative to the dry $N_2$ isobar. The difference between the dry and humid $N_2$ cooling isobars should primarily be due to water adsorption and suggests that 1.58 g of water per 100 g of adsorbent (0.22 molecules per diamine) are taken up at 40° C. in the absence of $CO_2$. Indeed, comparing this uptake to the 40° C. water isotherm (suggests that the partial pressure of water in the humidified stream is approximately 13 mbar, or 1.3%. Importantly, step-shaped adsorption of $H_2O$ was not observed in this assay, suggesting that any step-shaped adsorption observed with humidified $CO_2$ streams results from $CO_2$ adsorption.

Cooling dmpn-$Mg_2$(dobpdc) under a stream of dry 15% $CO_2$ in $N_2$ led to step-shaped adsorption of $CO_2$ (line 1102, FIG. 11), with a $CO_2$ uptake of 14.3 g/100 g (3.24 mmol/g) at 40° C. This is comparable to the 2.91 mmol/g of $CO_2$ adsorbed at 150 mbar in the 40° C. isotherm (FIG. 3a).

Significantly, stepshaped adsorption was also observed upon cooling dmpn-$Mg_2$(dobpdc) under humid 15% $CO_2$ in $N_2$ (FIG. 11, line 1104), suggesting that $CO_2$ capture in dmpn-$Mg_2$(dobpdc) occurs readily in the presence of water. The apparent $CO_2$ adsorption step of dmpn-$Mg_2$(dobpdc) shifted to a slightly higher temperature under the humid gas stream, indicating that water promotes $CO_2$ adsorption. The same increase in apparent $CO_2$ adsorption step temperature was observed with humidified pure $CO_2$ and 5% $CO_2$ in $N_2$ streams. This effect is likely due to water stabilizing the $CO_2$ adsorbed phase through hydrogen-bonding or ion-dipole interactions, as has been observed with other amine-functionalized materials. See, Didas et al., 2014, J. Phys. Chem. Lett. 5, 4194; Bacsik et al., 2011, Langmuir 27, 11118; Sayari and Belmabkhout, 2010, J. Am. Chem. Soc. 132, 6312; and Sema-Guerrero and Sayari, 2008, Ind. Eng. Chem. Res. 7, 9406. One consequence of this effect is that slightly higher regeneration temperatures were found to be required under humid conditions, although regeneration at 100° C. was still sufficient to desorb $CO_2$ and water from dmpn-$Mg_2$(dobpdc) under an atmosphere of humid pure $CO_2$. Consistently, dmpn-$Mg_2$(dobpdc) exhibits a greater increase in mass after the adsorption step under humid conditions compared to dry conditions. This increased uptake suggests that dmpn-$Mg_2$(dobpdc) coadsorbs significantly more water after $CO_2$ adsorption, leading to an additional uptake of 9.98 g/100 g at 40° C. under humid 15% $CO_2$ in $N_2$ compared to the dry stream (FIG. 11). Together, these findings indicate favorable interactions between water and adsorbed $CO_2$ in dmpn-$Mg_2$(dobpdc), which could lead to enhanced uptake of low partial pressures of $CO_2$ under humid conditions.

Cycling dmpn-$Mg_2$(dobpdc). The compound dmpn-$Mg_2$(dobpdc) could be cycled 1000 times under humid conditions without decomposition or diamine loss (FIG. 12). Selectivity for $CO_2$ in the presence of water was confirmed through multiple humid breakthrough cycles with simulated humid flue gas on an adsorbent column pre-saturated with water. With all of these properties together, dmpn-$Mg_2$(dobpdc) is a promising candidate for carbon capture from humid coal flue gas.

Example 2—carbon capture from crude biogas. Many of the properties that make dmpn-$Mg_2$(dobpdc) promising for carbon capture from coal flue gas, including its low regeneration temperature (100° C. under 1 bar $CO_2$), low step pressure (~15 mbar at 40° C.), robustness to adsorption/desorption cycling, water stability, and scalability, also make it promising for $CO_2$ removal from crude biogas. Typically, biogas consists of a low to moderate pressure (1-6 bar) feed consisting of approximately 30-50% $CO_2$ in $CH_4$. In order to prepare pipeline quality (>98% pure) methane, selective $CO_2$ capture at pressures as low as 2% of the inlet pressure is required. For example, for a 1 bar feed, selective $CO_2$ capture must be possible at $CO_2$ partial pressures as low as 80 mbar, which is achievable by dmpn-$Mg_2$(dobpdc) at temperatures lower than 60° C. (FIG. 3). For a 1 bar feed, selective $CO_2$ capture must be possible at $CO_2$ partial pressures as low as 20 mbar, which is achievable by dmpn-$Mg_2$(dobpdc) at temperatures as low as 40° C.

The low pressure $CO_2$ and $CH_4$ isotherms of dmpn-$Mg_2$(dobpdc) confirm this adsorbent shows high $CO_2/CH_4$ selectivity over a wide temperature range due to the lack of strong binding sites for $CH_4$ (see FIG. 13). In FIG. 13, the adsorption properties of dmpn-$Mg_2$(dobpdc) are shown at 25° C. (curve 1302 for $CO_2$), 40° C. (curve 1304 for $CO_2$), 50° C. (curve 1306 for $CO_2$), 60° C. (curve 1308 for $CO_2$), and 75° C. (curve 1310 for $CO_2$). In FIG. 13, the comparable curves for $CH_4$ adsorption are negligible and therefore compressed on the Y-axis. The high pressure $CO_2$ (FIG. 14) and $CH_4$ (FIG. 15) isotherms indicate that this selectivity is maintained even at high pressures. FIG. 14 shows adsorption curves at 25° C. (curve 1402 for $CO_2$), 40° C. (curve 1404 for $CO_2$), 50° C. (curve 1406 for $CO_2$), and 75° C. (curve 1408 for $CO_2$).

In particular, dmpn-$Mg_2$(dobpdc) shows high physisorptive capacity for $CO_2$ at high pressures, along with minimal hysteresis upon desorption, which are beneficial for high pressure $CO_2$ removal from gas streams (FIG. 14). In addition, the $CH_4$ adsorption capacity of dmpn-$Mg_2$(dobpdc) at 2 bar is only 0.2 mmol/g, which should minimize losses of valuable $CH_4$ during $CO_2$ removal (FIG. 15). Based on these isotherms, dmpn-$Mg_2$(dobpdc) display a high noncompetitive $CO_2/CH_4$ selectivity (32) for $CO_2$ removal from a 1:1 $CO_2$:$CH_4$ feed at 4 bar and 40° C. and >65 selectivity for $CO_2$ removal from a 1:1 $CO_2$:$CH_4$ feed at 1 bar and 40° C. In addition, with desorption at 100° C. and 1 bar, a $CO_2$ working capacity as high as 3.6 mmol/g can be achieved with minimal $CH_4$ coadsorption (<0.2 mmol/g). Lastly, a 50% $CO_2/CH_4$ breakthrough measurement under representative target conditions (1 bar feed pressure, 40° C.) was carried out, and showed nearly instantaneous breakthrough of $CH_4$ (0.08 mmol/g adsorbed) followed by clean breakthrough of $CO_2$ (3.2 mmol/g adsorbed) (FIG. 16), corresponding to a $CO_2/CH_4$ selectivity of 39. Thus, the high $CO_2/CH_4$ selectivity of dmpn-$Mg_2$(dobpdc) makes it promising for $CO_2$ removal from crude biogas, as well as from other $CO_2/CH_4$ mixtures.

CONCLUSION

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed. Additional supporting data for the some of the compounds disclosed in the present disclosure is found in Milner, 2017, J. Am. Chem. Soc. 139, 13541, which is hereby incorporated by reference.

It is understood that the examples and embodiments described herein are for illustrative purposes only and that various modifications or changes in light thereof will be suggested to persons skilled in the art and are to be included within the spirit and purview of this application and scope of the appended claims.

We claim:

1. An adsorption material comprising:
   a metal-organic framework comprising a plurality of divalent cations and a plurality of polytopic organic linkers; and
   a plurality of ligands, wherein each respective ligand in the plurality of ligands is amine appended to a divalent cation in the plurality of divalent cations of the metal-organic framework, and wherein each respective ligand in the plurality of ligands has the structure:

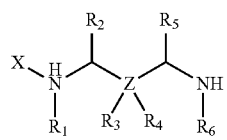

wherein,
X labels an amine of the respective ligand that is appended to a divalent cation in the plurality of divalent cations,
Z is carbon, silicon, or germanium, and
$R_1$, $R_2$, $R_3$, $R_4$, $R_5$, and $R_6$ are each independently selected from H, halogen, substituted or unsubstituted alkyl, substituted or unsubstituted heteroalkyl, substituted or unsubstituted aryl, substituted or unsubstituted heteroaryl, or substituted or unsubstituted heterocycloalkyl, with the provisos that
when $R_3$ is H, $R_4$ is other than H or methyl, and
when $R_4$ is H, $R_3$ is other than H or methyl.

2. The adsorption material of claim 1, wherein one of $R_3$ and $R_4$ is H and the other of $R_3$ and $R_4$ is a substituted or unsubstituted alkyl.

3. The adsorption material of claim 1, wherein $R_1$, $R_2$, $R_3$, $R_4$, $R_5$, and $R_6$ are each independently H, halogen, substituted or unsubstituted n-alkyl or a substituted or unsubstituted branched-chain alkyl.

4. The adsorption material of claim 1, wherein Z is carbon.

5. The adsorption material of claim 1, wherein
the metal-organic framework comprises $M_2$(dobpdc),
each M is a divalent cation in the plurality of cations and is in the group consisting of Mg, Ca, Mn, Cr, Fe, Co, Ni, Cu, and Zn,
each dobpdc is a polytopic organic linker in the plurality of polytopic organic linkers and has the composition 4,4'-dioxidobiphenyl-3,3'-dicarboxylate,
Z is carbon, and
$R_3$ and $R_4$ are each methyl.

6. An adsorption material, comprising:
a metal-organic framework comprising a plurality of divalent cations and a plurality of polytopic organic linkers; and
a plurality of ligands, wherein each respective ligand in the plurality of ligands is amine appended to a divalent cation in the plurality of divalent cations of the metal-organic framework, and wherein each respective ligand in the plurality of ligands has the structure:

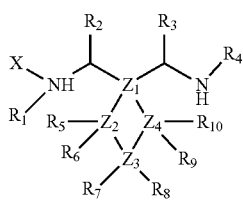

wherein
X labels an amine of the respective ligand that is appended to a divalent cation in the plurality of divalent cations,
$Z_1$, is carbon, silicon, or germanium,
$Z_2$, $Z_3$, and $Z_4$, are each independently carbon, silicon, germanium, sulfur or selenium, $R_1$, $R_2$, $R_3$, and $R_4$, are each independently selected from H, halogen, substituted or unsubstituted alkyl, substituted or unsubstituted heteroalkyl, substituted or unsubstituted aryl, substituted or unsubstituted heteroaryl, or substituted or unsubstituted heterocycloalkyl, and
$R_5$, $R_6$, $R_7$, $R_8$, $R_9$ and $R_{10}$ are each independently selected from H, halogen, methyl, substituted methyl, ethyl, or substituted ethyl, with the provisos that
when $Z_2$ is sulfur or selenium, $R_5$ and $R_6$ are not present,
when $Z_3$ is sulfur or selenium, $R_7$ and $R_8$ are not present, and
when $Z_4$ is sulfur or selenium, $R_9$ and $R_{10}$ are not present.

7. The adsorption material of claim 6, wherein $Z_1$, $Z_2$, $Z_3$, and $Z_4$, are each carbon.

8. The adsorption material of claim 6, wherein $R_1$, $R_2$, $R_3$, and $R_4$ are each independently H, halogen, substituted or unsubstituted n-alkyl or a substituted or unsubstituted branched-chain alkyl.

9. The adsorption material of claim 1, wherein each divalent cation in the plurality of divalent cations is Mg, Ca, Mn, Cr, Fe, Co, Ni, Cu, or Zn.

10. The adsorption material of claim 1, wherein each polytopic organic linker in the plurality of polytopic organic linkers is 4,4'-dioxidobiphenyl-3,3'-dicarboxylate (dobpdc$^{4-}$).

11. The adsorption material of claim 1, wherein each polytopic organic linker in the plurality of polytopic organic linkers is:
4,4"-dioxido-[1,1':4',1"-terphenyl]-3,3"-dicarboxylate (dotpdc$^{4-}$),
2,5-dioxidobenzene-1,4-dicarboxylate (dobdc$^{4-}$),
3,3' dioxide-biphenyl-4,4'-dicarboxylate (para-carboxylate-dobpdc$^{4-}$),
1,3,5-benzenetristetrazolate (BTT),
1,3,5-benzenetristriazolate (BTTri),
1,3,5-benzenetrispyrazolate (BTP), or
1,3,5-benzenetriscarboxylate (BTC).

12. The adsorption material of claim 1, wherein
each divalent cation in the plurality of divalent cations is Mg, Ca, Mn, Cr, Fe, Co, Ni, Cu, or Zn, and
each polytopic organic linker in the plurality of polytopic organic linker is 4,4'-dioxidobiphenyl-3,3'-dicarboxylate (dobpdc$^{4-}$).

13. The adsorption material of claim 1, wherein the metal-organic framework is a framework selected from the group of frameworks consisting of
(a) M-BTT, wherein
each M is a divalent cation in the plurality of cations and is in the group consisting of Ca, Fe, Mn, Cu, Co, Ni, Cr, and Cd, and
each BTT is a polytopic organic linker in the plurality of polytopic organic linkers and has the composition 1,3,5-benzenetristetrazolate, and
(b) Q-BTTri, wherein
each Q is a divalent cation in the plurality of cations and is in the group consisting of Cr, Mn, Fe, Co, Ni, and Cu, and
each BTTri is a polytopic organic linker in the plurality of polytopic organic linkers and has the composition 1,3,5-benzenetristriazolate.

14. The adsorption material of claim 1, wherein the metal-organic framework is a framework selected from the group of frameworks consisting of (a) M-BTP, wherein
   each M is a divalent cation in the plurality of cations and is in the group consisting of Co, Ni, and Zn, and
   each BTP is a polytopic organic linker in the plurality of polytopic organic linkers and has the composition 1,3,5-benzenetrispyrazolate, and
(b) $Q_3(BTC)_2$, wherein
   each Q is a divalent cation in the plurality of cations and is in the group consisting of Cu and Cr, and
   each BTC is a polytopic organic linker in the plurality of polytopic organic linkers and has the composition 1,3,5-benzenetriscarboxylate.

15. The adsorption material of claim 1, wherein
   the metal-organic framework comprises $M_2(dobdc)$,
   each M is a divalent cation in the plurality of cations and is in the group consisting of Mg, Ca, Mn, Cr, Fe, Co, Ni, Cu, or Zn, and
   each $dobdc^{4-}$ is a polytopic organic linker in the plurality of polytopic organic linkers and has the composition 2,5-dioxido-1,4-benzenedicarboxylate.

16. The adsorption material of claim 1, wherein the metal-organic framework comprises open metal sites and ligand occupied metal sites.

17. The adsorption material of claim 1, wherein each divalent cation in the plurality of divalent cations is Mg.

18. The adsorption material of claim 1, wherein the differential entropy of $CO_2$ adsorption of the adsorption material is less than $-175$ J/mol·K.

19. The adsorption material of claim 1, wherein exposure of the adsorption material to $CO_2$ results in the formation of carbamic acid pairs between adjacent ligands in the plurality of ligands in the adsorption material.

20. The adsorption material of claim 1, wherein the adsorption material has a $CO_2$ adsorption capacity of less than 3.00 mmol/g at 150 mbar $CO_2$ at 40° C.

21. The adsorption material of claim 1, wherein the adsorption material has a working capacity of greater than of 2.3 mmol/g over less than a 70° C. temperature differential for $CO_2$.

22. The adsorption material of claim 1, wherein
   the adsorption material has a Brunauer-Emmett-Teller (BET) surface area of at least 920 $m^2/g$.

23. A method for abating $CO_2$ from a flue gas, the method comprising:
   (a) contacting the flue gas with the adsorption material of claim 1 to reversibly adsorb $CO_2$ from the flue gas thereby generating an adsorption material enriched for $CO_2$; and
   (b) thermally stripping a major portion of the $CO_2$ from the adsorption material enriched for $CO_2$ using a regeneration process.

24. A method of separating carbon dioxide produced by a source, comprising exposing the carbon dioxide from the source to the adsorption material of claim 1, wherein the carbon dioxide is reversibly separated into the adsorption material by the method.

25. A method for removing $CO_2$ from a multi-component gas mixture comprising $CO_2$ and at least one of $N_2$, $H_2O$, and $O_2$, the method comprising:
   contacting the multi-component gas mixture with the adsorption material of claim 1 to reversibly adsorb $CO_2$ from the multi-component gas mixture thereby generating an adsorption material enriched for $CO_2$ and a residual gas that is depleted of $CO_2$.

* * * * *